US005651098A

United States Patent [19]

Inoue et al.

[11] Patent Number: 5,651,098
[45] Date of Patent: Jul. 22, 1997

[54] PLANNING METHOD AND SYSTEM

[75] Inventors: Haruki Inoue, Katsuta; Mayumi Mizutani, Hitachi; Hideo Yoshida, Takahagi; Hitoshi Onizawa, Hitachi; Kenichi Nakamura, Hitachiota; Yukio Hamaguchi; Masami Shiozawa, both of Hitachi, all of Japan

[73] Assignee: Hitachi Engineering Co., Ltd., Hitachi, Japan

[21] Appl. No.: 319,789

[22] Filed: Oct. 7, 1994

[30] Foreign Application Priority Data

| Oct. 7, 1993 | [JP] | Japan | 5-251842 |
| Nov. 18, 1993 | [JP] | Japan | 5-289427 |
| Mar. 16, 1994 | [JP] | Japan | 6-046003 |

[51] Int. Cl.[6] ................................................ G06F 15/18
[52] U.S. Cl. ......................... 395/13; 395/922; 364/491
[58] Field of Search ........................... 395/10–13, 50–51, 395/60–61, 76, 904, 922; 364/491, 468.28, 468.2

[56] References Cited

U.S. PATENT DOCUMENTS

| 5,140,530 | 8/1992 | Guha et al. | 395/13 |
| 5,255,345 | 10/1993 | Shaefer | 395/13 |
| 5,343,554 | 8/1994 | Koza et al. | 395/13 |

FOREIGN PATENT DOCUMENTS 2-304587  12/1990  Japan.

OTHER PUBLICATIONS

"Epoch–Making Method for 'Traveling Salesman Problem––Miraculously Hugh Results Using Chaos'", by Kunie Suzuki, Kagaku Asashi, Feb. 1993, pp. 45–48.

"Handbook of Genetic Algorithms", Pub. by Van Nostrand Reinhold Computer Library, pp. 1–42 and pp. 332–372.

O'Neill, "The ARGOT Strategy III: the BBN Butterfly Multiprocessor"; Proceedings Supercomputing, vol. II: Science and Applications, pp. 214–227 vol. 2. Nov. 1988.

Parker et al, "Inverse kinematics of redundant robots using genetic algorithms"; Proceeding. 1989 IEEE International conference on robotics and automation, pp. 271–276 vol. 1. May 1989.

*Primary Examiner*—Tariq R. Hafiz
*Attorney, Agent, or Firm*—Antonelli, Terry, Stout & Kraus, LLP

[57] ABSTRACT

A system for making an optimum plan for a given problem at high speed. The system sets a planning problem, etc., prepares an objective function and finalizes a plan for minimizing or maximizing the objective function value, and then stores necessary variables. The system prepares as many parent plans of a first generation as a given number (population), calculates objective function values, sorts plans in descending or ascending order of the objective function values of the plans, when selection numbers are assigned to plans in order of a ratio of the objective function value of each plan to the total of the objective function values of the plans, selects parent plans by using numbers indicated by as many constants as the population determined for each generation as the selection numbers, and replaces two elements, arranged at order positions specified by random numbers, with each other for each of the selected parent plans, to prepare child plans.

4 Claims, 46 Drawing Sheets

D(f,t)

| f \ t | 0 | 1 | 2 | 3 | 4 | 5 | 6 | 7 | 8 | 9 | 10 |
|---|---|---|---|---|---|---|---|---|---|---|---|
| 0 |  | 19 | 29 | 51 | 81 | 36 | 58 | 16 | 64 | 48 | 24 |
| 1 | 19 |  | 17 | 43 | 73 | 35 | 42 | 23 | 64 | 53 | 37 |
| 2 | 29 | 17 |  | 23 | 53 | 18 | 25 | 18 | 45 | 39 | 32 |
| 3 | 51 | 43 | 23 |  | 27 | 14 | 21 | 32 | 23 | 27 | 39 |
| 4 | 81 | 73 | 53 | 27 |  | 41 | 38 | 61 | 24 | 43 | 64 |
| 5 | 36 | 35 | 18 | 14 | 41 |  | 34 | 16 | 25 | 26 | 21 |
| 6 | 58 | 42 | 25 | 21 | 38 | 34 |  | 45 | 47 | 51 | 56 |
| 7 | 16 | 23 | 18 | 32 | 61 | 16 | 45 |  | 43 | 28 | 11 |
| 8 | 64 | 64 | 45 | 23 | 24 | 25 | 47 | 43 |  | 12 | 41 |
| 9 | 48 | 53 | 39 | 27 | 43 | 26 | 51 | 28 | 12 |  | 22 |
| 10 | 24 | 37 | 32 | 39 | 64 | 21 | 56 | 11 | 41 | 22 |  |

FIG. 5
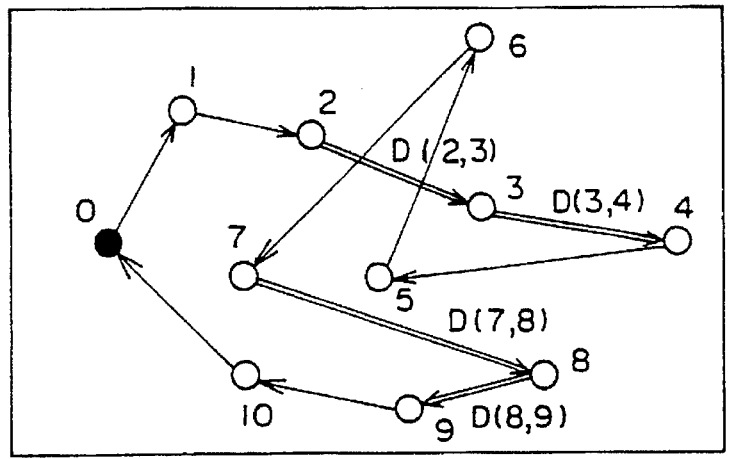
WHEN P(1) = ( 1, 2, 3, 4, 5, 6, 7, 8, 9, 10 )
         ↑J              ↑K
⇩ ONEFOLD PROPAGATION BY MUTATION MANIPULATION
C(1) = ( 1, 2, 8, 4, 5, 6, 7, 3, 9, 10 )
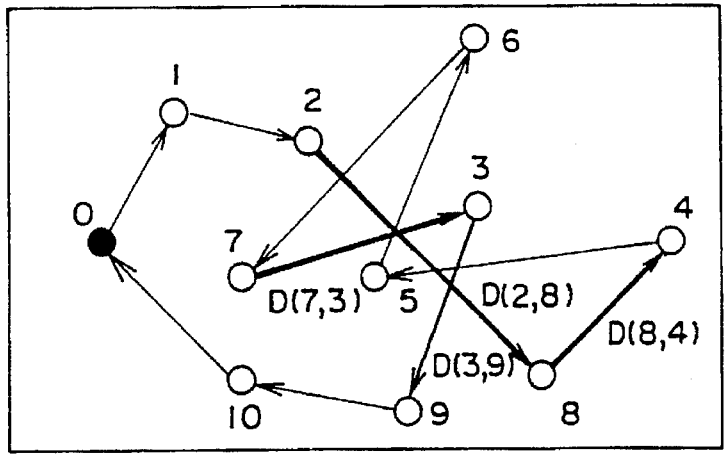
⇒ ROUTE EXISTING ONLY IN P(1)
→ ROUTE EXISTING ONLY IN C(1)

FIG. 6

| PARENT CHROMOSOMES | MUTATION CONSTANTS J — K | CHILD CHROMOSOMES |
|---|---|---|
| P(1) = (1, 2, 3, 4, 5, 6, 7, 8, 9, 10) | 3 — 8 | C(1) = (1, 2, 8, 4, 5, 6, 7, 3, 9, 10) |
| (2) = (6, 8, 1, 5, 3, 10, 9, 2, 4, 7) | 1 — 10 | (2) = (7, 8, 1, 5, 3, 10, 9, 2, 4, 6) |
| (3) = (10, 9, 8, 7, 6, 5, 4, 3, 1, 2) | 7 — 9 | (3) = (10, 9, 8, 7, 6, 5, 1, 3, 4, 2) |
| (4) = (7, 9, 2, 10, 1, 5, 3, 6, 4, 8) | 3 — 5 | (4) = (7, 9, 1, 10, 2, 5, 3, 6, 4, 8) |
| (5) = (5, 7, 6, 9, 3, 1, 2, 10, 8, 4) | 6 — 7 | (5) = (5, 7, 6, 9, 3, 2, 1, 10, 8, 4) |
| (6) = (10, 1, 9, 2, 8, 3, 7, 4, 6, 5) | 1 — 3 | (6) = (9, 1, 10, 2, 8, 3, 7, 4, 6, 5) |
| (7) = (2, 4, 6, 8, 10, 9, 7, 5, 3, 1) | 2 — 4 | (7) = (2, 8, 6, 4, 10, 9, 7, 5, 3, 1) |
| (8) = (1, 3, 2, 4, 5, 8, 7, 6, 10, 9) | 8 — 9 | (8) = (1, 3, 2, 4, 5, 8, 7, 10, 6, 9) |
| (9) = (9, 10, 1, 7, 6, 5, 4, 3, 2, 8) | 9 — 10 | (9) = (9, 10, 1, 7, 6, 5, 4, 3, 8, 2) |
| (10) = (8, 2, 7, 1, 10, 5, 4, 6, 3, 9) | 4 — 6 | (10) = (8, 2, 7, 5, 10, 1, 4, 6, 3, 9) |

FIG. 7
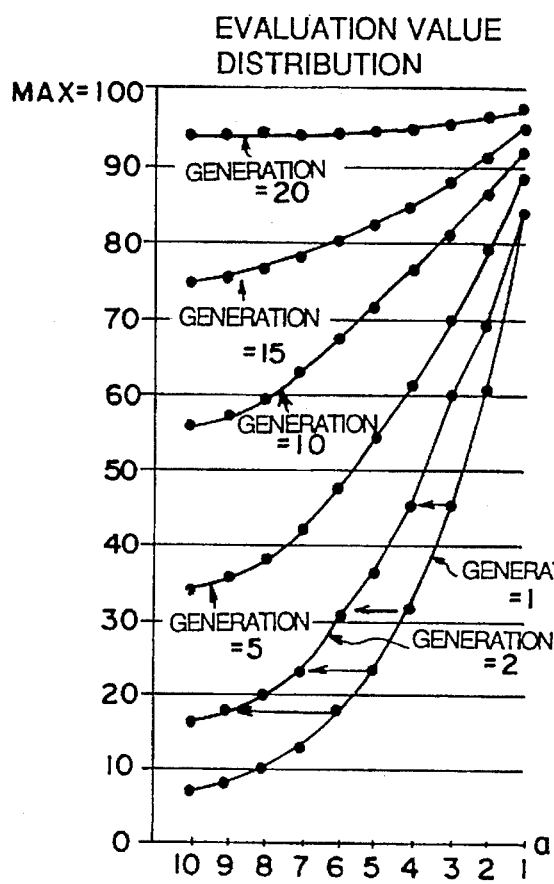
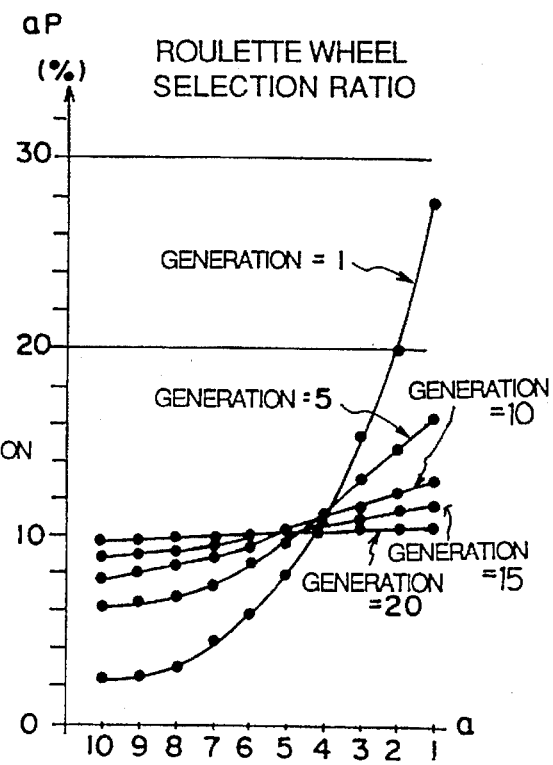

FIG. 12
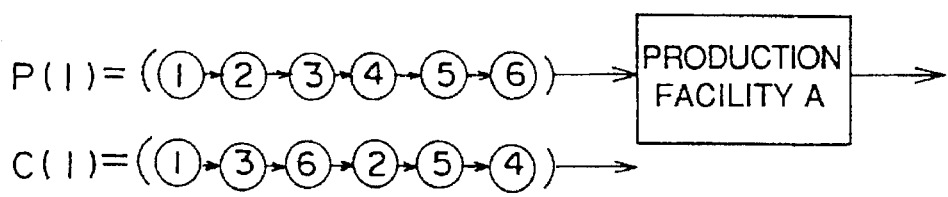
| SETUP TIME TABLE (MIN) | ① | ② | ③ | ④ | ⑤ | ⑥ |
|---|---|---|---|---|---|---|
| ① |  | 18 | 6 | 25 | 16 | 8 |
| ② | 5 |  | 32 | 18 | 3 | 9 |
| ③ | 12 | 13 |  | 15 | 10 | 9 |
| ④ | 21 | 23 | 14 |  | 10 | 9 |
| ⑤ | 11 | 18 | 13 | 12 |  | 21 |
| ⑥ | 5 | 9 | 18 | 21 | 15 |  |
| JOB NO. | JOB TIME REQUIRED (MIN) |
|---|---|
| ① | 60 |
| ② | 40 |
| ③ | 52 |
| ④ | 64 |
| ⑤ | 68 |
| ⑥ | 40 |
Σ = 324 (MIN)
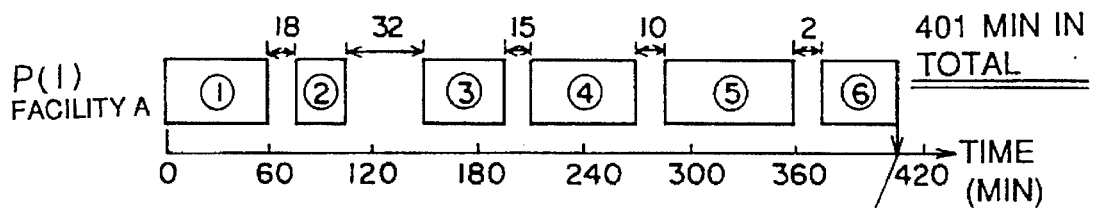
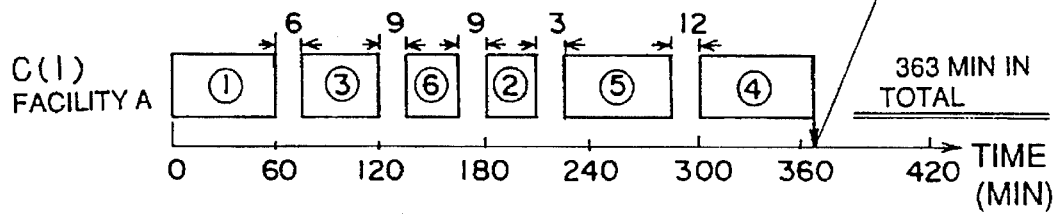
TOTAL SETUP TIME OF INITIAL PARENT INDIVIDUAL P(1) = 77 MINUTES
TOTAL SETUP TIME OF OPTIMUM INDIVIDUAL C(1) = 39 MINUTES
↓ 50 (%) CUT FIG. 23
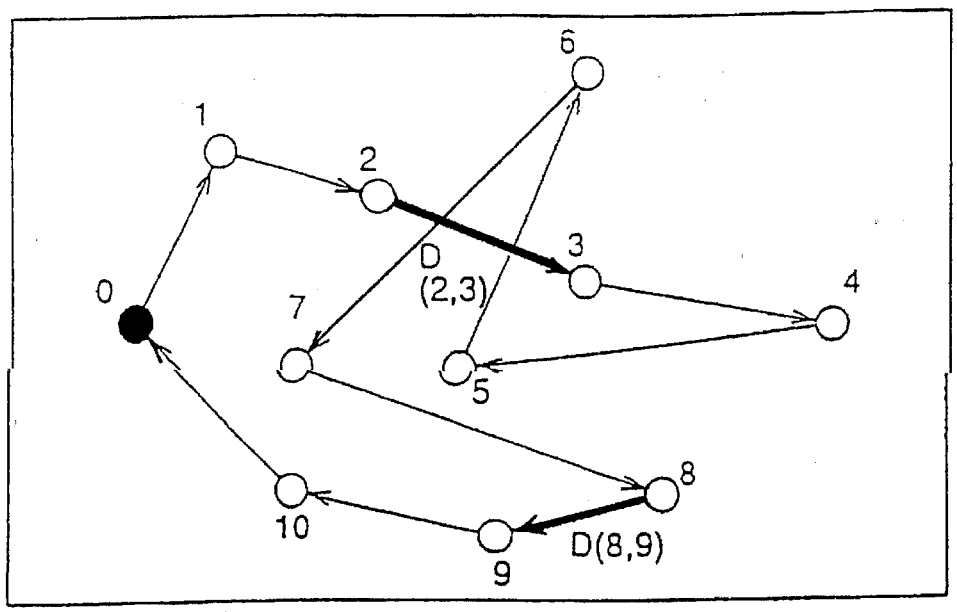
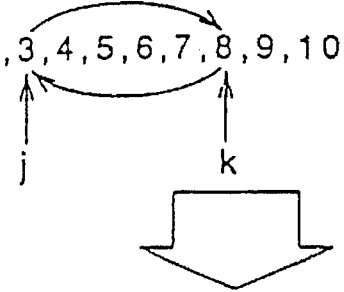
WHEN X = (1,2,3,4,5,6,7,8,9,10)
WHEN Y = (1,2,8,7,6,5,4,3,9,10)
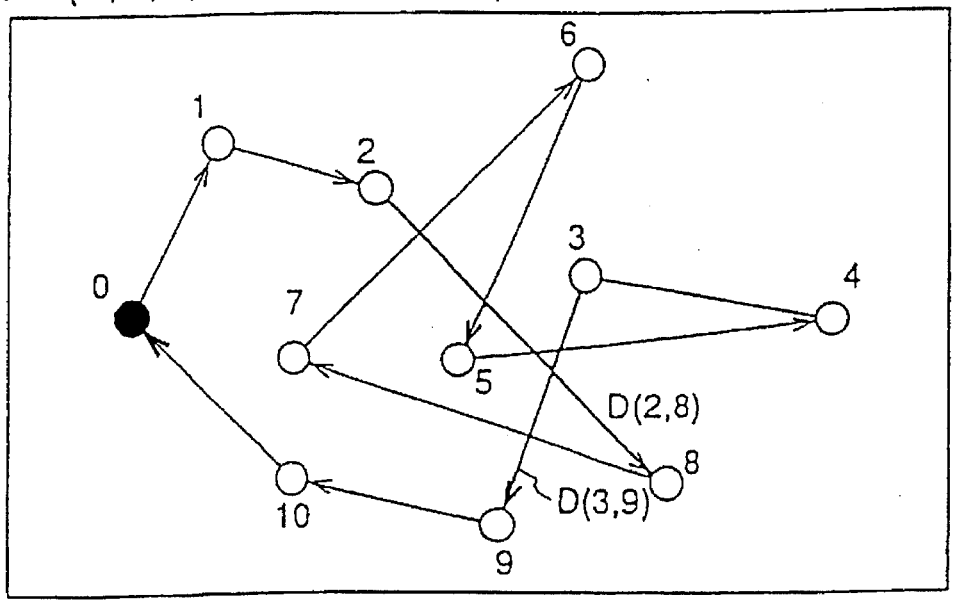

FIG. 24
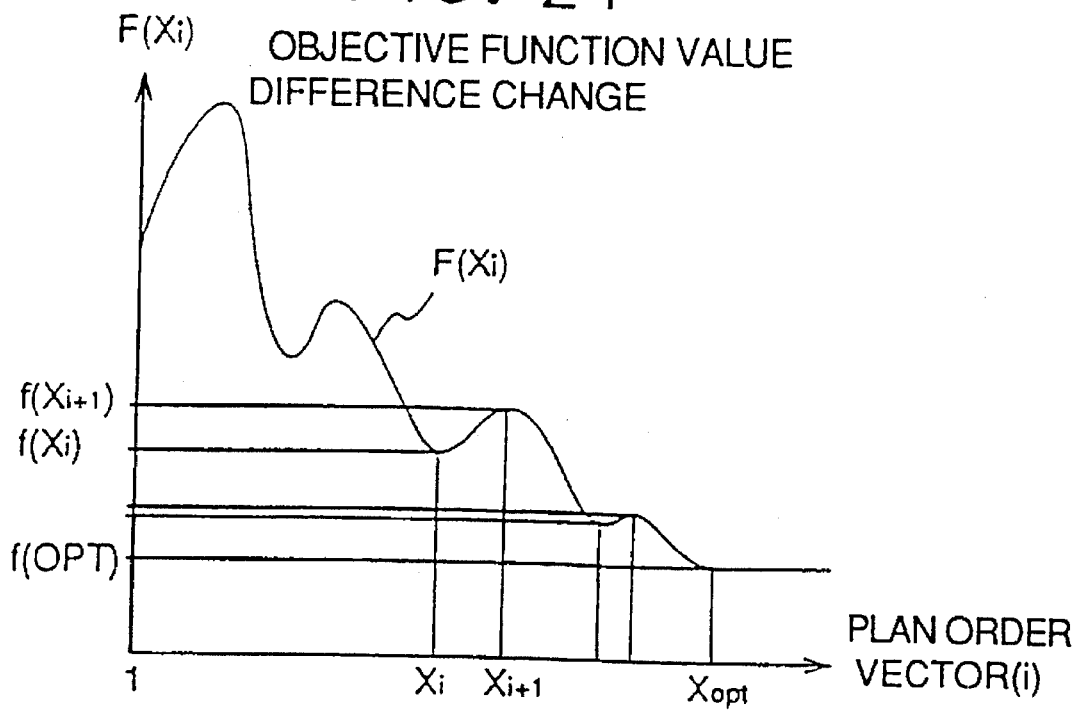
OBJECTIVE FUNCTION VALUE DIFFERENCE CHANGE
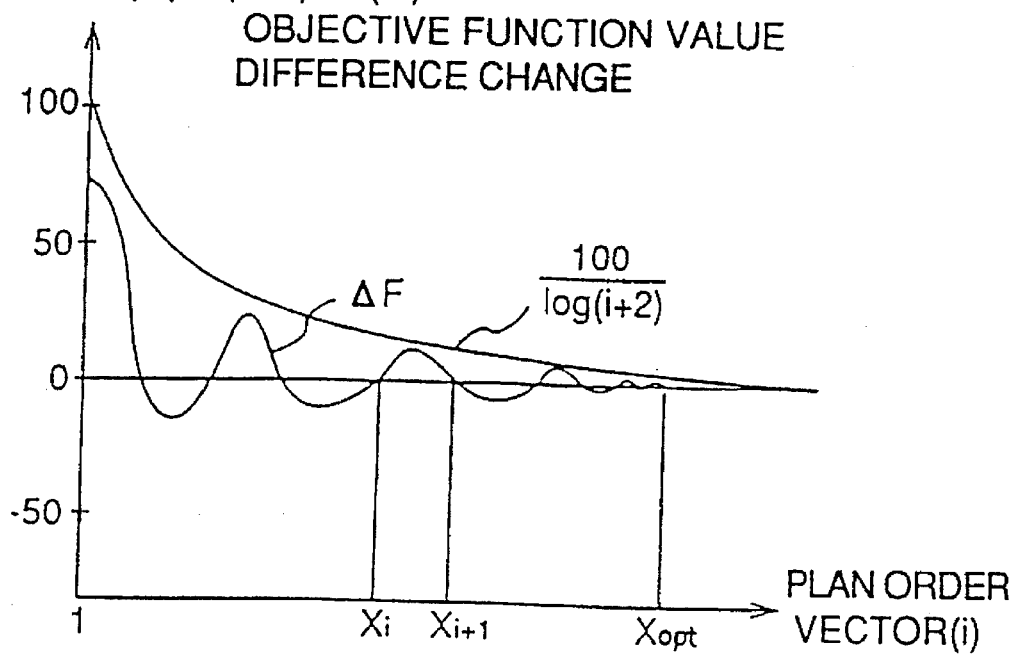
OBJECTIVE FUNCTION VALUE DIFFERENCE CHANGE

| J | $n^2$ (GENERATION NO.) |
|---|---|
| 1 | 2 |
| 2 | 8 |
| 3 | 3 |
| 4 | 7 |
| 5 | 2 |
| 6 | 1 |
| 7 | 9 |
| 8 | 7 |
| 9 | 2 |
| 10 | 1 |
| 11 | 4 |
| n−2 | |
| n−1 | 8 |
| n | 6 |

| K | $n^2$ |
|---|---|
| 1 | 9 |
| 2 | 10 |
| 3 | 6 |
| 4 | 8 |
| 5 | 5 |
| 6 | 4 |
| 7 | 10 |
| 8 | 8 |
| 9 | 7 |
| 10 | 2 |
| 11 | 5 |
| n−2 | |
| n−1 | 9 |
| n | 9 |

INTEGER UNIFORM RANDOM NUMBERS RANGING FROM 1 TO n
J<K

| C | GENERATION NO. |
|---|---|
| 1 | 97 |
| 2 | 65 |
| 3 | 89 |
| 4 | 94 |
| 5 | 92 |
| 6 | 31 |
| 7 | 68 |
| 8 | 15 |
| 9 | 77 |
| 10 | 79 |
| 11 | 23 |
| $n^2-2$ | 5 |
| $n^2-1$ | 19 |
| $n^2$ | 13 |

OBJECTIVE FUNCTION VALUE DIFFERENCE EVALUATION TABLE

C(i) DISTRIBUTION AREA CHANGE WHEN $C_1=100$

FIG. 27
$X = (① \rightarrow ② \rightarrow ③ \rightarrow ④ \rightarrow ⑤ \rightarrow ⑥)$ 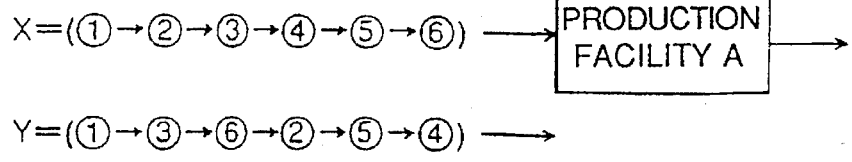
$Y = (① \rightarrow ③ \rightarrow ⑥ \rightarrow ② \rightarrow ⑤ \rightarrow ④)$ →
SETUP TIME TABLE (MIN)
|   | ① | ② | ③ | ④ | ⑤ | ⑥ |
|---|---|---|---|---|---|---|
| ① |   | 18 | 6 | 25 | 16 | 8 |
| ② | 5 |   | 32 | 18 | 3 | 9 |
| ③ | 12 | 13 |   | 15 | 10 | 9 |
| ④ | 21 | 23 | 14 |   | 10 | 9 |
| ⑤ | 11 | 18 | 13 | 12 |   | 21 |
| ⑥ | 5 | 9 | 18 | 21 | 15 |   |
| JOB NO. | JOB TIME REQUIRED (MIN) |
|---|---|
| ① | 60 |
| ② | 40 |
| ③ | 52 |
| ④ | 64 |
| ⑤ | 68 |
| ⑥ | 40 |
Σ = 324 (MIN)
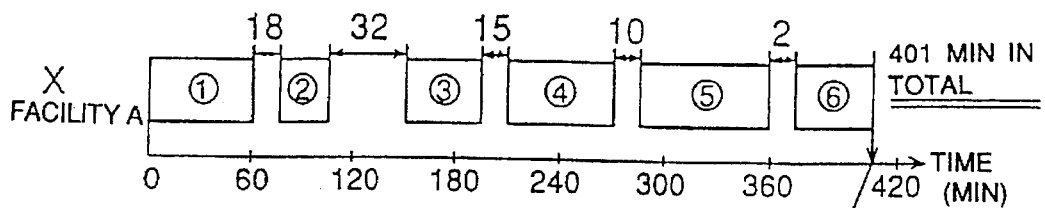
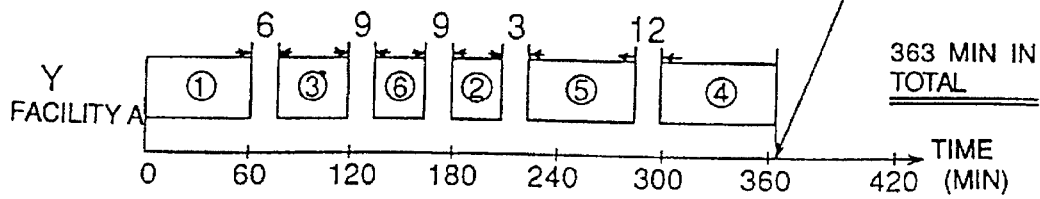
TOTAL SETUP TIME OF X = 77 MINUTES
TOTAL SETUP TIME OF Y = 39 MINUTES
↓ 50(%) CUT FIG.36
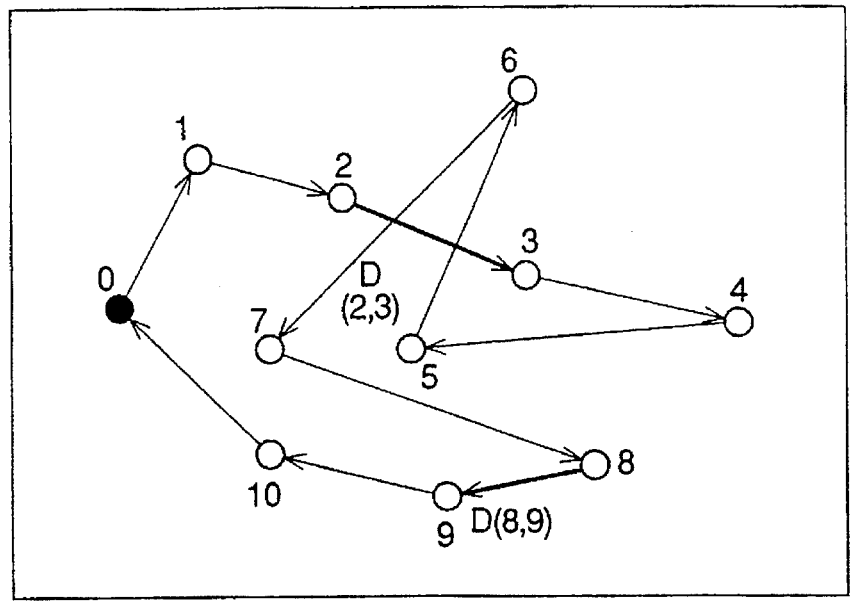
X=(1,2,3,4,5,6,7,8,9,10)
         j         k
Y=(1,2,8,7,6,5,4,3,9,10)
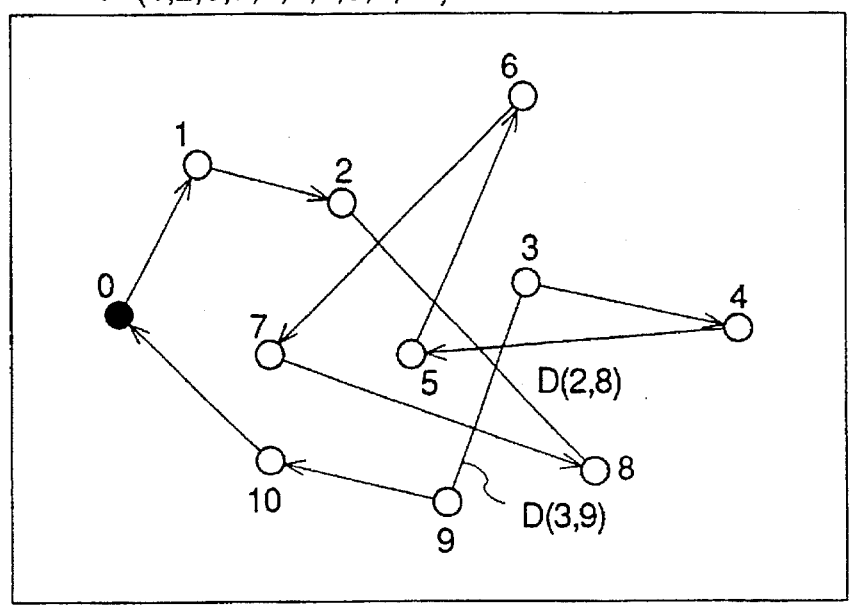

FIG.37
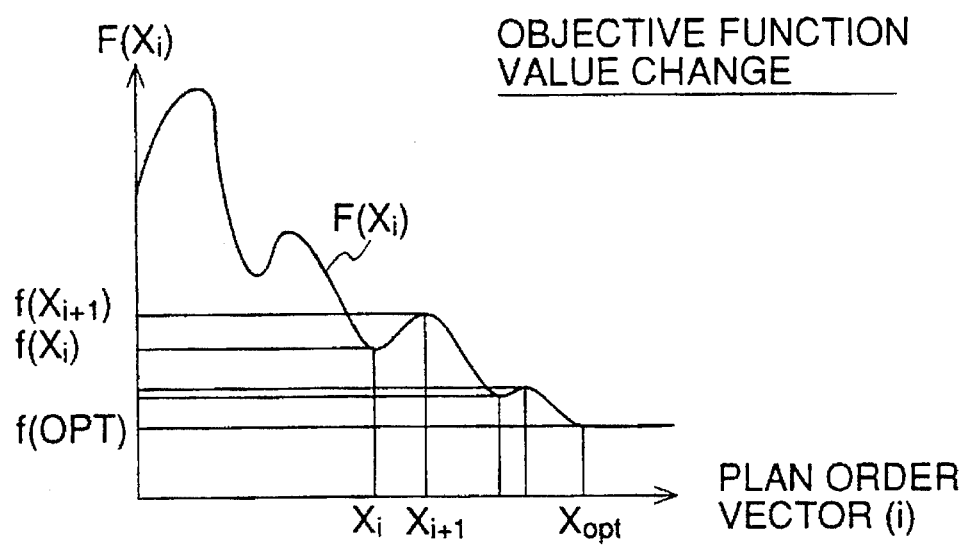
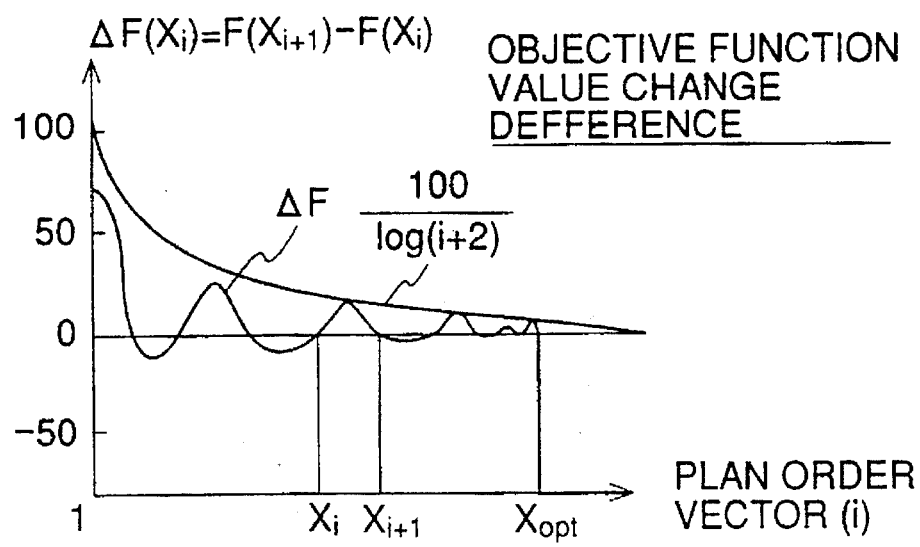

| | TABLE J | | TABLE K | | $A(t_i)$ |
|---|---|---|---|---|---|
| $n^3$ (GENERATION NO.) | | $n^2$ | | | GENERATION NO. |

| J | | K | | $t_i$ | |
|---|---|---|---|---|---|
| 1 | 2 | 1 | 9 | 1 | 97 |
| 2 | 8 | 2 | 10 | 2 | 65 |
| 3 | 3 | 3 | 6 | 3 | 89 |
| 4 | 7 | 4 | 8 | 4 | 94 |
| 5 | 2 | 5 | 5 | 5 | 92 |
| 6 | 1 | 6 | 4 | 6 | 31 |
| 7 | 9 | 7 | 10 | 7 | 68 |
| 8 | 7 | 8 | 8 | 8 | 15 |
| 9 | 2 | 9 | 7 | 9 | 77 |
| 10 | 1 | 10 | 2 | 10 | 79 |
| 11 | 4 | 11 | 5 | 11 | 23 |
| $P_m-2$ | | $P_m-2$ | | $n^2-2$ | 5 |
| $P_m-1$ | 8 | $P_m-1$ | 9 | $n^2-1$ | 19 |
| $P_m$ | 6 | $P_m$ | 9 | $n^2$ | 13 |

INTEGER UNIFORM RANDOM NUMBERS RANGING FROM 1 TO n
J < K

CHANGE EXAMPLE OF OPTIMUM DETERMINATION VALUES (i) DISTRIBUTION AREA CHANGE WHEN $C_1=100$

FIG.40

FIG.44
CORRESPONDING TO ONE CP2.
PLAN EVALUATION DEGREE IN CP(■ :CLOSE TO OPTIMUM SOLUTION
⊠ :■ CLOSE TO OPTIMUM SOLUTION NEXT TO
▨ :⊠ CLOSE TO OPTIMUM SOLUTION NEXT TO
☐ :DISTANT FROM OPTIMUM SOLUTION)
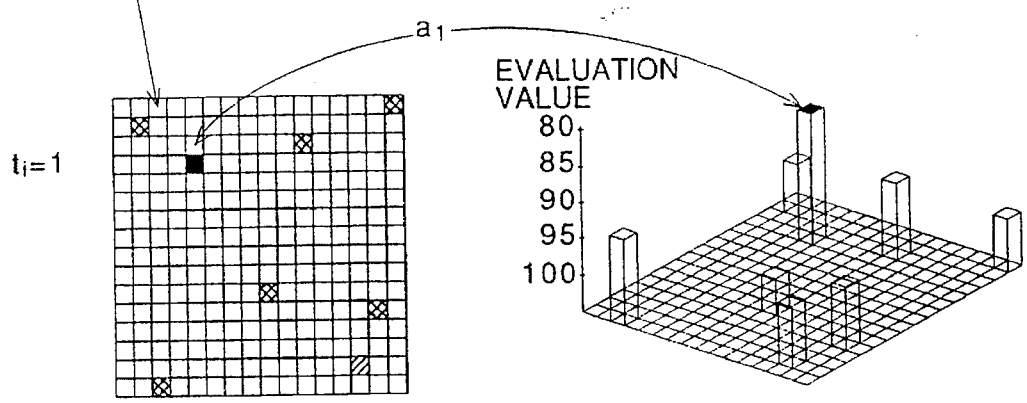
$t_i = 1$
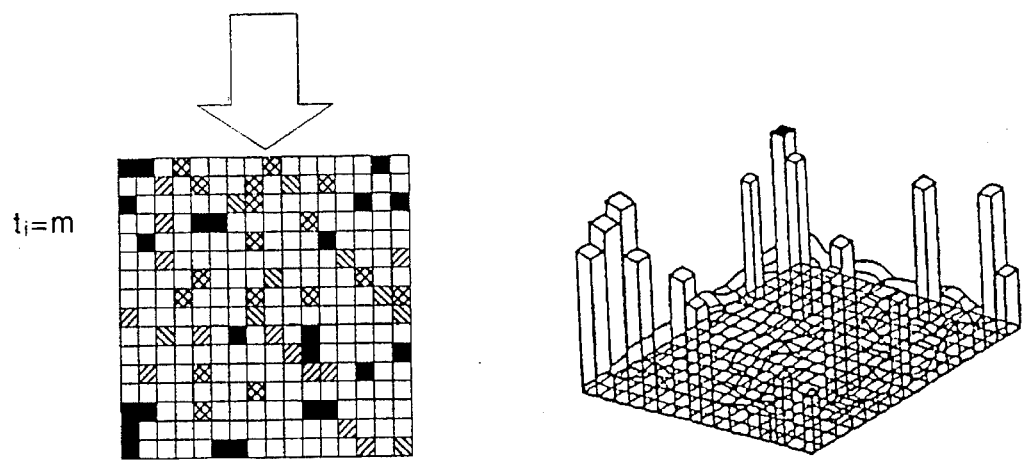
$t_i = m$
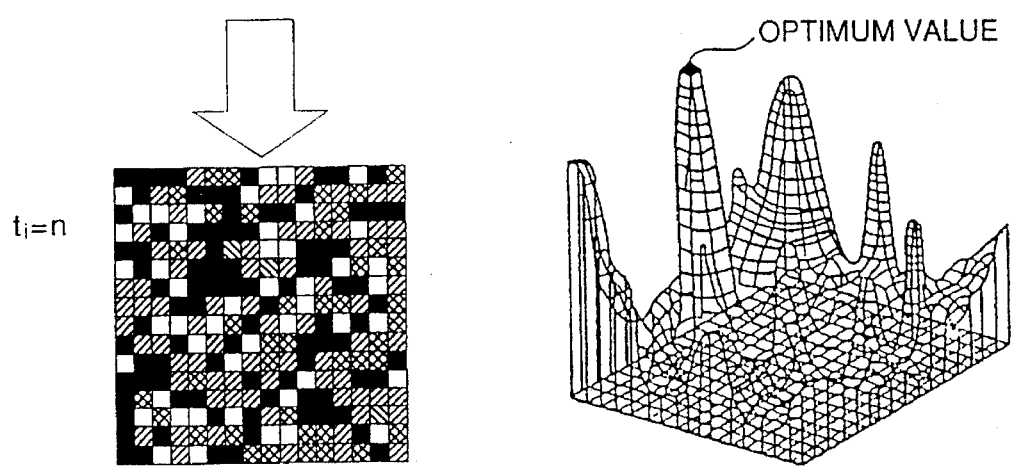
$t_i = n$

PLANNING METHOD AND SYSTEM

BACKGROUND OF THE INVENTION

1. Field of the Invention

This invention relates to means for providing optimum plans when making diversified plans in various fields and in particular to means for solving planning problems involving an enormous number of permutations or combinations in a simple configuration and at an extremely high speed.

2. Description of the Related Art

Hitherto, various techniques have been proposed to find out, within a practical allowable time, an optimum solution or a plan for maximizing or minimizing a maximum or minimum item determined in planning problems intended for various problems in diversified fields, such as print pattern design of electronic wiring boards, manufacturing processes, sewage piping design, or physical distribution systems.

The techniques attempt to implement means for finding optimum solutions to the planning problems in various fields within the practical allowable time by applying an interconnecting neural network, chaos, etc., for example, as described in the references "Epoch-making Method for "Traveling Salesman Problem—Miraculously High Results Using Chaos," Kagaku Asahi, Feb.—1993 or in Japanese Patent Laid-Open No. Hei 2-304587 "System for Calculating Shortest Distance, Shortest Time, or Lowest Transportation Cost."

Attention is also given to a so-called genetic algorithm, as potential means for simulating the evolution of living things and finding on overall quasi-optimum resolution, as described in the document "HANDBOOK OF GENETIC ALGORITHM (Van Nostrand Reinhold Computer Library.)

In contrast to a so-called enumeration method in which all possible plan combinations are considered for a given planning problem, a common concept in recent optimization means containing application examples of interconnecting neural networks, chaos, etc., as mentioned above, is as follows: First, one plan is made and the contents of the plan are efficiently changed little by little (namely, an attempt is made to find an optimum solution in as few planning attempts as possible, without planning at random). The value of an objective function, a function representing the item to be finally maximized or minimized in the planning problem is evaluated and a plan, for example, a plan for reducing the objective function value, is finally adopted as a better candidate plan for finding an optimum solution, namely, a plan for maximizing or minimizing the objective function in a short time.

However, the conventional methods using neural networks, chaos, etc., have the following two problems; First, each time a new plan is made, predetermined processing for planning must be performed as many times as the result of raising the number of components of the plan, or planning parameters for optimizing the objective function, n, to at least between the second power and the third power ($n^2$ to $n^3$ times). Second, optimality is evaluated experimentally without the theoretical foundation of it being possible to arrive at an optimum solution and therefore it takes a long processing time to arrive at an optimum solution or a quasi-optimum solution. Therefore, the probability of arriving at an optimum solution is extremely low.

For example, in a system described in the above-mentioned document, it takes a long time (20 seconds) to solve the so-called travelling salesman problem (TSP) in which the shortest one of all possible routes on which a salesman visits 30 places only once each is determined even if a recent computer, such as a workstation having a capability of 10–100 MIPS, is used; moreover, it has a 3% chance of finding an erroneous optimum solution.

In contrast, the above-mentioned genetic algorithm relates the plan elements to "chromosomes," the main element of a gene in the evolution of living things, and provides a plurality of chromosomes in order to carry out a search for a global optimum solution.

Thus, although it is inferior to the means using neural networks, chaos, etc., in performance with respect to reliably finding an optimum solution, there is a high chance that the processing capability, particularly convergence on an optimum solution at the initial stage of retrieval, will be greatly improved. However, to simulate heredity and evolution, enormous processing of complicated crossover, mutation, evaluation, selection, re-evaluation, etc., must be repeated; it is extremely difficult to effectively apply the genetic algorithm to actual industrial fields.

SUMMARY OF THE INVENTION

It is therefore an object of the invention to provide means for solving problems related to processing using the genetic algorithm, and finding a plan for maximizing or minimizing the value of an objective function in a plan problem involving an enormous number of combinations or permutations, in an extremely short time.

To this end, according to the invention, there is provided a planning system comprising setting means for accepting at least a given planning problem and values of variables required to solve the problem, optimization means for preparing an objective function representing an item to be minimized or maximized in the planning problem and making a final plan for minimizing or maximizing a value of the prepared objective function, and means for storing at least the variables required for the planning.

The optimization means comprises initial plan preparation means for preparing a predetermined number (population) of first generation parent plans, operational means for calculating objective function values corresponding to plans; means for sorting plans in descending or ascending order of the objective function values of the plans; parent plan selection means, when selection numbers are assigned to given plans according to objective function values, for selecting as many parent plans as a predetermined number (population) by using numbers indicated by as many constants as the predetermined number (population) for each generation repetition as the selection numbers; child plan preparation means for replacing two arbitrary elements with each other for each of the selected parent plans for preparing child plans; control means for starting the operational means and the plan sort means for the parent plans and the prepared child plans; generation change means for selecting among the sorted plans as many plans as the population according to the sort order as new plans; and optimum plan selection means for starting the parent plan selection means, the child preparation means, the control means, and the generation change means from a second generation to a predetermined generation number for selecting a final plan for maximizing or minimizing the objective function value.

According to another form of the invention, there is provided a planning system comprising input means for accepting at least a given planning problem and values of variables required to solve the problem, optimization means for preparing an objective function representing an item to be minimized or maximized in the planning problem and making a final plan for minimizing or maximizing a value of the prepared objective function, and means for outputting the final plan result.

The optimization means comprises means for storing at least a plurality of solution plans to the given problem; a plurality of cell processors, each for preparing a new plan from one plan by predetermined manipulation, calculating a difference between objective function values of the two plans, comparing the difference with a value of a plan determination variable set for each processing at a predetermined processing count, and if the difference is greater than or equal to the plan determination variable value, adopting the former plan before the manipulation as an optimum plan candidate, or if the difference is less than the plan determination variable value, adopting the new made plan as an optimum plan candidate; a cell processor parallel control unit for assigning optimum plan candidates to the cell processors as plans to which the manipulation is applied in response to a percentage of the objective function value of each plan candidate to the total of the objective function values of the plan candidates; and start control means for starting the cell processors and the cell processor parallel control unit as many times as the predetermined processing count.

The invention provides the planning means without lower optimality of a solution that is found very quickly and without the processing of selection, population limitation, crossover, etc., contained in the conventional genetic algorithm.

According to the invention, in planning, only processing that can be described in approximately one line in a computer high-level language, such as the C language, is adopted as processing of as many repetitions as population in one generation, and a plan having an optimality equivalent to that provided by the conventional method can be made.

The means for providing the functions according to the invention can be accomplished by finding an important law in the evolution of living things and applying the law as described below.

The genetic algorithm is described in detail in the above-mentioned document and therefore will only be outlined here.

First, the maximum population of individuals for each generation is previously defined and plans are related to the individuals in one-to-one correspondence. An objective function defined to represent an evaluation item is provided and the individuals are evaluated according to the objective function values.

Next, the ratio of the evaluation value of each individual to the total of the evaluation values of all individuals in the population is calculated.

In one generation, a predetermined number of child individuals are generated by a gene operator (gene manipulation) executed for one or more individuals called parents selected in response to the above-mentioned ratio (dominant heredity), such as crossover manipulation of generating a predetermined number of children by replacing components of two or more parents with each other, mutation manipulation of changing elements of one parent according to a predetermined mutation rate, or inversion manipulation of inverting an element list of one parent.

Next, selection processing of a predetermined number of individuals among the parent and child individuals by a predetermined procedure and advancing to the next generation is repeated a predetermined number of times.

In the selection processing, selection criteria conforming to the evaluation values are prepared for all individuals for each generation in the conventional method, thus a large number of processing steps such as calculating the ratio to the total are required. Likewise, dominant parent selection requires a large number of processing steps.

Further, gene operator processing or objective function value evaluation processing requires at least as many processing steps as the result of raising the number of plan elements to the second power or more.

However, if adaptation function definition is fixed in the evolution of living things, it can be found statistically that the parent selection criterion in dominant heredity for each generation changes only slightly. That is, variations of the objective function values in initial generations decrease as the exponent in the exponential function making up the objective function increases, namely, as the generation advances. As the generation advances further, the variations become almost negligible and hardly any objective function value difference between the individuals is found. This process is applicable to every problem.

Such change is previously obtained experimentally or experientially for each problem, thereby eliminating the need for detailed and complicated dominant heredity processing in actual planning.

An important natural law can be applied to the gene operator processing capabilities.

Since the crossover operator propagates individuals from two different individuals, evaluation of the generated child individuals (calculation of the objective function values) must be executed exactly. In contrast, each of the mutation and inversion operators is to change a part of one individual for producing a new child individual, thus the evaluation requires only that the evaluation value of the changed part should be added to the evaluation value of the parent. That is, the evaluation steps can be executed independently of the number of planning elements.

Application of this important natural law enables a result equivalent to that of the conventional genetic algorithm to be produced simply by performing the following processing, for example:

Step 1: The evaluation values of initial individuals are calculated.

Step 2: The individuals are sorted in descending order (or ascending order) of the evaluation values.

Step 3: The following steps are repeated as many times as a predetermined number of generations:

Step 4: Step 5 to follow is repeated as many times as determined:

Step 5: Mutation manipulation is performed for each of parent individuals predetermined based on the evaluation value order for generating a child individual, and the evaluation value of the change part is calculated and added to the evaluation value of the parent individual for providing the evaluation value of the child individual.

Step 6: The individuals are sorted in descending order of the evaluation values.

Step 7: The individual having the maximum evaluation value is output.

Assuming that C1, C2, C3, C4, and C5 are constants and that n is the number of elements of an optimization problem, each of steps 1 and 2 may be executed $C1 \times n$ times.

The number of repetitions of step 3 needs only to be C2×n.

The number of repetitions of step 4, which represents a mutation rate and is sufficiently smaller than n, may be C3×n. The number of repetitions of step 5, in which the operations are performed only on the changed part, is a predetermined number of times independent of n, C4 times. Step 6 may be performed C5×n times by using bucket son, etc.

As a result, the invention enables planning to be performed in only a number of processing times or a processing count in the order of $n^2$.

For example, the conventional method contains $n^3$ steps when one plan is made; if the steps are repeated $n^3$ times, a total of $n^6$ processing steps are required.

As a further example, in the above-mentioned document, an objective function E(i) representing an item to be optimized, that is, minimized or maximized is the total distance, and to minimize it, E(i) is defined as follows:

$$E(i) = \Sigma\Sigma\Sigma dab \cdot Vbc(i) \cdot (Vbc-1(i) + Vbc+1(i))$$

(first Σ denotes the total of a=1 to a=n, second Σ denotes the total of b=1 to b=n, and third Σ denotes the total of c=1 to c=n) where dij denotes the distance between points i and j and Vij denotes the probability of visiting point i at the jth time.

At least $n^3$ calculations are required to execute the operations of the expression.

Specifically, since $n^4$ terms exist in the example described in the document, an enormous number of calculations, namely $n^7$ calculations, are required; it is not practical to apply the technique described in the document to a plan problem in which n is 30 or more.

The fastest one of the conventional genetic algorithms makes a plan in the order of $n^3$ times.

A comparison is made with the genetic algorithm as follows:

Assume that solving an optimization problem having n=10,000 is tried using a computer that can execute $10^7$ instructions per second, namely, has a capability of 10 MIPS. Assuming that the number of processing steps of one individual in each means is 1,000, the processing time in the conventional fastest genetic algorithm, $T_{old}$, is at least $$\begin{aligned} T_{old} &= (1000 \times n^4)(10(MIPS)) \\ &= (10^3 \times 10^{16})/(10^7) \\ &= (10^{19})/(10^7) = 10^{12} \approx 30000(\text{years}) \end{aligned}$$

On the other hand, the processing time in the invention, $T_{new}$, is $$\begin{aligned} T_{new} &= (1000 \times n^2)/(100(MIPS)) \\ &= (10^3 \times 10^8)/(10^7) \\ &= (10^{11})/(10^7) = 10^4(\text{sec}) \approx 3(\text{hours}) \end{aligned}$$

Therefore, the processing time is shortened to $1/10^8$, that is, the processing can be speeded up; specifically processing can be performed a hundred million times faster than using the conventional fastest genetic algorithm.

This means that in addition to achieving substantial speeding up of calculations, if the allowable processing time is limited, the size of a problem that can be solved within the same time becomes dramatically large.

For example, assuming that the number of optimization objects that can be solved by the conventional method is $N_{old}$ and that the allowable time is 10,000 sec, $$\begin{aligned} N_{old} &= \sqrt[4]{(10000 \times 10^7/10^3)} \\ &= \sqrt[4]{(10^8)} = 100 \quad \left(\sqrt[4]{\phantom{x}} \text{ denotes the fourth root}\right) \end{aligned}$$

In contrast, the number of optimization objects that can be solved by the method of the invention, $N_{new}$, in the same time, is $$\begin{aligned} N_{new} &= \sqrt{(10000 \times 10^7/10^3)} \\ &= \sqrt{(10^8)} = 10000 \end{aligned}$$

That is, an optimization problem having 10000 elements can be solved in about three hours by the invention.

BRIEF DESCRIPTION OF THE DRAWINGS

In the accompanying drawings:

FIG. 5 is an illustration of mutation manipulation and a high-speed evaluation method;

FIG. 6 is an illustration of onefold propagation by mutation manipulation;

FIG. 7 is an illustration for a law in selection and dominant heredity;

FIG. 12 is an illustration of an application example of the present invention for a production planning system;

FIG. 23 is an illustration of gene manipulation (inversion) and planning evaluation;

FIG. 24 shows charts showing characteristics of an objective function value change;

FIG. 27 is an illustration of an application example of the invention to a production planning system;

FIG. 36 is an illustration of mutation manipulation;

FIG. 37 shows charts showing characteristics of objective function value changes;

FIG. 40 is a diagram of plan optimization by distributed cooperation processing;

FIG. 44 is an illustration of development situation, etc., of plan optimization;

DESCRIPTION OF THE PREFERRED EMBODIMENTS

Referring now to the accompanying drawings, there are shown preferred embodiments of the invention.

Figure 1:
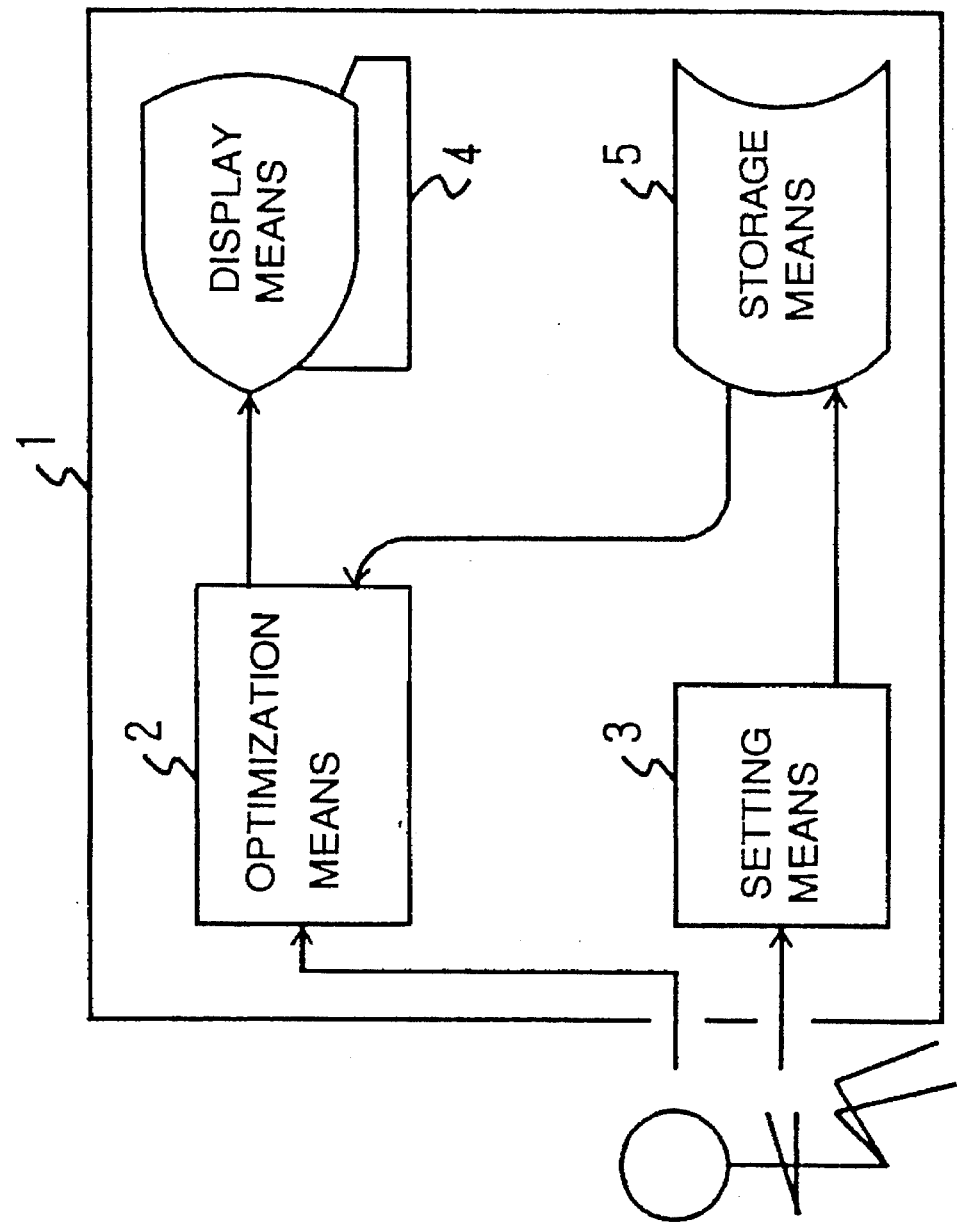
FIG. 1 is a block diagram showing the configuration of an optimization system according to a first embodiment of the invention.

FIG. 1 shows a configuration example of a genetic planning system 1, which will hereinafter be often called the optimization system, according to a first embodiment of the invention.

As in the example shown in FIG. 1, the planning system comprises optimization means 2, setting means 3, display means 4, and storage means 5.

The setting means 3 has at least a function of accepting a given planning problem, constants indicating parameters required for planning, etc., and can be provided by a keyboard, a mouse, etc., for example.

The optimization means 2, which is means for making an optimum plan, includes at least means for preparing an objective function representing the item to be minimized or maximized in a given planning problem and executing the steps described below to maximize or minimize the value of the objective function; it can be provided by electronic devices such as, for example, a CPU, ROM, which previously stores programs for performing predetermined processing, and RAM.

Processing performed by the optimization means is generally described for each step.

First, at step 1, objective function values for chromosomes, and as many plans as a predetermined number, which will be hereinafter called population, are calculated and the resultant values are used as evaluation values of the plans. The evaluation values are also called adaptability values.

Next, at step 2, the chromosomes are sorted in descending order of the evaluation values found by the calculation. In the present embodiment, a plan for maximizing the objective function is found, but a plan for minimizing the objective function can be found by making a small change such as using the inverse numbers of the objective function values of the chromosomes as the evaluation values; of course, it can also be found by sorting the chromosomes in ascending order, rather than descending order, of the evaluation values.

Step 3 is a control step for repeating steps 4 to 6 as many times as a given number of generations, namely, a given number of times.

Step 4 is a control step for repeating step 5 a predetermined number of times.

At step 5, some elements of a parent individual, or a part of a list of the elements of the parent individual selected in response to the ratio of the evaluation value of each individual to the total of the evaluation values of all individuals determined for each generation, is changed according to integer random numbers distributed uniformly within the individual length range (random numbers of integers 1 to 10 if the individual length is 10) for preparing a child individual, and the objective function value of the change part is calculated and added to the objective function value of the parent individual, thereby defining the evaluation value of the child individual.

Step 6 is executed after the termination of repetition processing at step 4, namely, for each generation change;

individuals of the parent group (a set of parent individuals) and child group (a set of child individuals) are sorted in descending order of the evaluation values of the individuals, to select as many individuals as the population.

At step 7, the individual having the largest evaluation value in processing of up to step 6, namely, a plan satisfying the plan object, is output.

The storage means 5 is means for storing at least a problem and constants used for optimization, given through the setting means 3; it is provided by a RAM, etc., for example.

The display means 4 displays information and necessary constants stored in the storage means 5 through the setting means 3, the processing result (planning result) of the optimization means 2, etc.; it can be provided by a liquid crystal display, EL display, CRT, etc.

Next, a processing procedure of the optimization means 2 will be described with reference to FIG. 2.

The processing executed by optimization means 2 comprises step A, corresponding to step 1, for evaluating all individuals; step B, corresponding to step 2, for sorting all individuals in descending order of the evaluation values; step C, corresponding to step 5, at which a parent individual previously stored in the storage means 3 is selected, a part of the parent individual or a list of the elements of the individual is changed to prepare a new individual, and the degree of change of the objective function value in the change part is calculated and added to the already found evaluation value of the parent individual, thereby defining the evaluation value of the child individual; step D, corresponding to step 5, at which the parent and child individuals are sorted in descending order of their evaluation values and as many individuals as the population are selected, a function of updating a repetition pointer PP so as to repeat step C C2×n times where, for example, C2 is the population and n is the number of planning elements, and a function of updating a repetition pointer gn so as to repeat step C C1×n times and step D C1 times where, for example, C1 is 20.

The operation of the first embodiment of the invention will be described in detail with reference to FIG. 3.

Figures 3, 4:
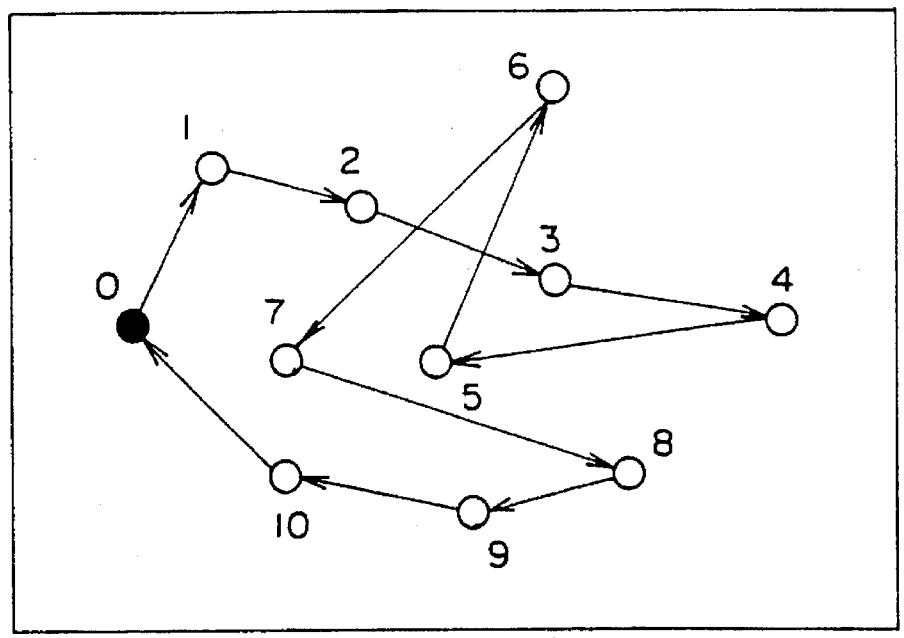
FIG. 3 is an illustration showing an example of setting planning information.
FIG. 4 is an illustration showing an example of setting distance information between cities in a travelling salesman problem.

FIG. 3 takes the so-called travelling salesman problem (TSP) as a planning problem example and shows a condition in which a problem given through the setting means 3 is set. (Such a condition may be displayed on the display means, for example.)

This problem is a problem in which, for example, the longest distance route is selected among routes on which a salesman departs from and returns to point 0:•, visiting points 1 to 10 each only once on the way (of course, the shortest distance route may be selected).

Here, the objective function is the total distance and the purpose of optimization is to make the longest distance, but the objective function may be any value, such as the total time required for the salesman to visit all points or the total energy consumed by means such as an automobile used for the salesman to visit all points.

To find the shortest distance, the inverse number of the longest distance, etc., may be used to solve the problem.

FIG. 4 shows information stored in the storage means 5 for defining distance D from point f to point t, (f, t), like a matrix. For example, the fact that the distance from point 1 to point 2 is $$D(1, 2)=17$$

can be known by making one retrieval.

The steps shown in FIG. 2 will be discussed in application to this problem.

The storage means 5 previously stores initial parent chromosomes each with numbers of 10 cities arranged at random, namely, 10 plans, as shown in the left side of FIG. 6.

At step A, the objective function, namely, the total distance of travelling route P(i) for individual i, F(P(i)), is calculated as follows:

$$F(P(i))=\Sigma D_{m \to m+1}$$

(where $\Sigma$ is an operator which means finding the total of m=1 to 10)

Assuming that i=1, $$P(1)=(1, 2, 3, 4, 5, 6, 7, 8, 9, 10)$$

from FIG. 6. Therefore, the objective function $$\begin{aligned} F(P(1)) &= D_{1 \to 2} + D_{2 \to 3} + D_{3 \to 4} + D_{4 \to 5} + D_{5 \to 6} + D_{6 \to 7} + \\ & \quad D_{7 \to 8} + D_{8 \to 9} + D_{9 \to 10} + D_{10 \to 11} \\ &= 17 + 23 + 27 + 41 + 34 + 45 + 43 + 12 + 22 + 24 \\ &= 288. \end{aligned}$$

However, the point • is set to 11 for convenience of the calculation in the invention. Likewise, the objective function values of P(2) to P(10), namely, the evaluation values of the individuals can be obtained. In FIG. 2, P(1)=24, P(2)=18, . . . , P(10)=13 for convenience of the description.

Next, at step B, the individuals are sorted in descending order of the evaluation values of the parent individuals contained in parent set PS1 of generation=1. As a result, as shown in FIG. 2, the parent individuals P(9), P(3), P(7), P(8), P(1), P(2), P(10), P(4), P(5), and P(6) are placed in a(1) to a(10), respectively, of work area array a(j) (j=1–20) in the storage means.

These steps A and B are steps for preprocessing of the optimization procedure.

Next, the conventional optimization processing involving the complicated and enormous procedure can be carried out by only executing steps C and D within an extremely short time, as described below.

Figure 11:
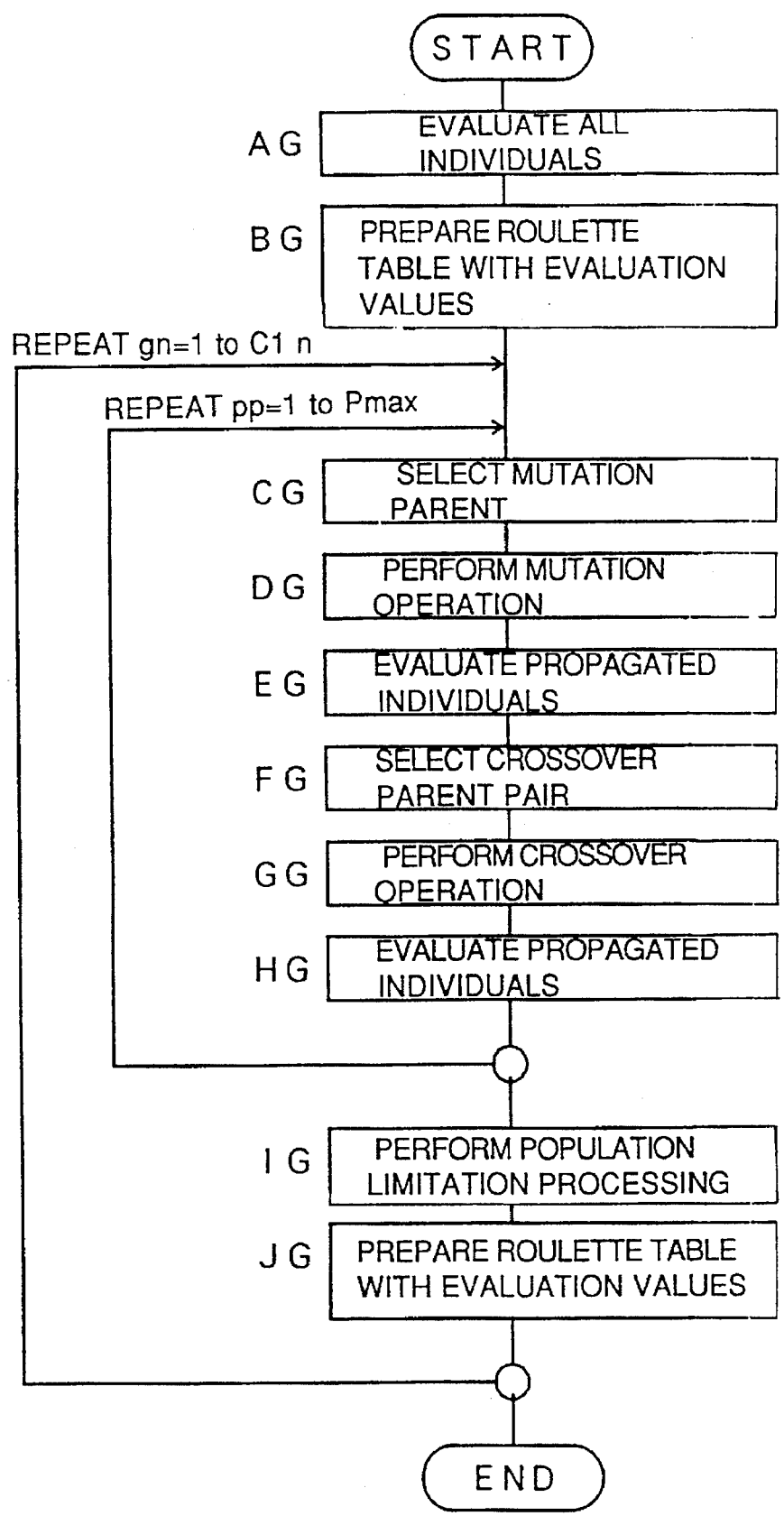
FIG. 11 is a flowchart of a processing procedure of a conventional genetic algorithm.

FIG. 11 shows a processing procedure of a conventional standard genetic algorithm.

The steps A and B correspond to steps AG and BG. The conventional method requires parent individual selection for simulating dominant hereditary evolution at step CG or FG and the selection is indispensable to characterize the genetic algorithm.

However, the selection requires a large number of processing steps and is one of the major factors hindering the genetic algorithm from being put into practical use.

In the invention, important characteristics have been found by examining the evolution theory and performing enormous information processing simulation. Resultantly, although the same result as the parent individual selection is produced, the number of processing steps is made zero, namely, the processing steps are made unnecessary.

FIG. 7 is an illustration of the important characteristics in natural selection and dominant heredity in the evolution theory.

Figure 2:
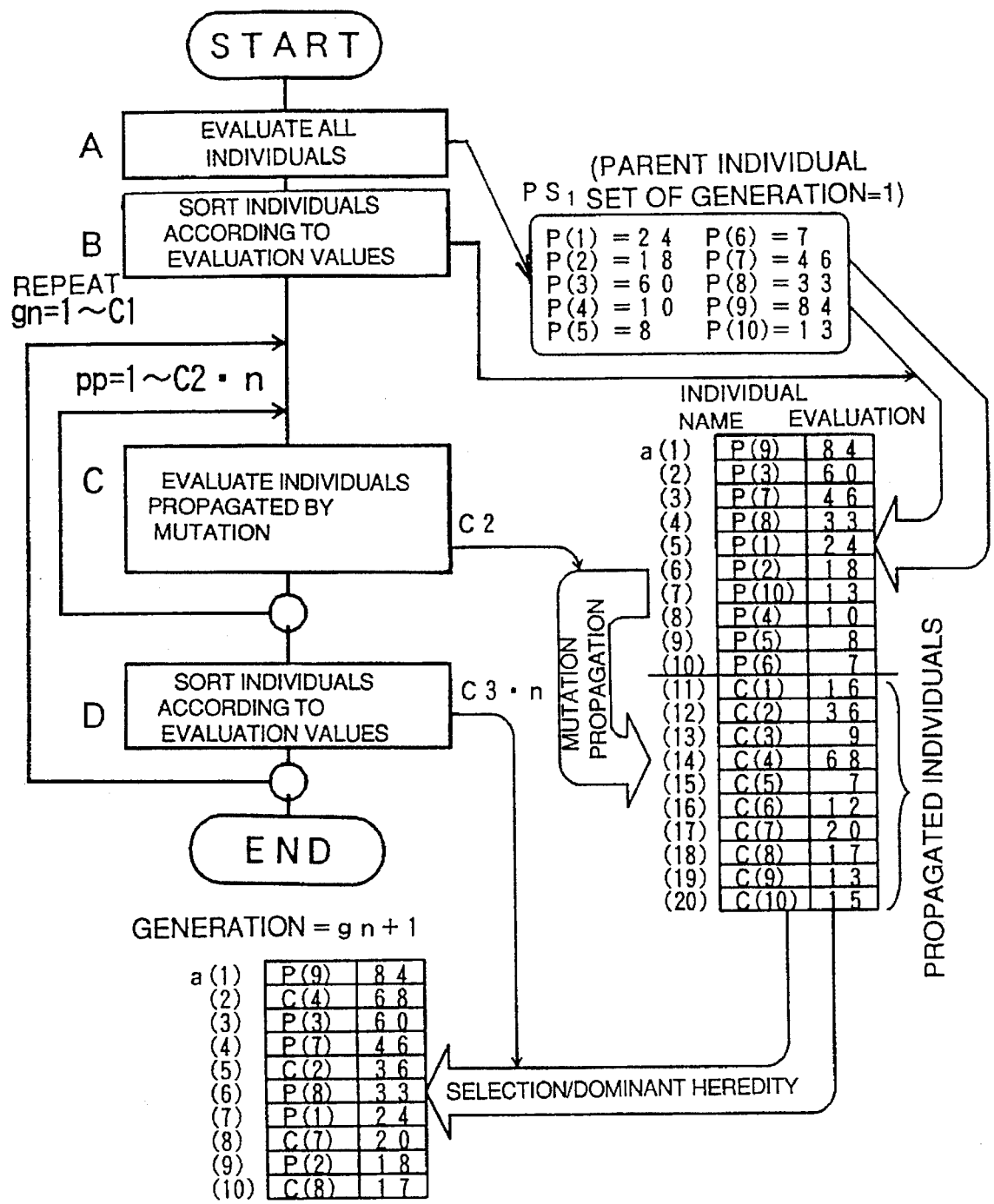
FIG. 2 is an illustration of a processing procedure for the optimization means.

The total of the evaluation values in the array elements a(1) to a(10) in the descending order of the evaluation values of generation=1 is Σa(i) (i=1–10)=303 from FIG. 2. The results of calculating the ratio of each evaluation value to the total 303 are shown in percentage (%) in FIG. 7.

Figure 8:
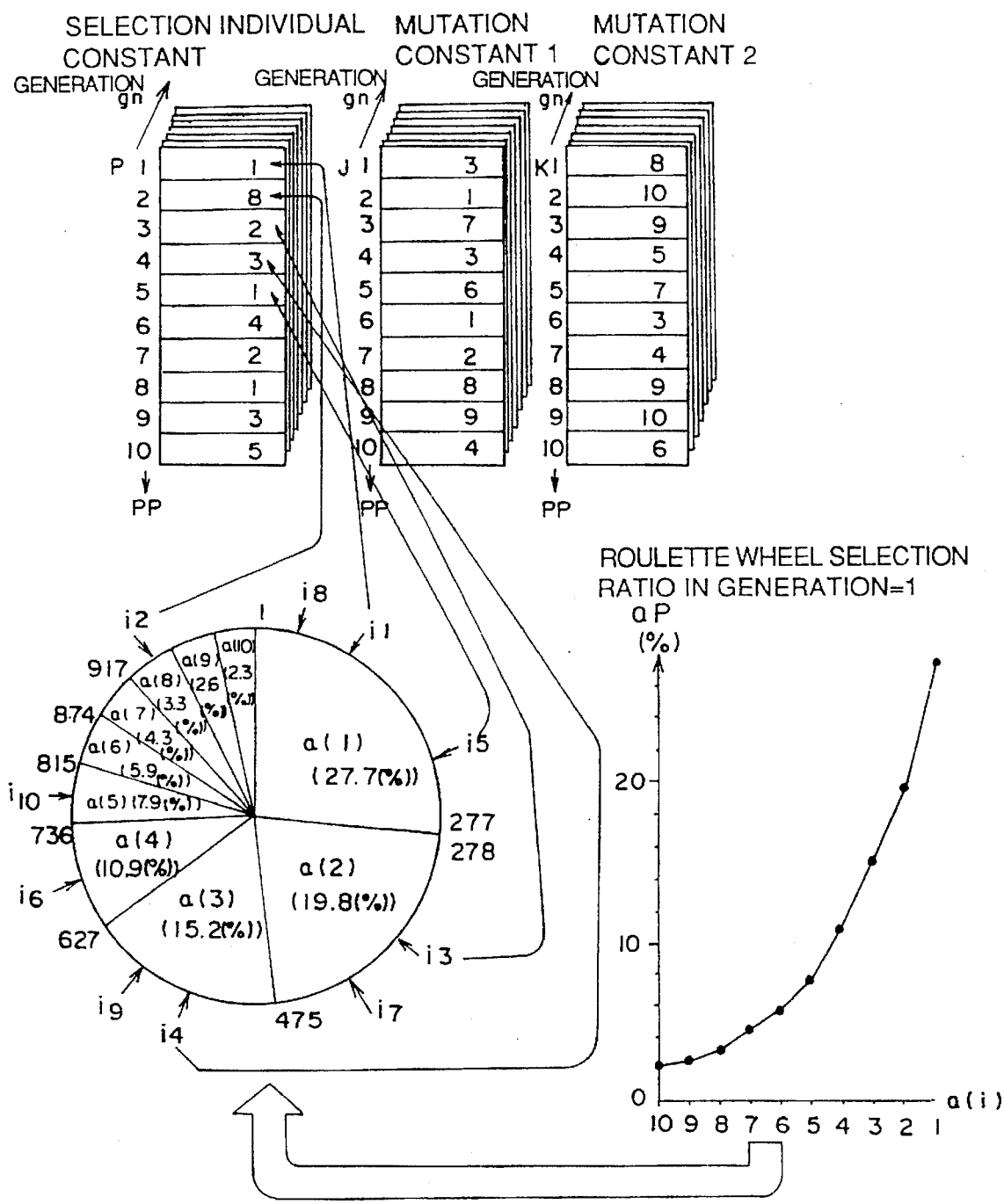
FIG. 8 is an illustration for ultra-fast processing by quantifying a natural law.

Shown in the lower right of FIG. 8 is a trend graph using a(i) to enter the horizontal axis and ap(i) of the evaluation values to enter the vertical axis. It approximates an exponential function having an exponent P(gn) determined by gn=generation, and can be represented by $$ap(i)=a(i)^{P(gn)}+C(gn) \quad (\char`\^ \text{ denotes exponentiation})$$

where C(gn) is a constant determined by generation gn.

Shown in the lower left of FIG. 8 is a pie chart for defining the "dominant degree" of each individual according to the ratio of the evaluation value to the total (%); it is called a "roulette wheel."

Since the mechanism of dominant heredity is that "the higher the adaptability of an individual to the environment to which the individual belongs, the higher the survival rate and descendant preservation rate," the probability that the individuals having the higher evaluation value percentage (%) will become parents of descendant generation may be raised.

For example, as shown in the lower left of FIG. 8, a segment of the roulette wheel with 0.1 (%) as the minimum gradation is defined, uniform integer random numbers corresponding to 1–1000 are produced, and the individual corresponding to the target place may be adopted as a parent.

The example shown in FIG. 8 assumes that the first produced integer random number is i1=88. Since it indicates the range of 1 to 277, namely, the inside of 27.7 (%) range, a(1) is selected as a parent individual. When the second produced integer random number is i2=925, the evaluation value percentage (%) of a(1) to a(7) is 91.7 and that of a(8) is 3.3 (%), thus a(8) is selected as a parent individual because it enters the range of 917 to 950 as gradations.

As many uniform integer random numbers as the number of parent individuals required for genetic manipulation are thus produced, and the roulette wheel is searched to determine parent individuals.

Even if such a roulette wheel is not provided, for example, plans are arranged in descending (or ascending) order of the objective function values and assigned selection numbers, and the plans of the selection numbers pointed to by as many predetermined constants (previously produced random numbers) as the population can be selected as parent plans.

FIG. 7 shows an evaluation value change of survival individuals when genetic manipulation is performed for generations 1 to 20. As seen in the graph shown in the lower left of FIG. 7, the evaluation values vary greatly in the initial generations, but vary moderately with the advance of generation and converge near the optimum value in generation 20.

The same data is plotted with the evaluation value percentage (%) on the graph shown in the lower right of FIG. 7.

From the graph, it is seen that the above-mentioned expression $$ap(i)=a(i)^{P(gn)}+C(gn) \quad (\char`\^ \text{ denotes exponentiation})$$

is satisfied.

In the travelling salesman problem, the optimization object of the embodiment, the positions and the number of cities were changed for statistical processing and analysis.

As a result, it is seen that P(gn) and C(gn) are affected by initial parent individuals and genetic manipulation, but "if the parameters of the initial individuals and the genetic manipulation procedure are fixed, they become the same".

That is, it indicates that "if optimization object and genetic manipulation are determined, parents dominantly selected for each generation are determined according to the evaluation value order." This means that roulette wheel preparation and production of uniform random numbers are not required each time in the course of planning and that the values can be predetermined. That is, the values may be predetermined and stored in the storage means.

Selection individual constant P(gn, pp) in FIG. 8 is saved in the storage means 5. (P(gn, pp) is a constant at processing count pp in generation gn where gn is generation 1–20 and pp is processing count pointer 1–10.) As shown in FIG. 8, in the embodiment, 10 uniform random numbers are provided for the roulette prepared according to the roulette wheel selection ratio for each generation, and the evaluation value order in the next generation is stored in P. That is, parent plans used as a base for child plan preparation are selected according to the predetermined constants.

These values need not be changed so long as the planning, objective function, and so on remain the same.

Next, processing at step C in FIG. 2 will be discussed. Step C is executed pp (population) times for each generation gn. In the embodiment, step C is executed 10 times because population=10.

Various types of genetic manipulation (operators) are available; they can be roughly classified into crossover, mutation, and inversion types.

The crossover is applied to at least two or more parent individuals for preparing child individuals having characteristics of the parent individuals.

This method has a feature of preparing individuals having reasonably good evaluation values by performing genetic manipulation for a very few number of individuals because the characteristics of the dominant parent individuals are effectively inherited, but is also at a disadvantage in that the evaluation values are not improved after constant evaluation values are reached because elements for improving the evaluation values are limited to the characteristics of the finite parent individuals in the same environment. Also, the crossover manipulation is complicated and all elements must be evaluated each time, thus one crossover manipulation and evaluation involve a large number of processing steps.

Therefore, the method may be put into practical use to make a plan having moderate optimality in a comparatively short time. In fact, it is often combined with another genetic manipulation or used only for an initial generation process in another optimization means.

On the other hand, the mutation and inversion are manipulation of changing a part of one parent individual or an arrangement of genes (corresponding to the planning elements) of one parent individual. Unlike the crossover, the methods can search for all feasible solutions, but are at a disadvantage in that the convergence speed on an optimum solution varies depending on variations in the evaluation values of initial individuals.

Since the invention is intended for solving actual problems at high speed, the following means is used: (The following genetic manipulation is considered as one type of mutation, but can also be performed in the same concept by inversion.)

FIG. 5 illustrates application of processing at step C in FIG. 2 to the travelling salesman problem.

Parent individual P(1) selected by the above-mentioned method is $P(1)=(1, 2, 3, 4, 5, 6, 7, 8, 9, 10)$.

The evaluation value is $$F(P(1))=288$$

as described above.

Next, two types of integer random numbers J and K distributed uniformly in the range of 1 to 10 are produced. At the time, $J \neq K$.

Next, the Jth and Kth elements in the element list of P(1) are replaced with each other for preparing a new child individual. Assuming that J=3 and K=8, $$C(1)=(1, 2, 8, 4, 5, 6, 7, 3, 9, 10).$$

The evaluation value of C(1) is $$\begin{aligned} C(1) &= D_{1 \to 2} + D_{2 \to 8} + D_{8 \to 4} + D_{4 \to 5} + D_{5 \to 6} + D_{6 \to 7} + \\ &\quad D_{7 \to 3} + D_{3 \to 9} + D_{9 \to 10} + D_{10 \to 11} \\ &= 17 + 45 + 24 + 41 + 34 + 45 + 32 + 27 + 22 + 24 \\ &= 311. \end{aligned}$$

Here, evaluation of the child individual is described according to a method of totaling the distances of all routes between travelling cities.

The second device in the invention lies in that the step required for the evaluation process is executed independently of the number of planning elements, n.

In the description given above, summation needs to be executed at least n times. If the number of points is 10,000 or more, 10,000 or more calculations are required each time a child individual is prepared.

However, as seen in FIG. 5, only two points are changed by executing the mutation. To obtain the evaluation value of C(1), not all route distances need to be totaled and calculation needs to carried out again only for the routes changed in P(1). That is, $$\begin{aligned} F(C(1)) &= F(P(1)) - \Sigma(\text{distances of deleted routes}) + \\ &\quad \Sigma(\text{distances of added routes}) \\ &= F(P(1)) - (D_{2 \to 3} + D_{3 \to 4} + D_{7 \to 8} + D_{8 \to 9}) + \\ &\quad (D_{2 \to 8} + D_{8 \to 4} + D_{7 \to 3} + D_{3 \to 9}) \\ &= 288 - (23 + 27 + 43 + 12) \\ &= 288 - 105 + 128 \\ &= 311. \end{aligned}$$

Extra calculations canceled are not executed.

The processing will be described using mutation constants J(gn, pp) and K(gn, pp) preset in the storage means 5 shown in FIG. 8. J(gn, pp) and K(gn, pp) are the ppth (pp is a mutation manipulation count (mutation rate)) mutation constants in generation gn (gn is a generation pointer).

Parent individual P(gn, pp) is selected by the above-mentioned method and its evaluation value F(P(gn, pp)) is found. Here, assuming that $$j=J(gn, pp)$$

$$k=K(gn, pp)$$

the evaluation value of child individual C(gn, pp) prepared from P(gn, pp) is $$F(C(gn, pp))=F(P(gn, pp))-(D_{j-1 \to j}+D_{j \to j+1}+D_{k-1 \to k}+D_{k \to k+1})+ \\ (D_{j-1 \to k}+D_{k \to j+1}+D_{k-1 \to j}+D_{j \to k+1}).$$

That is, the objective function value is calculated by performing only eight additions and subtractions in total, independently of the number of optimization objects, n.

In inversion, one place is changed and in a concept similar to that described above, only four additions and subtractions are required in total.

FIG. 6 shows chromosomes of child individuals (child chromosomes) propagated when the above-mentioned genetic manipulation is performed using J and K.

Evaluation of each individual is executed at very high speed in a given number of steps, namely, in given processing time regardless of the number of chromosome elements, as described above.

Next, step D is executed each time generation gn is changed. The parent individuals and child individuals are sorted in descending order of their evaluation values and as many individuals as the population are selected, that is, a parent individual set in generation gn+1 is prepared.

The number of steps executed for such processing can be at most C×n or less by using bucket sort, etc.

Thus, in the present embodiment, the individual, namely, the plan having the greatest evaluation value in the parent individual set prepared at the completion of processing of up to generation 20 is output as an optimum solution. The processing result can be output to the display means such as CRT for observing it whenever necessary.

Figure 9:
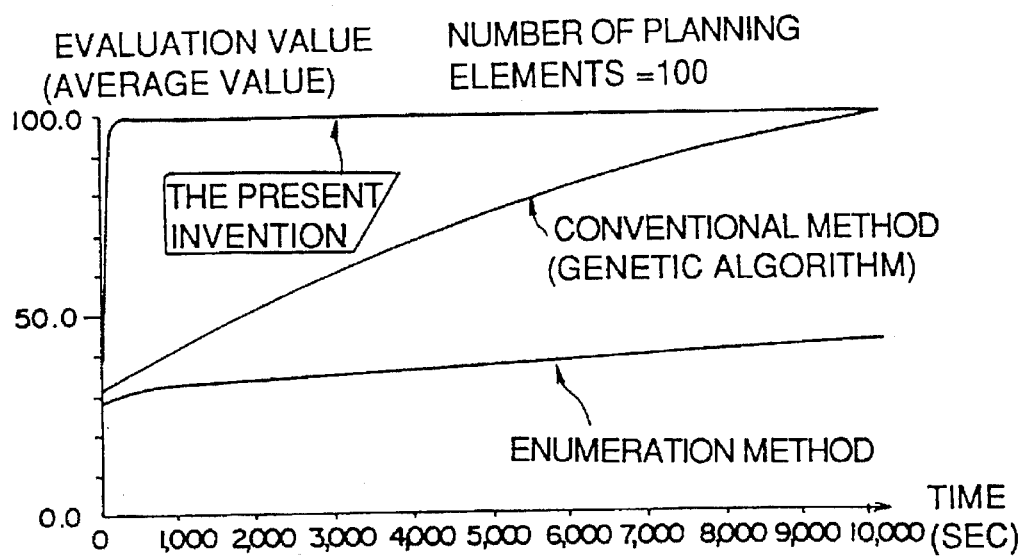
FIG. 9 is a graph representing the relationship between evaluation values and processing time.

FIG. 9 shows the processing performance experiment result when the number of planning elements is 100.

A computer having a throughput of 100 MIPS (that can perform $10^8$ operations per second) is used to find an optimum solution to a problem in which the optimum value is previously known as 100.0. In FIG. 9, the result is plotted indicating how the evaluation value changes with the time change by using the processing time to enter the horizontal axis and the average of the evaluation values of all individuals to enter the vertical axis.

As optimization means, the conventional standard genetic algorithm and the enumeration method (random search method) which changes plans at random and leaves the plan near an optimum value as an optimization candidate are used in addition to the optimization means of the invention for comparison.

Since the number of optimization objects n is 100, the processing count order for n in the invention required to find a solution having desired optimality, such as an evaluation value of 99.0% or more of an optimum solution, O(n), is $$O(n)=C1 \times n^2$$

where C1 is the number of computer processing steps required for one mutation and repetition process, in the embodiment, $C1=10^4$.

On the other hand, the conventional standard genetic algorithm having the processing procedure shown in FIG. 11 contains processing such as crossover and evaluation involving $n^2$–$n^3$ processing steps in double nesting of the loops of generation repetition and population repetition. Therefore, the processing count order is $$O(n)=C2 \times n^4$$

where $C2=C1=10^4$.

For the enumeration method (random search method), which depends on the search method, the extent of the practical finite processing count or processing time required for finding of an optimum solution or a solution having defined optimality is not known for certain.

When planning is executed by the methods or the above assumptions, a solution can be found in a mere second or so in the invention, but it takes the processing time of 10,000 seconds to find a solution of the same degree in the conventional genetic algorithm, as shown in FIG. 9.

In enumeration method (random access method) processing, it is extremely difficult to find a solution having desired optimality within a practical finite time under the usual conditions.

Figure 10:
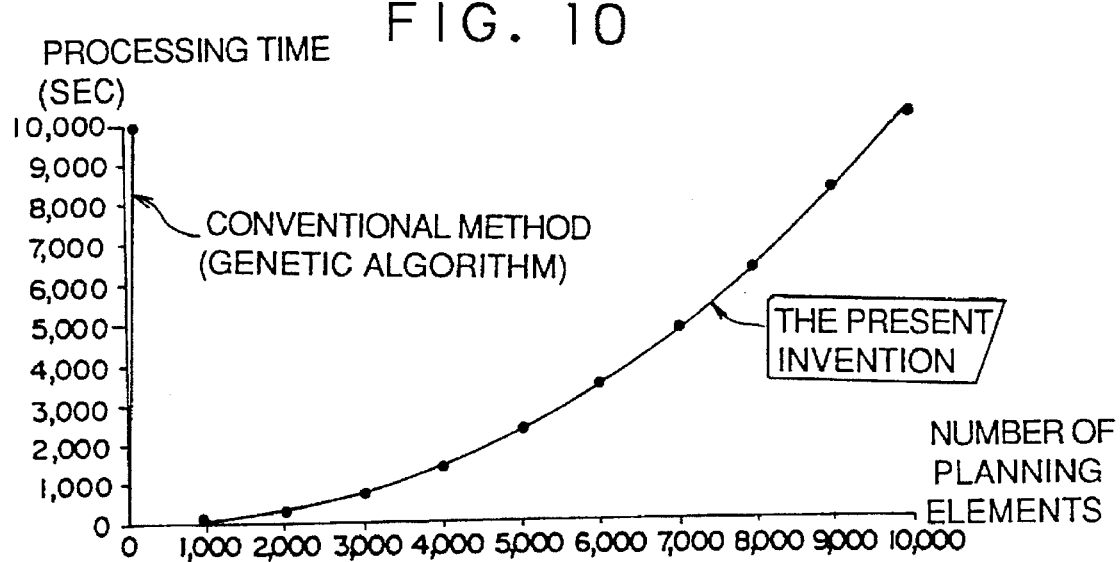
FIG. 10 is a graph representing the relationship between processing time and the number of planning elements.

On the other hand, in FIG. 10, the time taken until a quasi-optimum solution is found is plotted by using the number of planning elements, n, to enter the horizontal axis.

As seen in the figure, the conventional genetic algorithm requires the processing time of 10,000 seconds when the number of planning elements, n, is 100, and is hard to find an effective solution for problems having a greater value than n.

In contrast, according to the invention, even if a small computer having 100 MIPS or so is used, a solution can be found within the processing time of 10,000 seconds ≈3 hours or less.

Further, if a fast computer having the operation speed of 10 TMIPS (TMIPS is short for TM instructions per second, meaning that $10^{10}$ operations are performed for one second) is used, planning is enabled for n=100 or so in (processing time (sec))=(number of steps required for optimization)/(steps that can be executed for one second)

$= (C1 \times n^2)/(10(TMIPS))$ $= (10^3 \times (10000)^2)/(10^{10})$ $= 10^{11}/10^{10}$ $= 10$ (sec).

Conversely, if the time of 10000 sec is given, the expression is modified to calculate the number of possible planning elements, n, as follows:

$n = \sqrt{((\text{processing time(sec)}) \times (10(TMIPS))/C1)}$ $= \sqrt{(10^4 \times 10^{10}/10^4)}$ $= \sqrt{(10^{10})} = 10^5$.

That is, a plan having 100,000 planning elements can be made in three hours. This means that the method according to the invention has the capability of solving very difficult plan problems, such as pattern design on electronic wiring boards.

FIG. 12 shows an example of applying the invention to production plan optimization very much needed in the manufacturing industry.

The example is a problem example of making a plan for efficiently performing six types of jobs 1-6 in production facility A. Since one facility is available, the setup time such as tool exchange, cleaning, and NC work parameter setting is required when the jobs are changed, as shown in FIG. 12.

The plan becomes the same as the "travelling salesman problem" if the jobs are related to the travelling points, the setup time is related to the distance between the travelling points, and the total job time is adopted as the objective function for minimizing (or maximizing) it.

Although the maximum objective function value is found in the above-given example, the minimum objective function value can be easily found by making the roulette wheel table values inverse and sorting in the ascending order rather than the descending order.

Then, the planning corresponds completely to the travelling salesman problem. It is equivalent to minimizing the total setup time. The total setup time of parent individual P(1) having the best evaluation value in the initial parent individual set, which was 77 minutes, is shortened to 39 minutes by the system according to the invention; the total job time is shortened by 50%.

The number of facilities installed in an actual large-scaled factory is several hundreds and the number of jobs is several thousands to several ten thousands a month. FIG. 10 indicates that a practical optimum solution can be found in very short time. The larger the production facility scale, the more powerful the effect of the invention.

The invention can be applied to the following planning problems similar to the embodiment:

(1) Delivery plan, such as a problem of minimizing the total delivery time required when a driver stops at predetermined delivery points for delivering goods by delivery truck; (2) vehicle distribution plan, such as a problem of minimizing the time taken until completion of distribution of all vehicles to predetermined points when vehicles held in one point are distributed; (3) rolling plan in ironworks, such as a problem of minimizing the setup time in each of the rolling steps; (4) plan for coming and going of articles in an automatic warehouse, such as a problem of minimizing the total of crane travelling distances when articles, etc., are entered in and taken out from the warehouse by a stacker crane or the like; (5) material pattern plan, such as a problem of minimizing the remaining amount of material when a predetermined pattern is made of a given material (material and pattern forms include a plane, cube, etc.).

Figure 13:
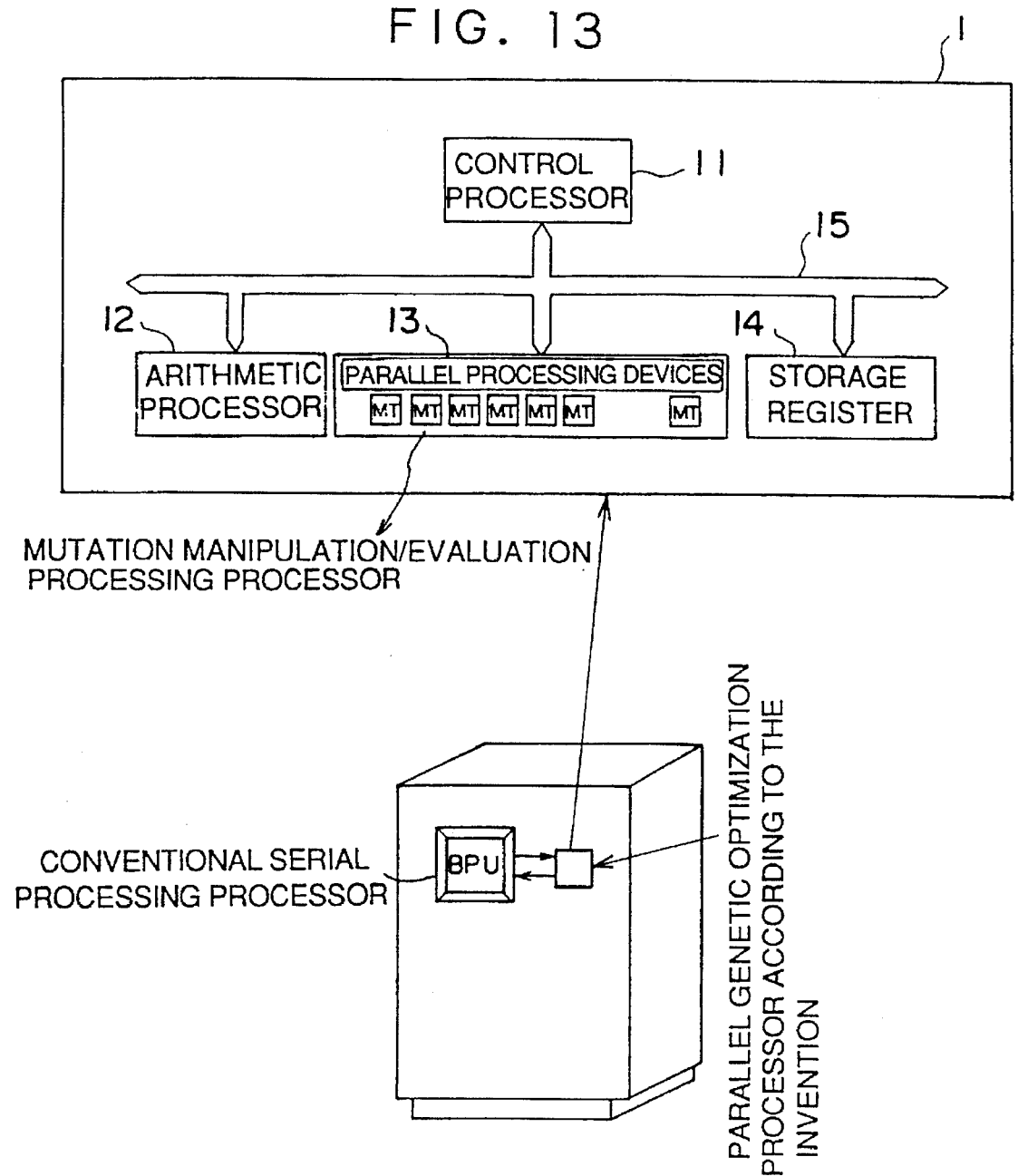
FIG. 13 is a block diagram showing the hardware configuration according to the present invention.

FIG. 13 shows an example of the hardware configuration according to the invention.

The hardware comprises a control processor 11 for controlling a processing flow to solve a planning problem, an arithmetic processor 12 for performing operations such as addition, subtraction, multiplication, and division, parallel processing devices 13, provided to a maximum of as many as the population for performing mutation manipulation and evaluation for parent individuals at the same time, and a storage register 14 for storing constants of P, J, K, etc., mentioned above. These components are connected by a bus line 15.

The control processor 11, the arithmetic processor 12, and the parallel processing devices 13 are provided, for example, by CPU, ROM, RAM, CMOS, TTL, and programs stored in ROM. The storage register 14 is provided, for example, by a RAM.

Therefore, the system according to the invention is built in a conventional serial processing processor as a sub CPU (processor) and when it is necessary to solve a plan problem of finding a permutation combination pattern giving an optimum value from among an enormous number of combinations or permutations, the sub CPU is started for solving the problem.

Thus, processing performance or throughput in solving the plan problem is furthermore improved.

Next, a second embodiment of the invention will be described in detail with reference to the accompanying drawings.

Figure 14:
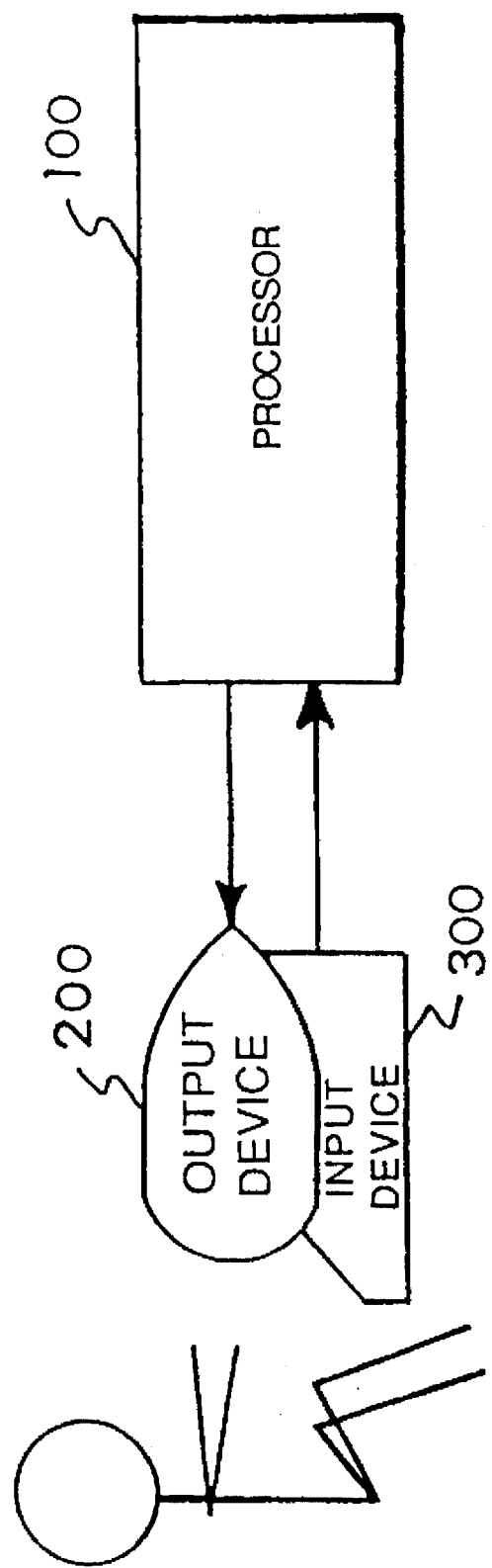
FIG. 14 is a block diagram showing the configuration of a planning system according to a second embodiment of the invention.

FIG. 14 shows a configuration example of a planning system according to the second embodiment of the invention.

The planning system comprises a processor 100, an output device 200, and an input device 300.

The input device 300 has at least a function of accepting a given planning problem, constants indicating parameters required for planning, etc., and can be provided by a keyboard, a mouse, etc., for example.

The processor 100, which is means for making an optimum plan for design, control, diagnosis, etc., includes at least means for preparing an objective function representing the item to be minimized or maximized in a given planning problem and executing the steps described below to maximize or minimize the value of the objective function; it can be provided by, for example, CPU, ROM, RAM, communication controller, data bus, etc.

Processing performed by the processor 100 will be described.

Step 0 is a step for controlling so as to repeat steps 1 to $4 n^2/Pn$ times (n is the number of planning elements and Pn is the number of cell processors).

Step 1: A plurality of cell processors perform steps 2 and 3 concurrently.

Step 2: The contents of an assigned plan, for example, a list of elements making up the plan, are changed, and a difference between the objective function values of both the preceding and current plans produced by the change is found.

Step 3: The objective function value difference found in step 2 is compared with a predetermined value. If the already assigned plan is superior to the currently formed plan, namely, if the objective function value difference is not within the predetermined value, the assigned plan is adopted as an optimum plan candidate intact.

In contrast, if the currently formed plan is superior to the already assigned plan, namely, if the objective function value difference is within the predetermined value, the currently formed plan is adopted as an optimum plan candidate.

Step 4: The optimum solution candidates are assigned to the cell processors in response to the ratio of the objective function value of each optimum solution candidate, for example, greater objective function value for maximization or smaller objective function value for minimization, to the total of the objective function values of Pn optimum solution candidates found in steps 2 and 3.

Step 5: The plan having the greatest (or smallest) objective function value is defined as the optimum plan.

The output device 200 is means for displaying the determined optimum plan, necessary variables and constants, etc.; it can be provided by CRT, a liquid crystal display, EL display, etc., for example.

Figure 15:
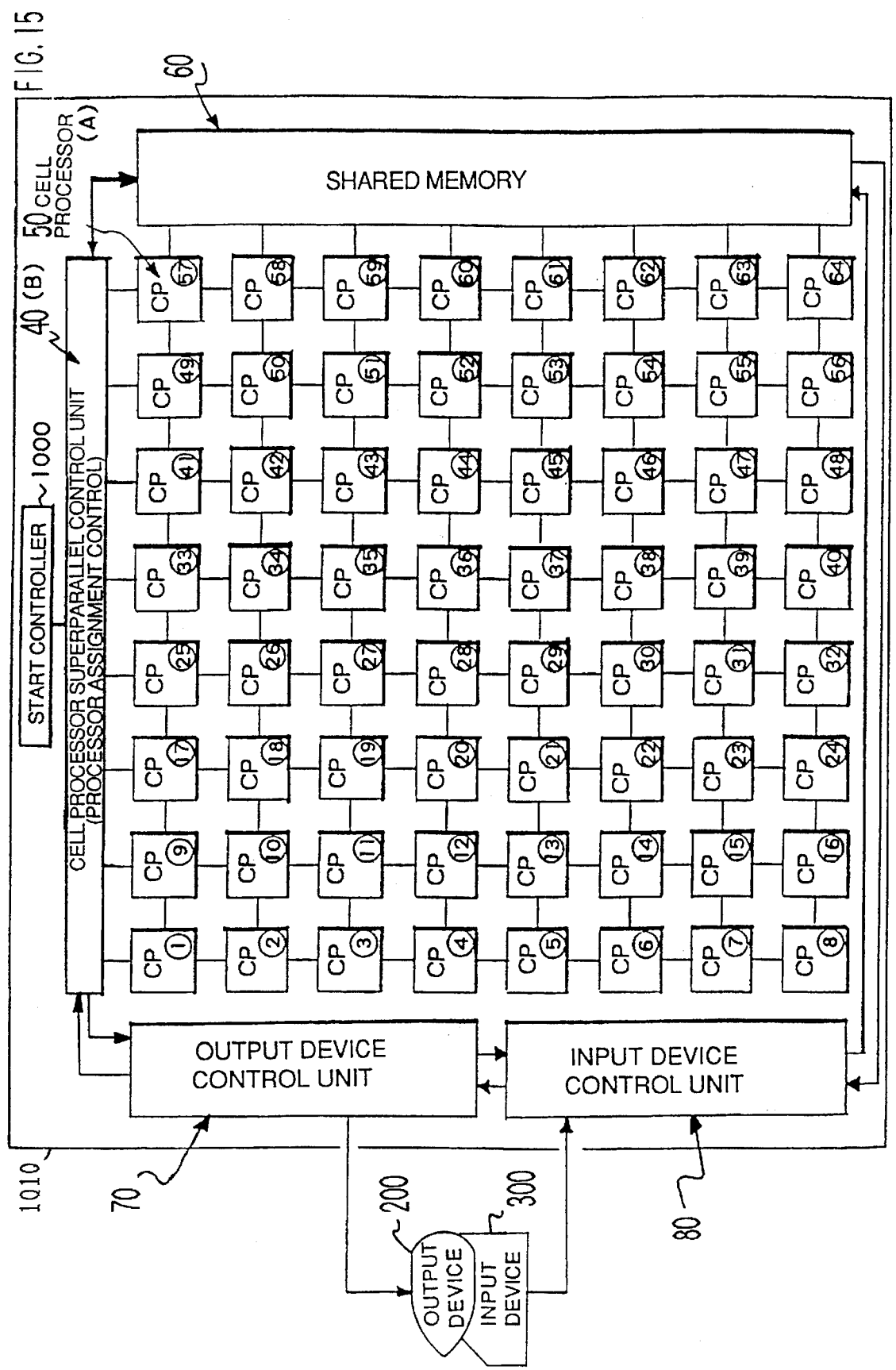
FIG. 15 is a block diagram showing the configuration of a processor according to the second embodiment of the invention.

Next, FIG. 15 shows a configuration example of the processor 1010.

The processor 1010 comprises an input device control unit 80 being connected to the input device 300 for reading input information, an output device control unit 70 being connected to the output device 200 for outputting output information, a shared memory 60 for storing constants or variables, a cell processor superparallel control unit 40 for controlling the entire processor 1010, a plurality of cell processors 50 being connected to the shared memory 60 and the cell processor superparallel control unit 40 and capable of executing their respective processing at the same time, and a start controller 1000 for starting the cell processors 50 and the cell processor superparallel control unit 40 a predetermined number of times.

The start controller 1000, the cell processors 50, the input device control unit 80, the output device control unit 70, and the cell processor superparallel control unit 40 can be provided, for example, by CPU, ROM, RAM, etc. The shared memory 60 can be provided by RAM, etc., for example.

The embodiment includes 64 cell processors 50, but the number of the cell processors can be increased or decreased in response to required throughput.

Figure 16:
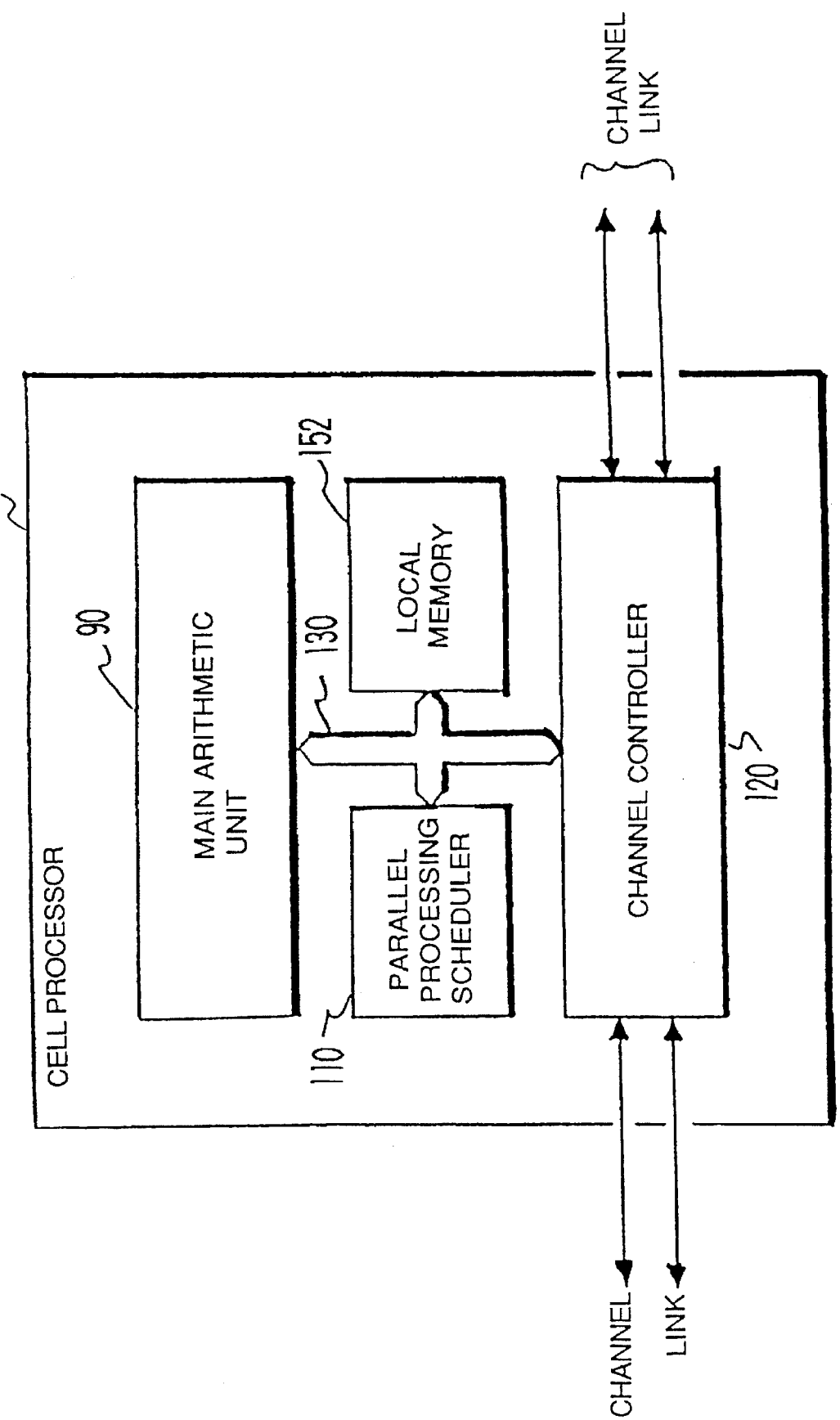
FIG. 16 is a block diagram showing the configuration of a cell processor.

FIG. 16 shows a configuration example of the cell processor 50.

The cell processor 50 comprises a main arithmetic unit (CPU) 90 for performing processing such as integer operations and real operations, a local memory 152 used in the cell processor, a parallel processing scheduler 110 for synchronizing the cell processor with processing of other cell processors, a channel controller 120 for synchronizing information transfer and processing timing with the shared memory 60 and the cell processor superparallel control unit 40, and a bus feature 130 for connecting the main arithmetic unit 90, the local memory 152, the parallel processing scheduler 110, and the channel controller 120.

The main arithmetic unit 90 can be provided by a CPU, the local memory 152 by a RAM, and the parallel processing scheduler 110 and the channel controller 120 by CMOS devices, etc., for example.

Figure 17:
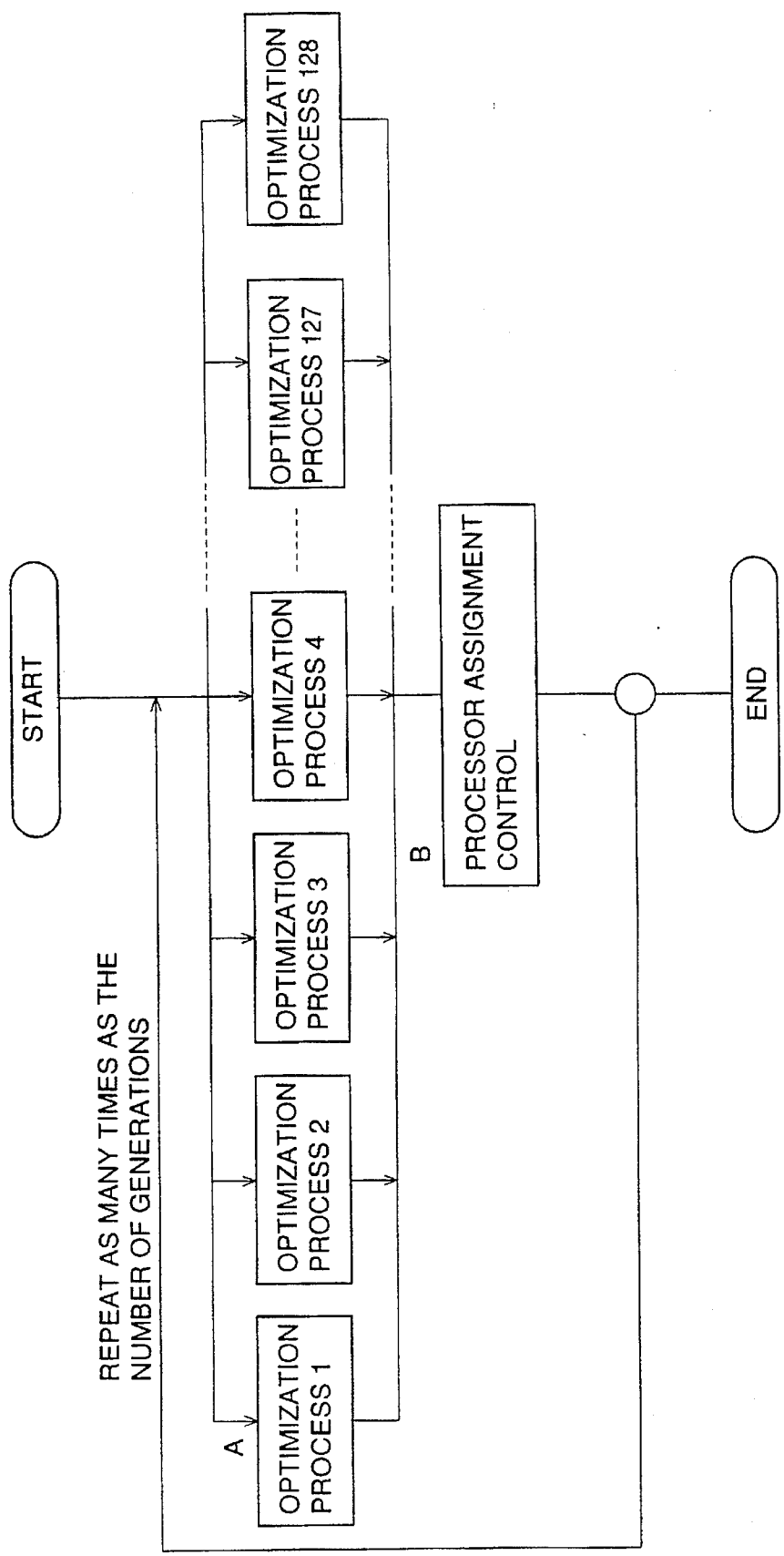
FIG. 17 is a flowchart of a processing procedure for the processor shown in FIG. 15.

FIG. 17 shows a flowchart for illustrating processing of the processor 100.

The processor 100 repeats an optimization process A performed in parallel at the same time and a processor assignment control process B a predetermined number of times (the number of generations): in process A, a given plan for each cell processor is changed by a predetermined operation and an objective function value difference between the given plan and a new plan formed by the change is found. If the new plan is superior to the given plan, it is adopted as an optimum plan candidate; otherwise, the given plan is adopted as an optimum plan candidate. In process B, plans to be processed by the cell processors in the next generation are assigned in response to the objective function values of the optimum plan candidates.

Here, assuming that the number of plan objects is n and that the number of cell processors is Pn, the number of generations is $(n^2/Pn)$. Therefore, if number of the cell processors is set to the number of plan objects, n, the number of generations becomes $n^2/n=n$.

The operation of the second embodiment of the invention will be described in detail with reference to the accompanying drawings including FIGS. 3 and 4.

FIG. 3 takes the so-called travelling salesman problem as a plan problem example and shows a condition in which a problem given through the input device 300 is set (such a condition may be displayed on the output device 200, for example).

This problem is a problem in which, for example, the longest distance route is selected among routes on which a salesman departs from and returns to point 0:• after visiting points 1 to 10 each only once along the way.

Here, the objective function is the total distance and the purpose of optimization is to make the longest distance, but it may be to make the shortest distance, and the objective function may be the total time required for the salesman to visit all points, the total energy consumed by means such as an automobile used for the salesman to visit all points, or the like, needless to say.

The setup visit order is represented by vector X as follows:

X=(1, 2, 3, 4, 5, 6, 7, 8, 9, 10).

Assume that the distance between the points is predetermined as shown in FIG. 4.

Here, the shared memory 60 stores distance matrix D(f, t) from point f to t (f and t are each a number from 0 to 10). (See FIG. 4.)

Figure 19:
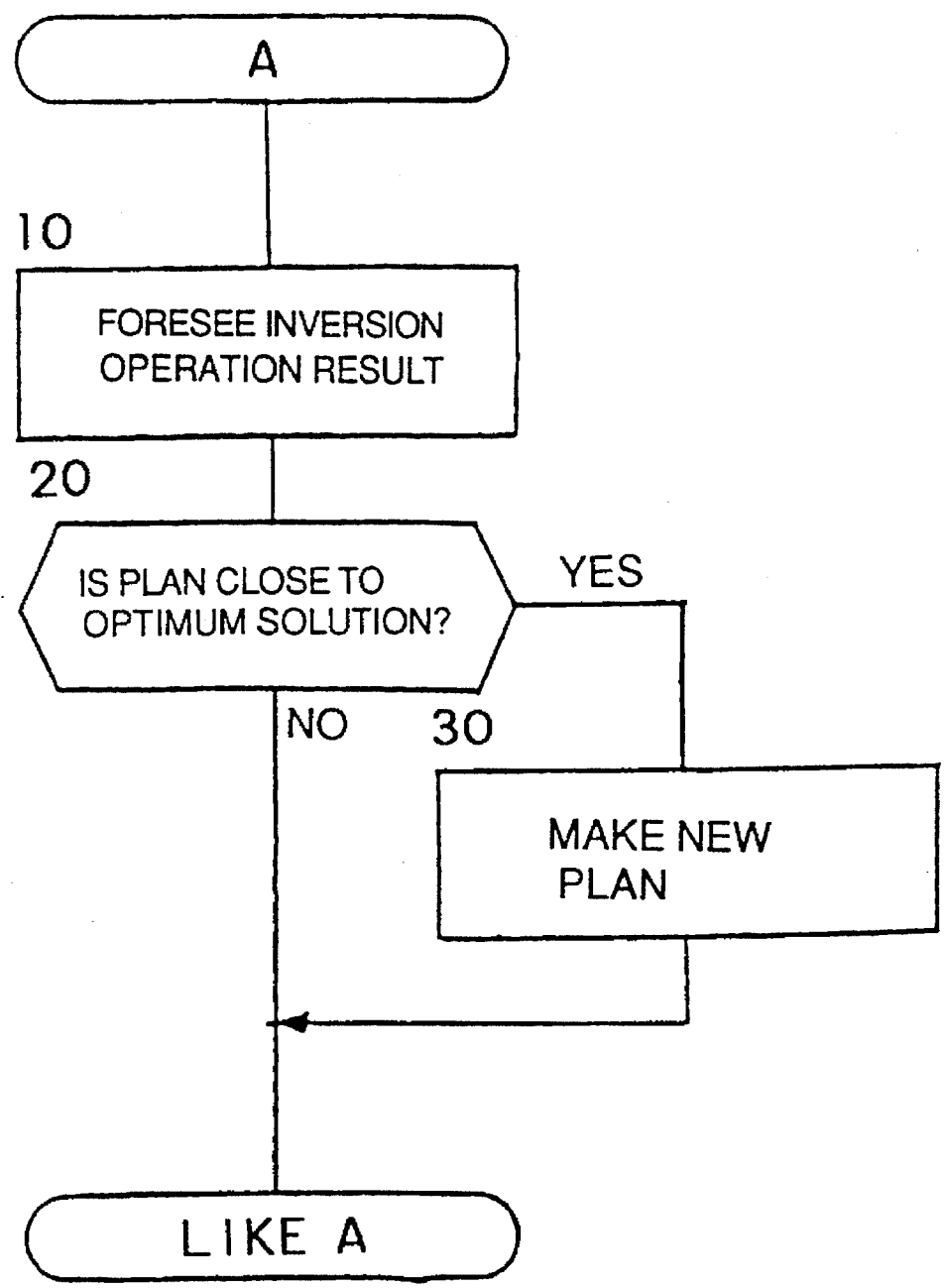
FIG. 19 is a flowchart of a processing procedure of the cell processor.

FIG. 23 illustrates the process at step A shown in FIG. 19, the primary device of the invention.

The concept of planning is to partially change a list of elements of plan X; this operation is called as "perturbation" in the specification; this operation corresponds to inversion of gene manipulation.

For example, the element list contained in the range of j=3rd to k=8th elements making up the vector X is inverted and sorted. At the time, j and k are random numbers satisfying the conditions j<k and $1 \leq j, k \leq 10$ and distributed uniformly in the range.

The operation changes the plan to a new plan Y

Y=(1, 2, 8, 7, 6, 5, 4, 3, 9, 10).

Next, assume that the objective function of one plan A is F(A). Here, the objective function value is the total distance. Therefore, if the point • is set to 11 for convenience of the calculation, $F(X) = \Sigma D_{m \to m+1}$ (where $\Sigma$ is an operator which means finding the total of m=1 to 10)

$$\begin{aligned} &= D_{1 \to 2} + D_{2 \to 3} + D_{3 \to 4} + D_{4 \to 5} + D_{5 \to 6} + D_{6 \to 7} + \\ &\quad D_{7 \to 8} + D_{8 \to 9} + D_{9 \to 10} + D_{10 \to 11} \\ &= 17 + 23 + 27 + 41 + 34 + 45 + 43 + 12 + 22 + 24 \\ &= 288. \end{aligned}$$

Likewise, $$\begin{aligned} F(Y) &= D_{1 \to 2} + D_{2 \to 8} + D_{8 \to 7} + D_{7 \to 6} + D_{6 \to 5} + D_{5 \to 4} + \\ &\quad D_{4 \to 3} + D_{3 \to 9} + D_{9 \to 10} + D_{10 \to 11} \\ &= 17 + 45 + 43 + 45 + 34 + 41 + 27 + 27 + 22 + 24 \\ &= 325. \end{aligned}$$

As seen in FIG. 23, Y is longer than X through intuition. Here, if the objective function value difference between X and Y, $\Delta Fxy$, is defined as $\Delta Fxy = F(Y) - F(X)$ $\Delta Fxy = 325 - 288$ $= 37$ Next, FIG. 24 shows the characteristics of objective function value change found out in the invention. In the upper stage of FIG. 24, plan order vector X(i), which is defined every planning count i, is used to enter the horizontal axis and its objective function values are used to enter the vertical axis.

The plan order vector list is changed little by little and the objective function values are compared for properly replacing with a plan order vector close to the optimum solution.

As seen in the figure, even if the maximum or minimum point like X(i) (in the embodiment, the minimum point) results, the transition to the next vector is made and planning is executed a sufficient number of times, then optimum vector $X_{opt}$ is reached.

Thus, a new plan "Xi+1" is made each time and its objective function value F(Xi+1) is calculated and compared with the objective function value F(Xi) of the preceding plan Xi for adopting the smaller or greater one as an optimum plan candidate. However, as the number of plan objects n increases, the method takes enormous processing time in making new plans and calculating the objective function values.

To solve such a problem, in the invention, characteristics eliminating the need for making a new plan for each planning step is found from the plan problem characteristics.

In the lower stage of FIG. 24, the plan order vector X(i) is used to enter the horizontal axis and the derivative value $\Delta F(Xi)$ of the objective function F(Xi) for Xi is used to enter the vertical axis.

That is, $\Delta F(Xi) = dF(Xi)/dXi = F(Xi+1) - F(Xi)$.

This represents the objective function difference value every planning count i. If the objective function value of new plan "Xi+1" becomes that of the preceding plan Xi, the value becomes negative; otherwise, it becomes zero or positive.

As shown in the figure, the objective function value difference change corresponds to F(Xi), but the waveform becomes similar to damped vibration with zero as the center, namely, a waveform where the period changes while the amplitude is made smaller.

According to a strict computer experiment, such a waveform results regardless of the problem contents in general plan problems. When Xi is considered as the time of day, the damping degree of the amplitude becomes analog to, for example, $C/\log(i+2)$ (in the embodiment, C=100)

where log represents a natural logarithm.

This indicates that even when $\Delta F$ becomes positive, namely, the objective function value of the new plan becomes inferior to that of the preceding plan (increases in a minimization problem or decreases in a maximization problem), if it is less than $C/\log(i+2)$, an optimum solution is always reached in plan order vector Xi corresponding to sufficiently large i by replacing the new plan with an optimum solution candidate.

This characteristic contributes greatly to improvement in the optimization throughput, because the need for making all new plans and calculating objective function values for the new plans for each repetition of planning is eliminated and a plan is simply partially changed, namely, a part of the element list is changed, and only the changed part needs to be examined.

Thus, how the objective function values change can be examined independently of the number of plan elements for optimization, n; a plan problem can be solved at high speed.

This point will be discussed with reference to a specific example.

The first device for optimization lies in the calculation method of ΔFxy. In the example shown in FIG. 3, all of $$F(X)=\Sigma(Dmx)$$

(where Σ represents the total of mx=1 to 10 and letter X means concerning X)

$$F(Y)=\Sigma(Dmy)$$

(where Σ represents the total of my=1 to 10 and letter Y means concerning Y)
are calculated, but much redundant processing is contained for optimization, for example, minimization of the total distance.

This is because the objective function difference values, rather than the objective function values, are required for optimization.

In FIG. 23, when operation according to the invention is performed, if evaluation of two points has reversibility, which means that if the order is changed, the relationship between two points remains unchanged, for example, the distance is the same regardless of whether 1→2 or 2→1, only two points are only changed and the change does not depend on the number of optimization objects, n.

With reference to FIG. 23, when Y is prepared from X, the changes are deletion of $D_{2\to 3}$ and $D_{8\to 9}$ of X and addition of $D_{2\to 8}$ and $D_{3\to 9}$. This is represented by the following expression:

$$\begin{aligned}\Delta Fxy &= F(Y)-F(X) \\ &= (D_{1\to 2}+D_{2\to 8}+D_{8\to 7}+D_{7\to 6}+D_{6\to 5}+D_{5\to 4}+ \\ &\quad D_{4\to 3}+D_{3\to 9}+D_{9\to 10}+D_{10\to 11})- \\ &= (D_{1\to 2}+D_{2\to 3}+D_{3\to 4}+D_{4\to 5}+D_{5\to 6}+D_{6\to 7}+ \\ &\quad D_{7\to 8}+D_{8\to 9}+D_{9\to 10}+D_{10\to 11}).\end{aligned}$$

In the problem, $$D_{j\to k}=D_{k\to j}$$

is true for arbitrary points j and k. Therefore, $$\Delta Fxy=(D_{2\to 8}+D_{3\to 9})-(D_{2\to 3}+D_{8\to 9}).$$

Using operation pointers j and k, ΔFxy is generalized as follows:

$$\Delta Fxy=(D_{(j-1)\to k}+D_{j\to (k+1)})-(D_{(j-1)\to j}+D_{k\to (k+1)}) \quad \text{Expression 1.}$$

It is seen that two additions and one subtraction need only to be performed independently of the number of optimization objects, n.

Figure 25:
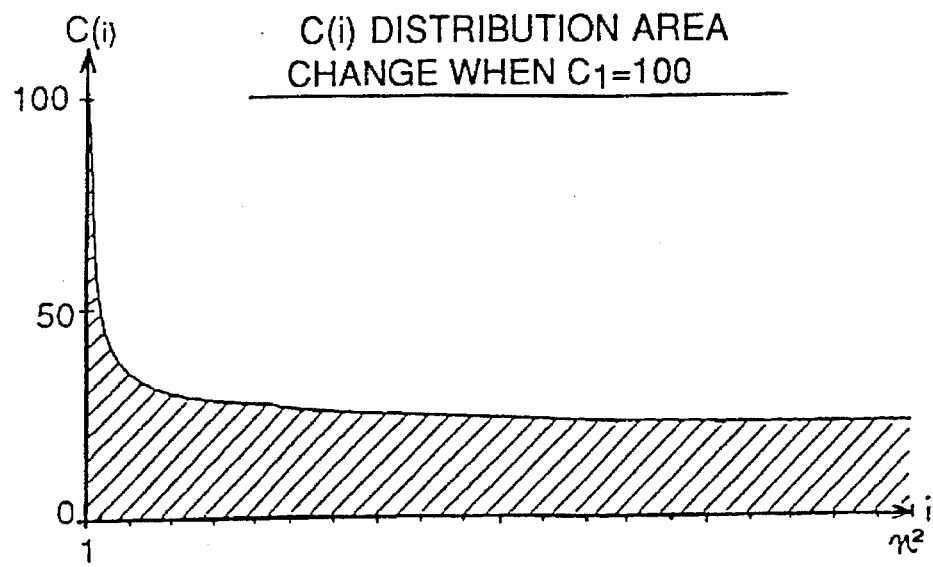
FIG. 25 is an illustration of an example of optimization constants.

We have discussed changing of a plan order vector list, namely, the mathematical permutation problems; mathematical combination problems can also be solved using a similar concept. FIG. 25 shows an example of constants prestored in the storage means 300.

Integer values having the following characteristics in generations i=1 to i=$n^2$ are preset in tables J and K:

(1) J(i, pr)<K(i, pr);

(2) $1 \leq J(i, pr)$, $K(i, pr) \leq n$; and (3) uniform distribution in the range of (2)

where pr is the cell processor number and i is the planning count.

J and K, which are functions of i and pr, are represented as J(i, pr) and K(i, pr).

Expression 1 is rewritten as follows:

$$\Delta F(i)=(D(J(i)-1)\to K(i)+DJ(i)\to (K(i)+1))-(D(J(i)-1)\to J(i)+ \\ DK(i)\to (K(i)+1)) \quad \text{Expression 2}$$

When the values in the embodiment $$J(i)=3$$

$$K(i)=8$$

are assigned to Expression 2, $$\begin{aligned}\Delta F(i) &= (D_{2\to 8}+D_{3\to 9})-(D_{2\to 3}+D_{8\to 9}) \\ &= (45+27)-(23+12) \\ &= 72-35 \\ &= 37 \\ &= F(Y)-F(X).\end{aligned}$$

It is seen that the objective function difference value can be found independently of n.

C shown in FIG. 25 is a constant to be compared with the objective function difference value ΔFxy. For example, the following values are set in a table contained in the storage means in the range of i=1 to $n^2$ where i is generation.

$$C(i)=(C_1 \cdot a(i))/\log(i+2)$$

where $C_1$ is a constant, log is a natural logarithm, and a (i) is a uniform random number distributed in the range of 0.0 to 1.0.

That is, C(i) needs only to have values whose distribution range decreases as generation i increases. $C_1$ can be easily determined by ΔF. Distribution area change of C(i) when $C_1=100$ is also shown in FIG. 25. C(i) exists in the hatched area.

Figure 28A:
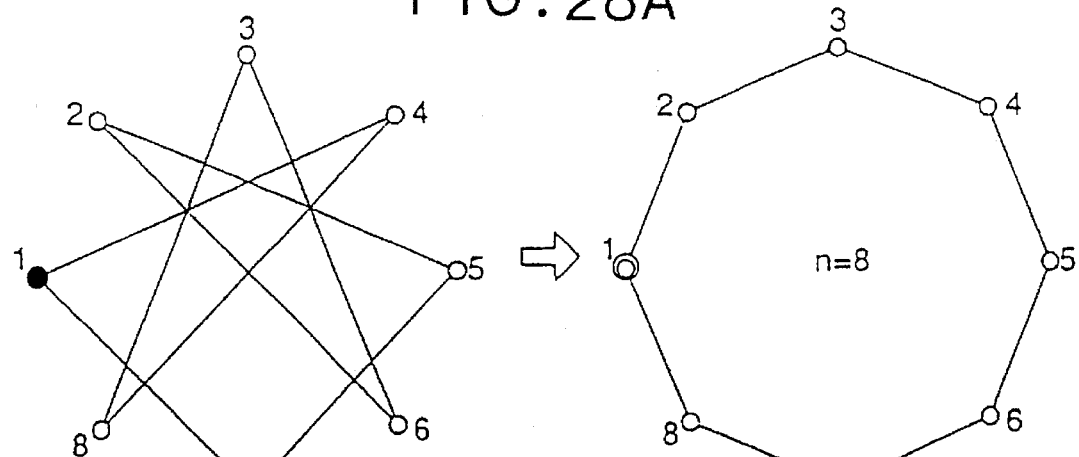
FIG. 28A is an illustration of an optimization operation example.
Figure 28B:
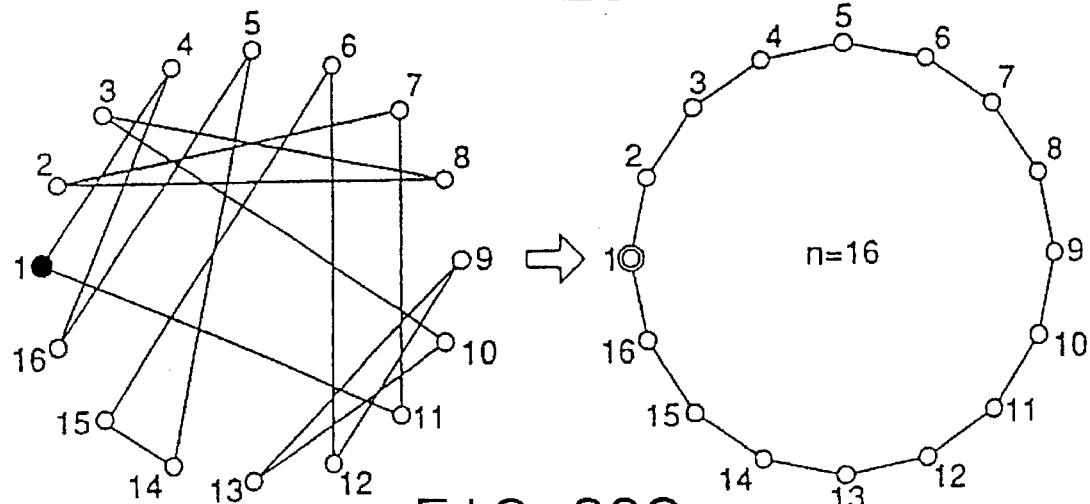
FIG. 28B is an illustration of an optimization operation example.
Figure 28C:
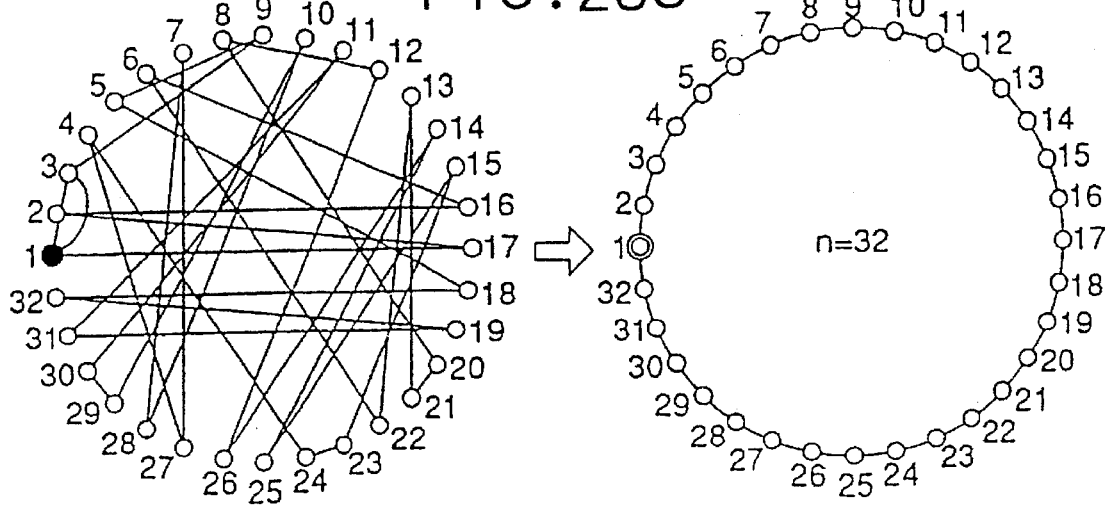
FIG. 28C is an illustration of an optimization operation example.

FIGS. 28A, 28B, and 28C are illustrations showing the experiment results for verifying that the processor operates normally.

In the figures, a problem to which an optimum solution is previously found (so-called travelling salesman problem, the planning problem in which a salesman must plan to visit all of the given points once each) is given and whether or not the optimum solution is reached with a random visit order as an initial value is verified.

If the visit points are placed on a circumference, the optimum solution becomes clearly a circle; as seen in FIGS. 28A, 28B, and 28C, the optimum solutions are reached at points n=8, 16, and 32.

Figure 29:
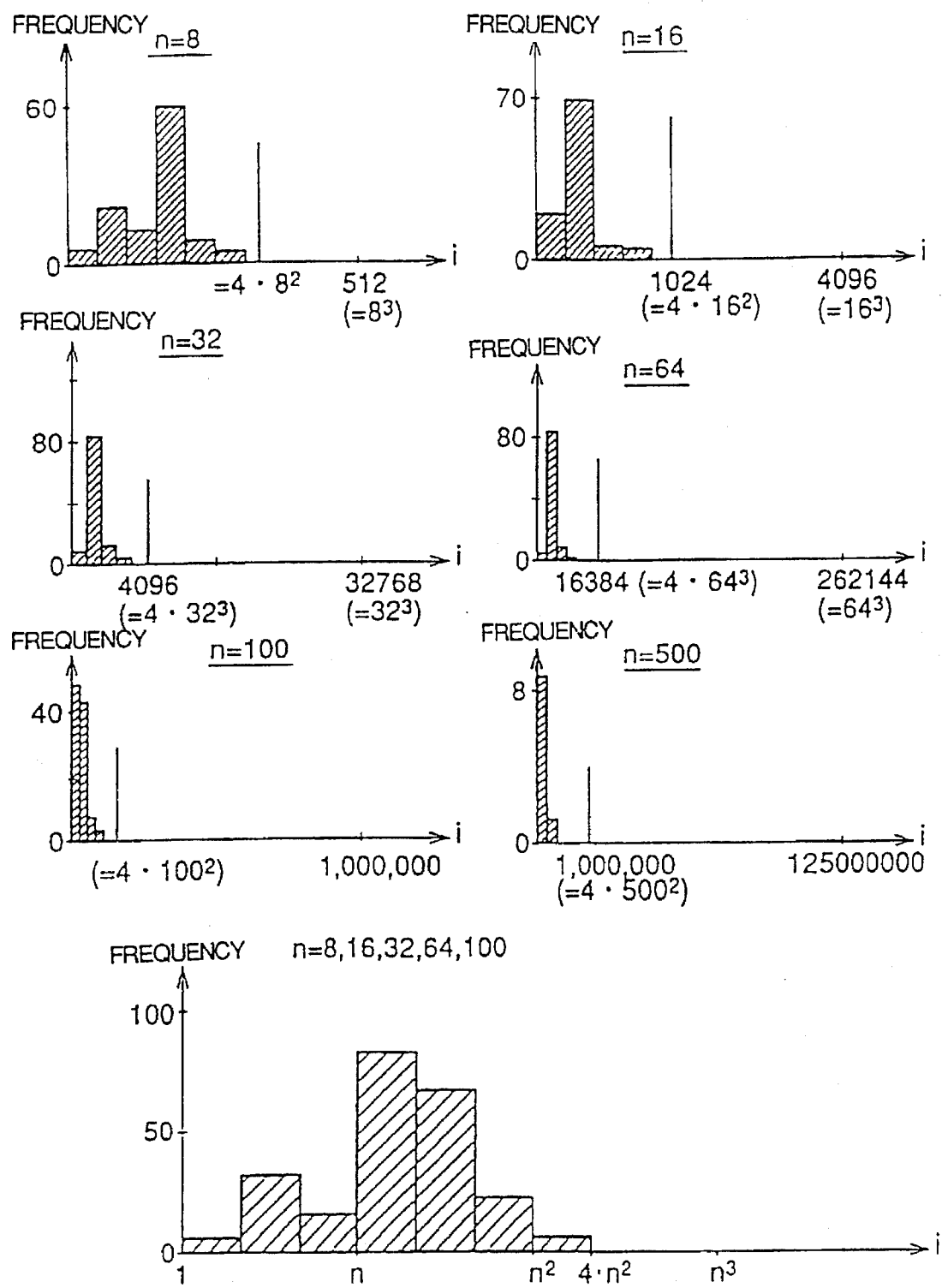
FIG. 29 shows frequency distribution graphs of the number of examinations required for optimization.

To solve the problem in FIG. 3 by using the processor according to the invention, the number of optimization objects, n, is changed and the initial condition X is also changed for carrying out an experiment. Frequency distribution graphs of counts at which an optimum solution is reached are prepared as shown in FIG. 29.

It is seen that an optimum solution is always reached $n^3$ times or less until n=500.

This means that an optimum solution is found if an examination is made as least $n^3$ times.

We have discussed optimum planning using a serial processing computer containing one processor, namely, by operating only the cell processor 5 of the invention.

FIG. 19 shows a processing procedure of the cell processor.

First, at step 10, the inversion operation result is foreseen.

Next, at step 20, if is determined whether or not a made plan is close to optimum solution.

If the made plan is close to the optimum solution, it is adopted as a new plan at step 30; otherwise, the original plan is adopted.

Figure 20:
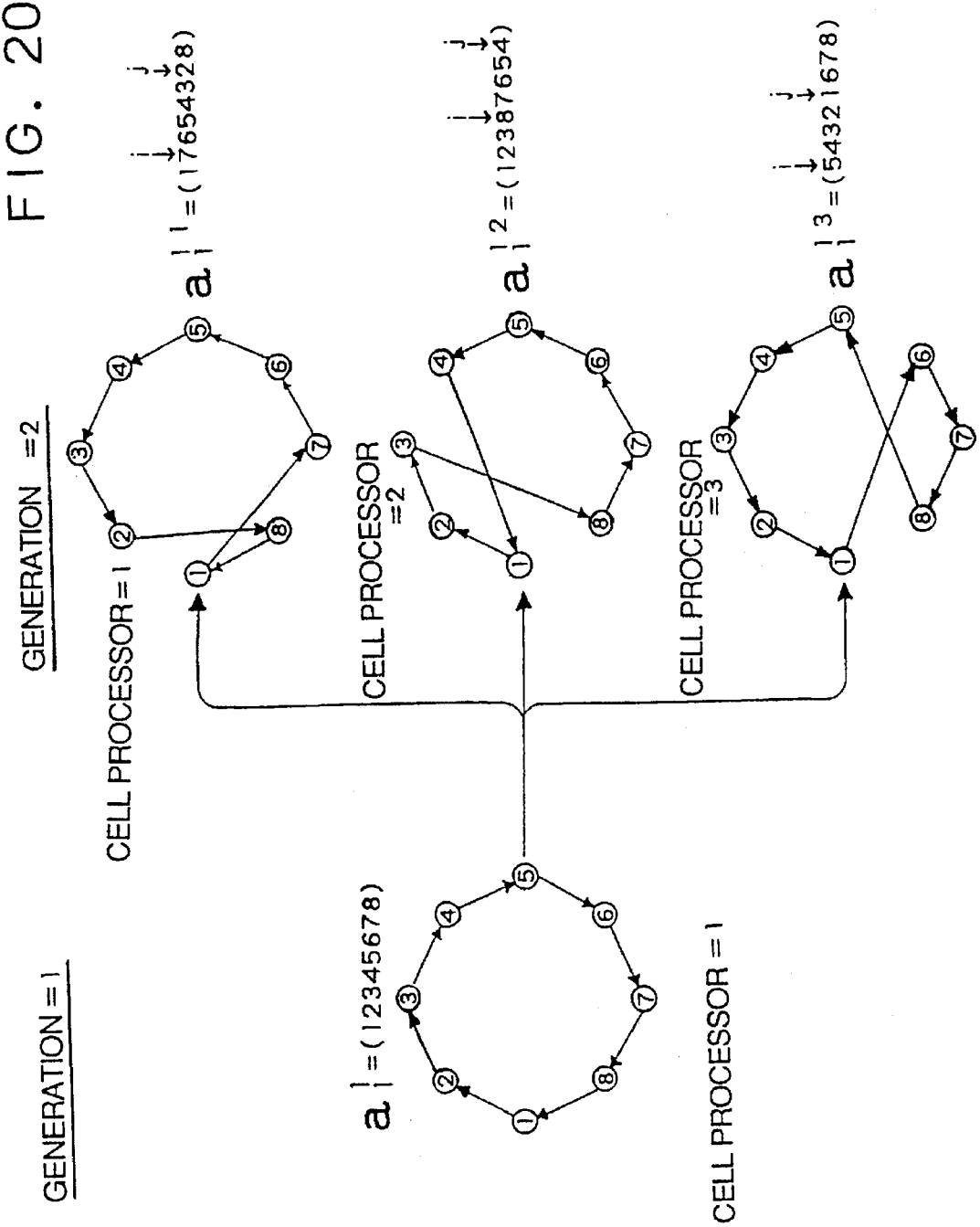
FIG. 20 is an illustration of individual (plan) propagation for each generation change and processing procedure of the cell processors.

In the invention, the throughput requiring $n^3$ times described above is furthermore improved for speeding up as described below:

FIG. 20 shows a state in which plan $a_1^1$=(12345678) is adopted as an optimum solution candidate in generation=1 in cell processor 1 and is subjected to mutation by three cell processors 1 to 3 in generation=2.

A set that can result from performing inversion as mutation from $a_1^1$ has as many elements as combinations of two cities selected from eight right cities, namely, $_8C_2$ combinations.

Therefore, the probability of selecting a candidate close to the optimum solution from among them increases as the number of given processors increases. This means that a reliable approach to the optimum solution is advantageously speeded up by providing a sufficiently large number of cell processors.

Figure 18:
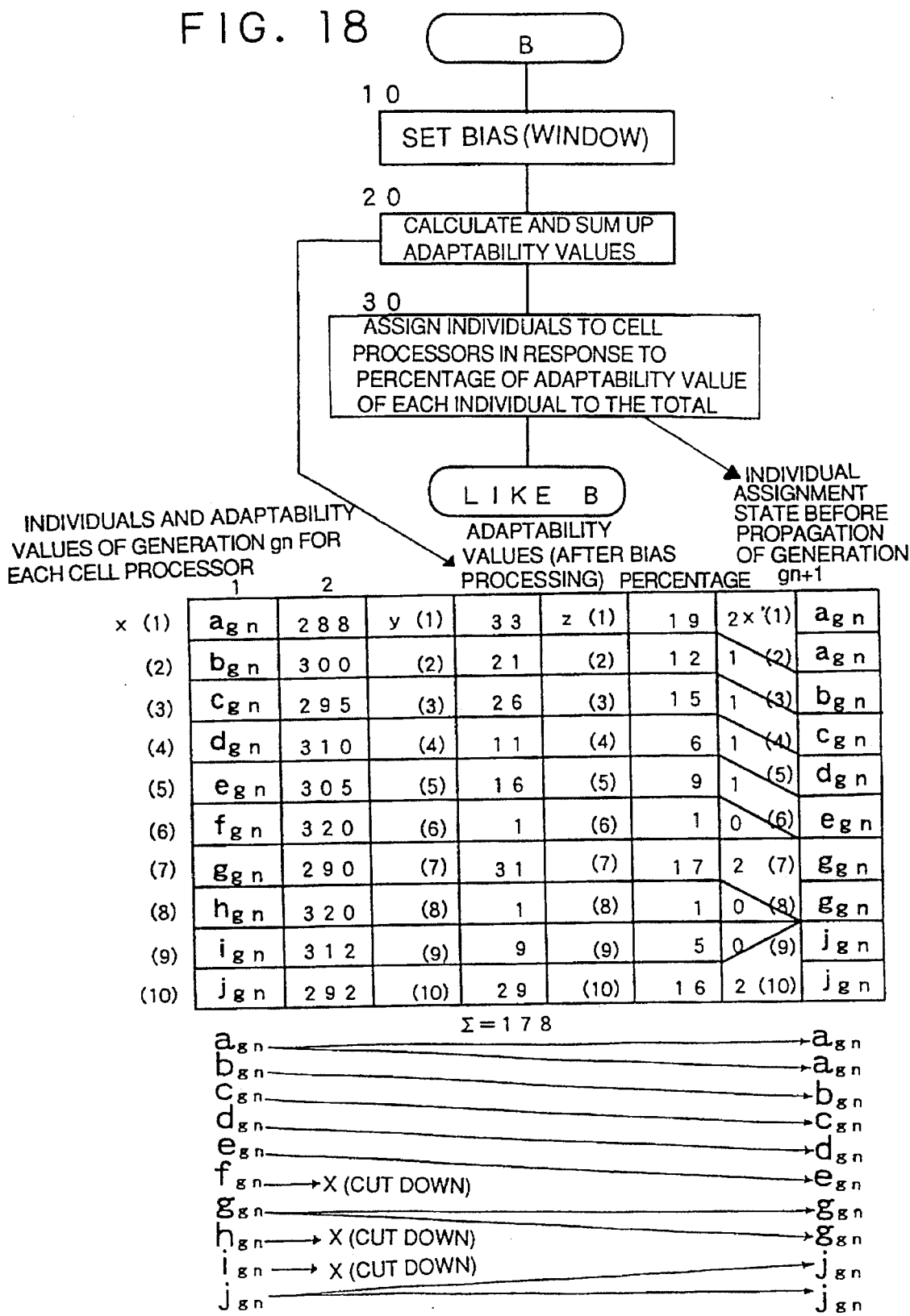
FIG. 18 is an illustration of a processing procedure for a processor assignment control unit.

What plan candidate is assigned to which cell processor can be determined by applying a law of dominant heredity, as described below:

FIG. 18 shows a processing procedure of the cell possessor superparallel control unit 40, which will be hereinafter referred to as processor assignment control.

The figure shows an example of planning for making the shortest travelling route or minimizing the total travelling distance in the travelling salesman problem.

At step 10, a bias (window) for determining evaluation grade of objective function values and maximum or minimum is defined. The bias [BS] is defined as "maximum objective function value+1" among plans.

At step 20, adaptability y(i) is found as $$y(i)=BS-x(i, 2)$$

where i is the cell processor number and x(i, 2) is the objective function value of a plan in cell processor i. Next, the total of the objective function values of the plans in all cell processors, L, is found as $$L = \Sigma y(i) \text{ ($\Sigma$represents the total of } i = 1 \text{ to } 10)$$
$$= 178.$$

At step 30, the ratio of the objective function of each plan to the total of the objective function values is calculated, and the plans (individuals) are assigned to the coil processors in proportion to the number of cell processors. In the example, $a_{gn}$ is assigned to cell processors 1 and 2, but $f_{gn}$, $h_{gn}$, and $i_{gn}$ each having a low ratio of the objective function value to the total are not assigned and are weeded out. In this process, plans having objective function values close to a desired value (in the example, those having small objective function values) are dominantly inherited by the next generation.

Figure 21:
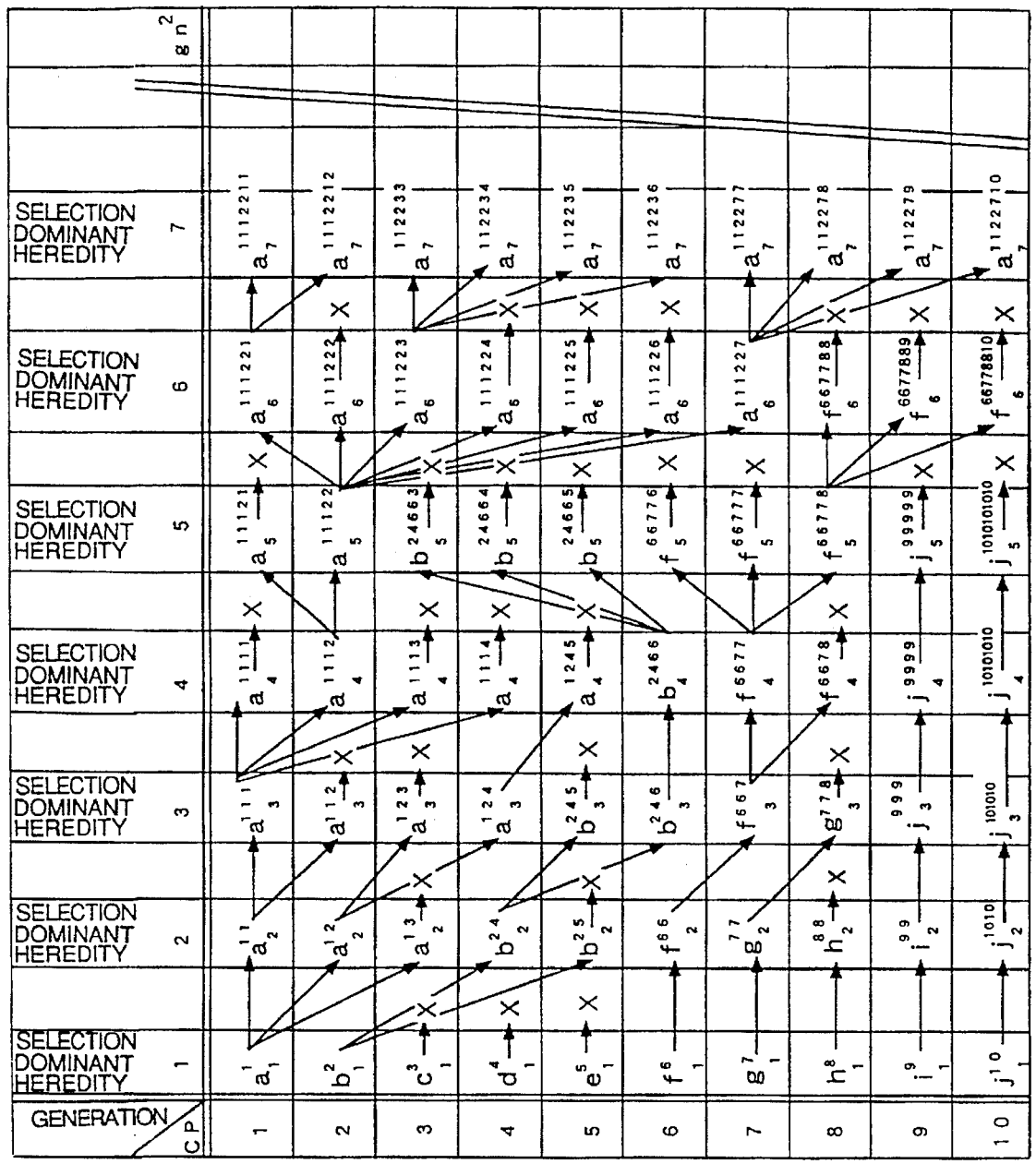
FIG. 21 is an illustration of individual selection and propagation for each generation change.

FIG. 21 shows change for each generation in the process. In the example, 10 cell processors are assigned plans (individuals) a to j in generation=1. In the figure, each numerical subscript to a letter, for example, letter a, represents a generation. The plan to which subscript "k" is given is a plan in generation=k. Each superscript represents history information of processors via which the plan given the superscript has been processed. For example, if superscript "k" and subscript "1", are given to a plan, the plan has been processed via the processor sequence "1" from generation 1 to generation "k+1."

1 is a character string. For example,

1=112277 denotes that the plan has been processed in order of processors 1 to 1 to 2 to 2 to 7 to 7.

Figure 22:
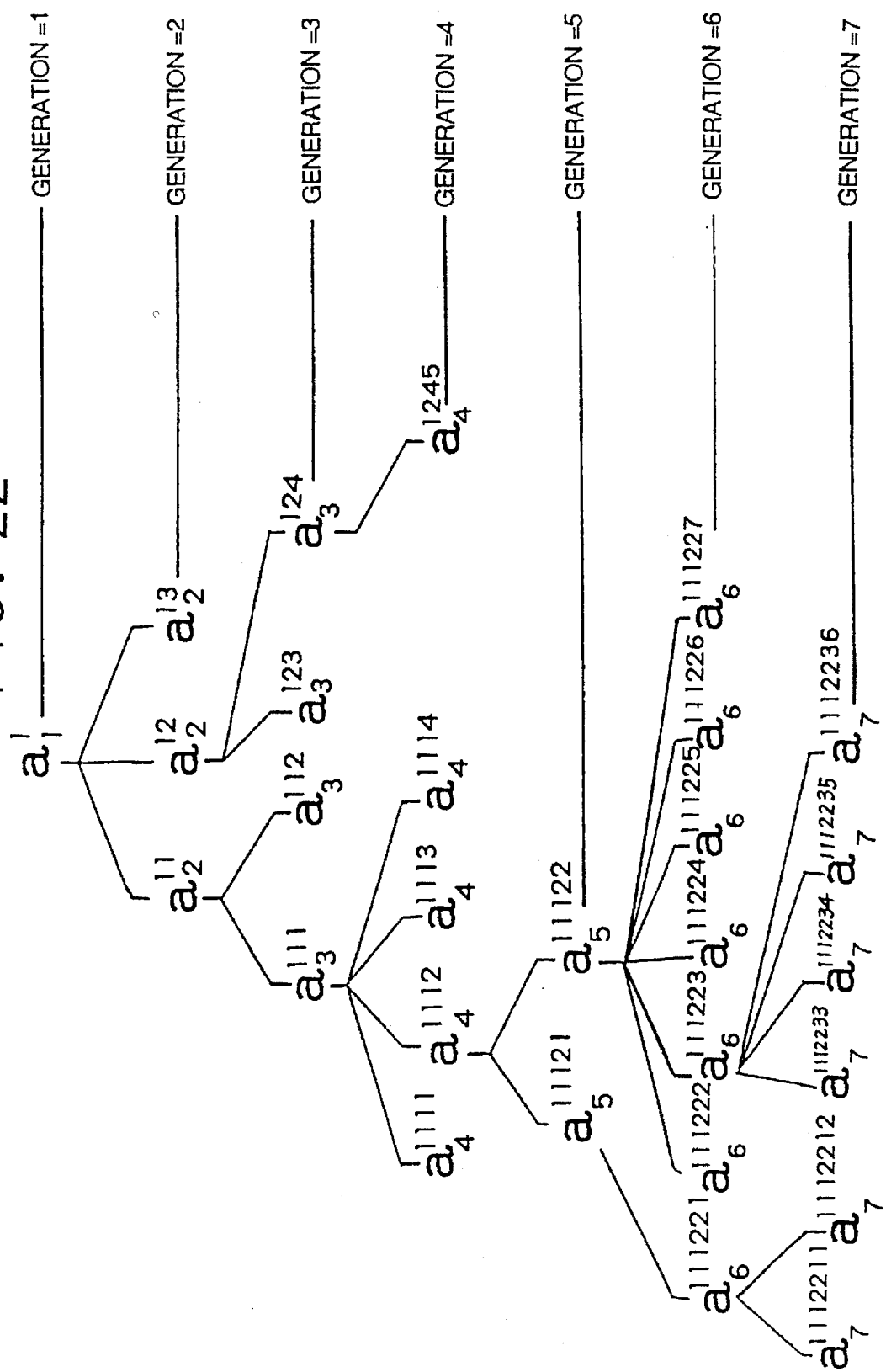
FIG. 22 is an illustration of a family tree of genus a having $a^1$ as an ancestor.

FIG. 22 shows a propagation state in generations of genus a having initial plan $a_1^1$ in FIG. 21 as an ancestor. Since descendants are six plans in generation=7, the following six ways of optimization changes are seen by tracing the roots from each descendant:

$$A1=(a_7^{1112211} \leftarrow a_6^{111221} \leftarrow a_5^{11121} \leftarrow a_4^{1112} \leftarrow a_3^{111} \leftarrow a_2^{11} \leftarrow a_1^1)$$

$$A2=(a_7^{1112212} \leftarrow a_6^{111221} \leftarrow a_5^{11121} \leftarrow a_4^{1112} \leftarrow a_3^{111} \leftarrow a_2^{11} \leftarrow a_1^1)$$

$$A3=(a_7^{112233} \leftarrow a_6^{111223} \leftarrow a_5^{11122} \leftarrow a_4^{1112} \leftarrow a_3^{111} \leftarrow a_2^{11} \leftarrow a_1^1)$$

$$A4=(a_7^{112234} \leftarrow a_6^{111223} \leftarrow a_5^{11122} \leftarrow a_4^{1112} \leftarrow a_3^{111} \leftarrow a_2^{11} \leftarrow a_1^1)$$

$$A5=(a_7^{112235} \leftarrow a_6^{111223} \leftarrow a_5^{11122} \leftarrow a_4^{1112} \leftarrow a_3^{111} \leftarrow a_2^{11} \leftarrow a_1^1)$$

$$A6=(a_7^{112236} \leftarrow a_6^{111223} \leftarrow a_5^{11122} \leftarrow a_4^{1112} \leftarrow a_3^{111} \leftarrow a_2^{11} \leftarrow a_1^1)$$

Clearly, the change of each plan traces the route to the optimum solution securely. Different plans are varied, evaluated, and propagated by their respective assigned cell processors, and plans having the evaluation values close to the desired value are left as optimum solution candidates. Therefore, they converge on an optimum solution at far higher speed as compared with the conventional neural network or simulated annealing.

Figure 26:
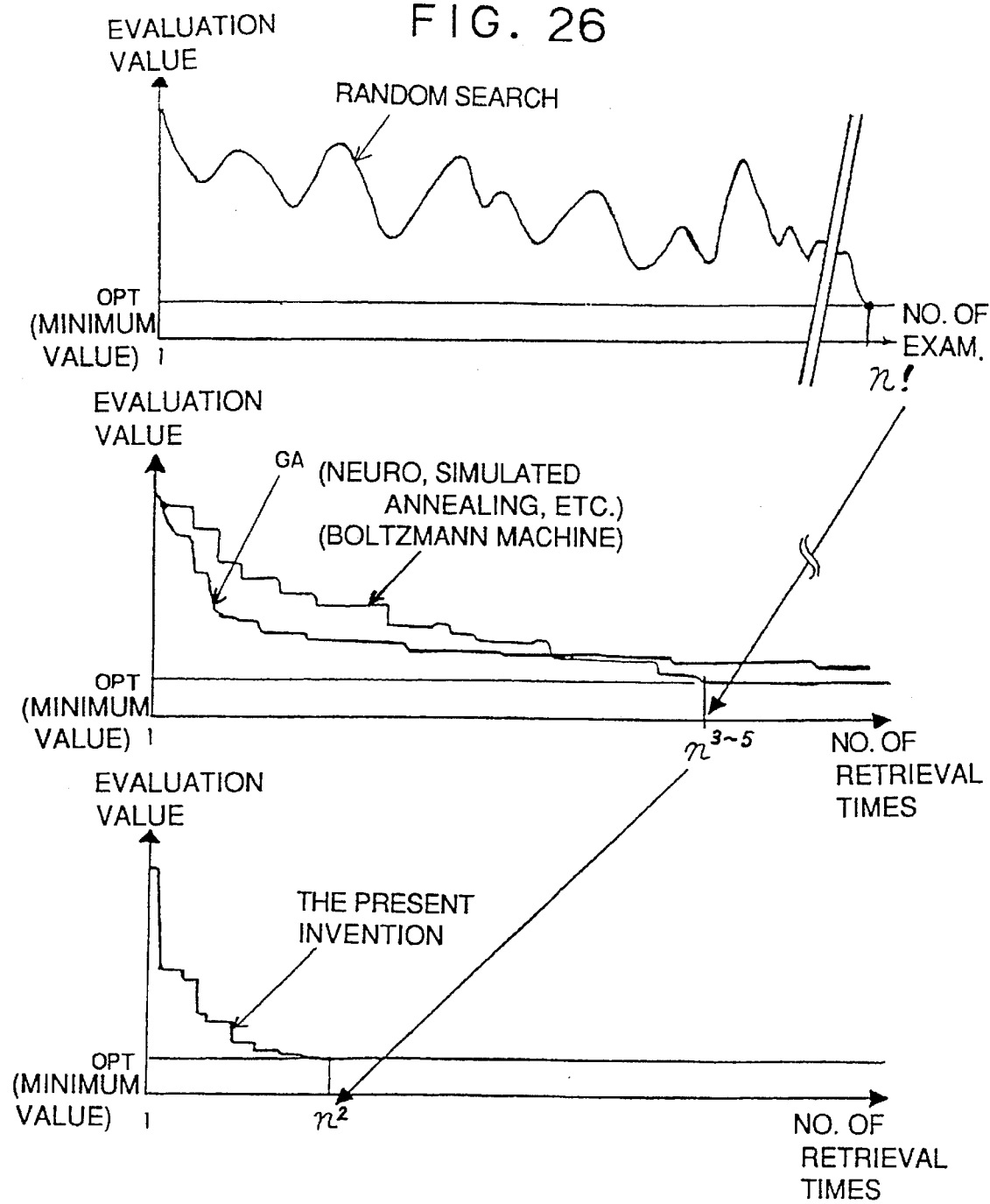
FIG. 26 shows graphs showing the experiment results of processing performance.

FIG. 26 represents graphs of statistical values of enormous experiment results for quantitative evaluation of the process.

Here, the above-mentioned travelling salesman problem is adopted as the plan problem and the purpose of the plan is to minimize the total travelling distance. Standard GA (genetic algorithm) and Boltzmann machine, a kind of neural network, as conventional models are used as models compared with the invention. The upper graph in FIG. 26 shows the result of random search using an enumeration method, etc. The number of examinations is used to enter the horizontal axis and the objective function values (evaluation values) are used to enter the vertical axis.

In the random search, n! examinations are required to find an optimum solution. Even if a computer having the highest-speed performance at present is used, the search is not completed within the practical time if n exceeds 100.

The intermediate graph in FIG. 26 shows the result by the GA and Boltzmann machine.

As soon in the graph, the GA approaches the minimum value by a comparatively small number of examinations, but when a given number of examinations is exceeded, the improvement degree of the evaluation values is lowered extremely and convergence on the optimum solution cannot be expected. In the graph, the number of examinations is used to enter the horizontal axis, but the GA requires a large number of steps for gone manipulation and evaluation of individuals and processing for each generation and in fact, takes a longer processing time than the Boltzmann machine. Therefore, it is difficult to solve a problem within the practically allowable time.

The Boltzmann machine converges on the optimum solution in $n^3$ to $n^5$ examinations if optimum processing means is used, as described above.

The lower graph in FIG. 26 shows the experiment result according to the invention.

Here, it is assumed that as many cell processors as the number close to the number of planning elements are provided. As seen in the graph, a solution in the same degree as that of the Boltzmann machine can be found in $n^2$ examinations, as described above.

The graph also shows characteristics that evaluation value improvement at the initial examination stage is made remarkable by assigning dominant heredity individuals (plans) to the cell processors. These characteristics are useful when a reasonable plan (not optimum) is required in short time although adaptability may be somewhat sacrificed for speed.

Such a ease has an extremely high demand actually, and it is very important to make such a plan.

For example, the necessity for such planning is apparent if a train operation plan to be made when an accident occurs is considered, because it is important to make a train operation plan as quick as possible even if the operation plan adaptability is a traded off slightly for the speed.

This is also applied to planning when an accident such as facility failure or an emergency job occurs in a production plan.

FIG. 27 shows an example of applying the invention to production plan optimization very much needed in the manufacturing industry.

The example is a problem example of making a plan for efficiently performing six types of jobs 1–6 in production facility A. Since one facility is available, the setup time such as tool exchange, cleaning, and NC work parameter setting is required when the jobs are changed, as shown in FIG. 27.

The plan becomes the same as the "travelling salesman problem" if the setup time is related to the distance between the travelling points, and the total job time is adopted as the objective function for minimizing it.

That is, the planning corresponds completely to the travelling salesman problem.

It is equivalent to minimizing the total setup time. The total setup time of parent individual P(I) having the best evaluation value in the initial parent individual set, which was 77 minutes, is shorted to 39 minutes by the system according to the invention; the total job time is shortened 50%.

The number of facilities installed in an actual large-scaled factory is several hundreds and the number of jobs is several thousands to several ten thousands a month. FIG. 26 indicates that a practical optimum solution can be found in a very short time. The larger the production facility scale, the more powerful the effect of the invention.

The problems that can be solved by the invention are, for example:

(1) Delivery plan, such as a problem of minimizing the total time required to complete delivery when a driver delivers goods to customer points by delivery truck; (2) vehicle distribution plan, such as a problem of minimizing the customer wait time when vehicles are distributed to customer points in order; (3) rolling plan in ironworks, such as a problem of minimizing the rolling process time when a lot is entered in each of various rolling steps in order; (4) plan for coming and going of articles in an automatic warehouse, such as a problem of minimizing the total of crane travelling distances when articles, etc., are entered in and taken out from the warehouse by a stacker crane or the like; (5) material pattern plan, such as a problem of minimizing the remaining amount of material when a pattern is made of a predetermined amount of material. The invention is not limited to these problems, however.

According to the invention, a plurality of cell processors are provided and plans are given to the cell processors for outputting plan candidates. Then, the plan candidates are assigned to the cell processors in response to the ratio of the objective function value of each plan candidate to the total of the objective function values of the plan candidates. That is, for a maximization problem, plans having larger objective function values are assigned to the cell processors preferentially; for a minimization problem, plans having smaller objective function values are assigned to the cell processors preferentially in proportion to the percentage of the objective function value of each plan candidate to the total of the objective function values of the plan candidates. The planning process is executed a predetermined number of times (a predetermined number of generations), thereby providing an optimum plan extremely quickly. Of course, the planning problems cover diversified fields.

Next, a third embodiment according to the invention will be described in detail with reference to the accompanying drawings.

Figure 30:
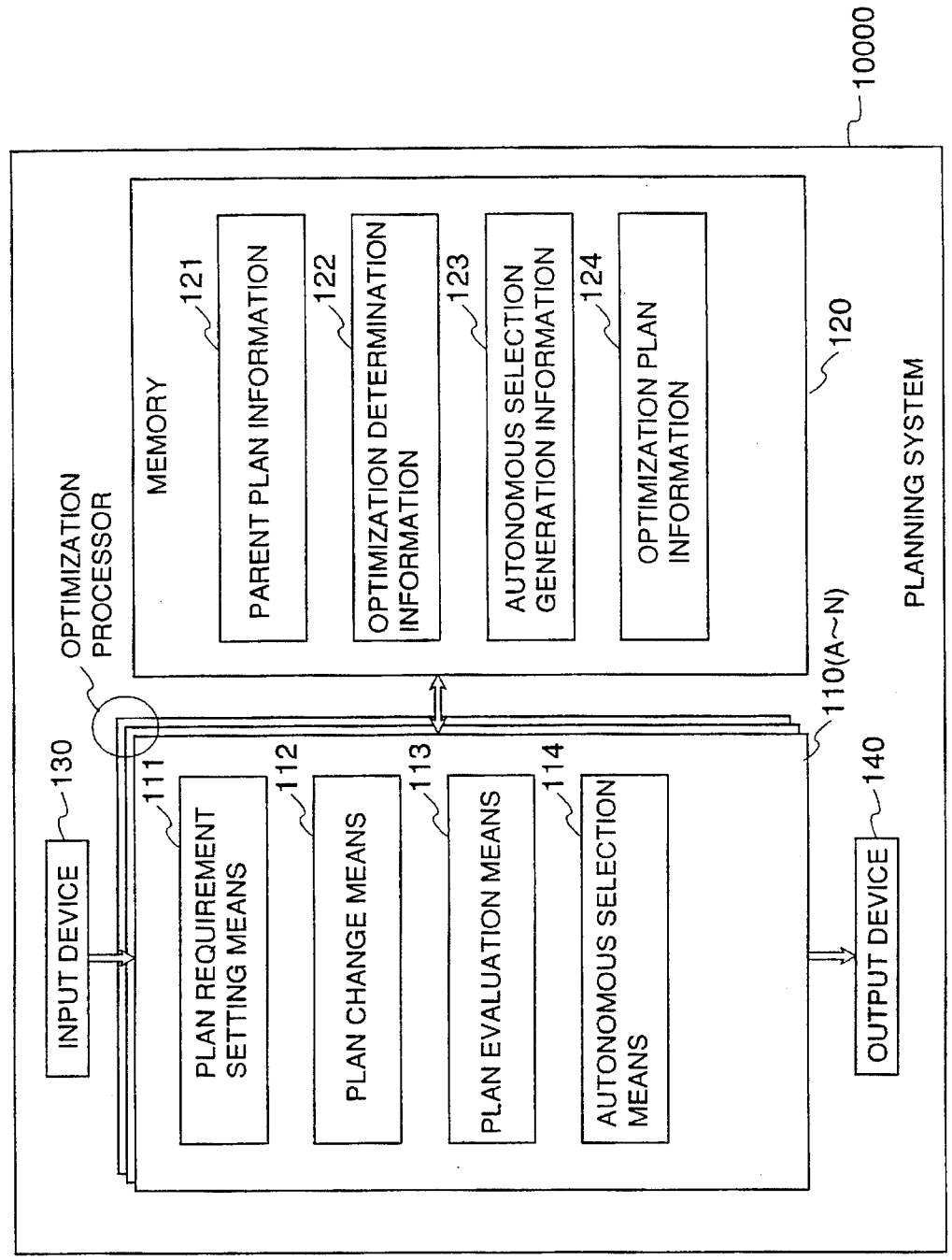
FIG. 30 is a block diagram showing the configuration of a planning system according to a third embodiment of the invention.

FIG. 30 is a block diagram showing the configuration of a planning system according to the third embodiment of the invention.

The planning system 10000 comprises an input device 130 for giving a planning problem and the values of variables required to solve the problem, an optimization processor 110 comprising a plurality of processors each consisting of plan requirement setting means 111, plan change means 112, plan evaluation means 113, and autonomous selection means for preparing an objective function representing an item to be minimized or maximized for the given planning problem and finding out an optimum plan for providing an optimum value of the objective function, an output device 140 for outputting the optimum plan, and a memory 120.

The memory 120 stores parent plan information 121 containing the planning problem and the values of the variables required to solve the problem given through the input device 130, optimization determination information 122 containing optimum determination values, each of which is a variable to be compared with the evaluation value difference between one parent plan and its child plan prepared by changing the parent plan gradually for determining a plan close to an optimum solution, autonomous selection generation information 123 containing autonomous selection generation values, which are variables for autonomous selection defined for each generation, used for causing a processor where a plan change does not occur over a long period from a predetermined time to determine whether or not the plan made by the processor is to be discarded or a plan made by another processor is to be accepted, namely, to determine the autonomous selection timing, and optimization plan information 124 given by the optimization processor 110.

Each of the processors 110A to 110N contained in the optimization processor 110 comprises plan requirement setting means 111 for setting plan requirements, plan change means 112 for preparing new child plans by predetermined mutation manipulation from given parent plans, plan evaluation means 113 for comparing the evaluation value of each parent plan with that of its child plan and updating, and autonomous selection means 114 for autonomously discarding the plan made by the corresponding processor or accepting a plan made by another processor.

The plan evaluation means 113 calculates an objective function value difference between parent and child plans. If the objective function value difference is less than the optimum determination value given from the optimization determination information 122, the plan evaluation means 113 replaces the parent plan with the child plan and if the child plan is an optimum plan among plans provided by parallel processing, it registers the child plan in a part of the optimization plan information 124 as the "best plan." If the objective function value difference is greater than the optimum determination value, the plan evaluation means 113 holds the parent plan as a part of the optimization plan information 124.

When the time during which no parent plan change has occurred is long, compared with the autonomous selection generation value given from the autonomous selection generation information 123, the autonomous selection means 114 contained in each of the processors 110A–110N replaces the current parent plan with the best plan registered in the memory 120 as a new parent plan for the corresponding processor.

Necessary information such as plan requirement setting information can be input through the input device 130, and necessary information such as the best plan can be displayed on the output device 140.

Figure 31:
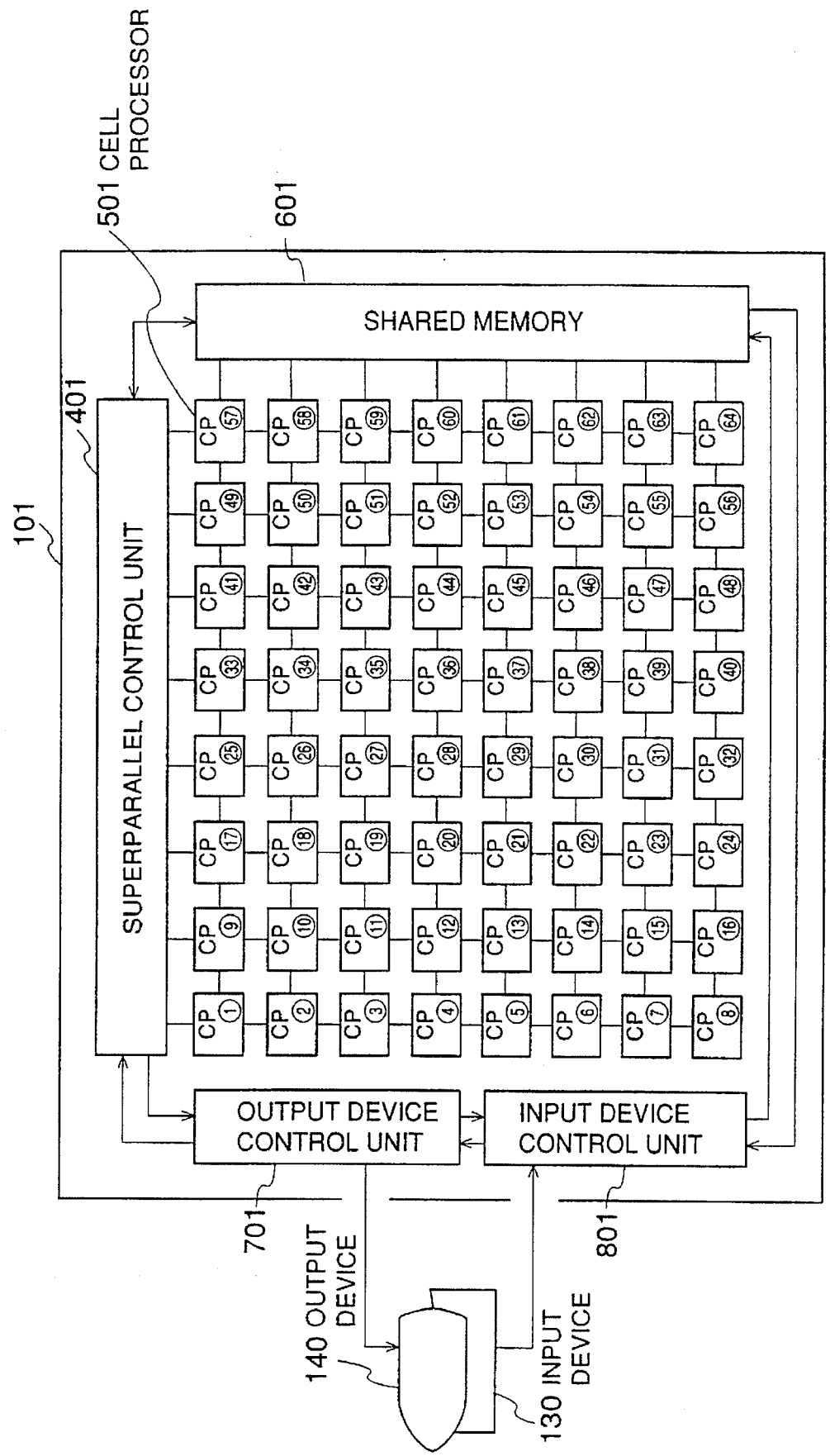
FIG. 31 is a block diagram showing the configuration of a parallel processor according to the third embodiment of the invention.

FIG. 31 shows a configuration example of a parallel processor 101 for implementing the planning system 10000 according to the embodiment of the invention. The parallel processor 101 comprises an input device 130, an output device 140, an input device control unit 801, an output device control unit 701, a superparallel control unit 401, a plurality of cell processors 501 connected to each other, and a shared memory 601.

The input device 130 has at least a function of accepting a given planning problem including constants indicating parameters required for planning; it can be provided by a keyboard, a mouse, etc., for example.

The input device control unit 801 has at least a function of transferring information input through the input device 130 to the shared memory 601 or a local memory in the cell processor 501.

The output device control unit 701 has at least a function of outputting information in the shared memory 601 or the local memory in the cell processor 501 to the output device 140 as requested by the superparallel control unit 401.

The output device 140 has at least a function of displaying a made plan, etc., and can be provided by a display such as CRT, for example.

The superparallel control unit 401 can input/output information from/to an external system via the output device control unit 701, control the operation of the cell processors 501, and control the shared memory 601 or use the storage contents of the shared memory 601 for performing arithmetic operations; it can be provided by electronic devices such as, for example, a CPU, ROM, and RAM.

The shared memory 601, which can be accessed by the superparallel control unit 401, the cell processors 501, and the input device control unit 801, stores data such as the current best plan and the best plan evaluation value, the objective function value of the best plan in addition to the optimum determination values and autonomous selection generation values described below.

Figure 32:
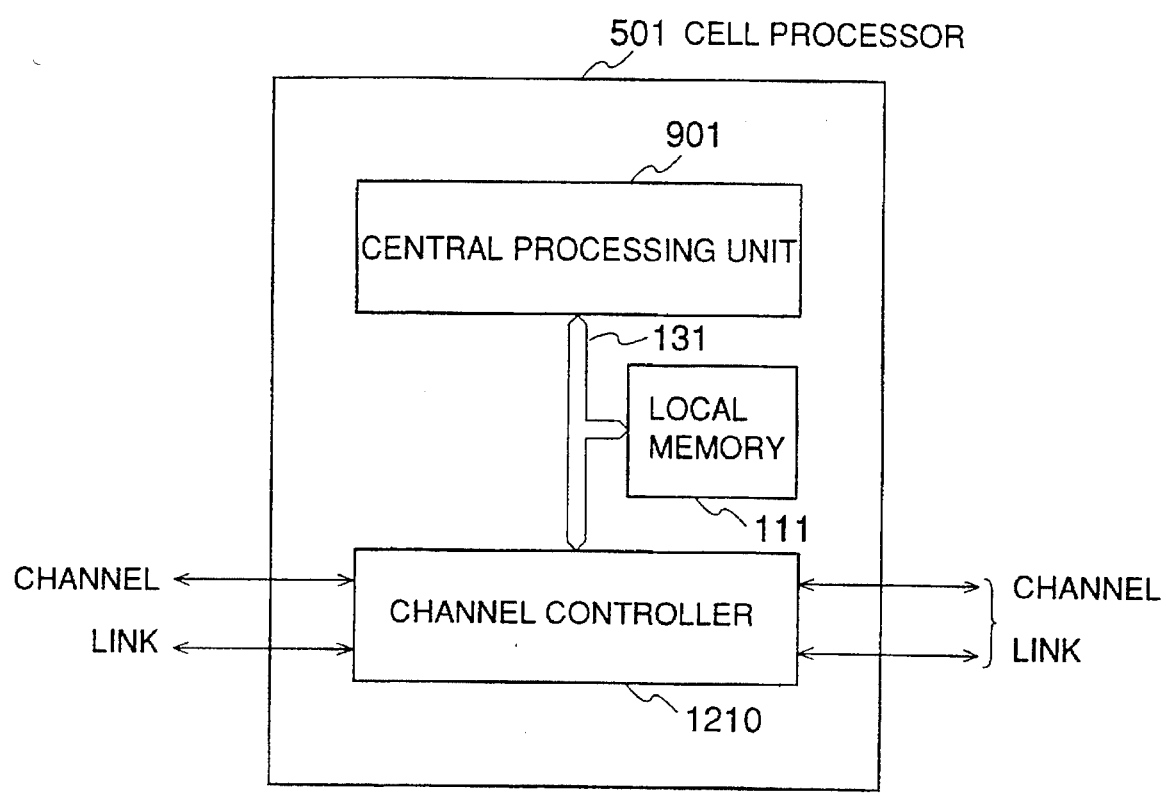
FIG. 32 is a block diagram showing the configuration of a cell processor according to the third embodiment of the invention.

FIG. 32 shows a configuration example of the cell processor 501.

Although 64 cell processors are connected in parallel in the embodiment, the number of cell processors can be increased or decreased in response to the throughput and complexity required for a given problem.

As shown in FIG. 32, the cell processor 501 comprises a central processing unit (CPU) 901 for performing processing such as integer operations and real operations, a local memory 111 that can be accessed not only by the corresponding cell processor, but also by other processors, a superparallel control unit 401, a shared memory 601, a channel controller 1210 for exchanging information with other cell processors 501, and a bus feature for connecting the central processing unit (CPU) 901, the local memory 111, and the channel controller 1210. The configuration enables the central processing unit 901 to perform logical processing without being interrupted by communication with other cell processors.

The local memory 111 stores data such as selection generation counter information indicating the time for which the plan made by the corresponding cell processor is not improved, a parent plan, the parent plan evaluation value, which is the objective function value of the parent plan, a child plan, and the child plan evaluation value, which is the objective function value of the child plan.

Figure 33:
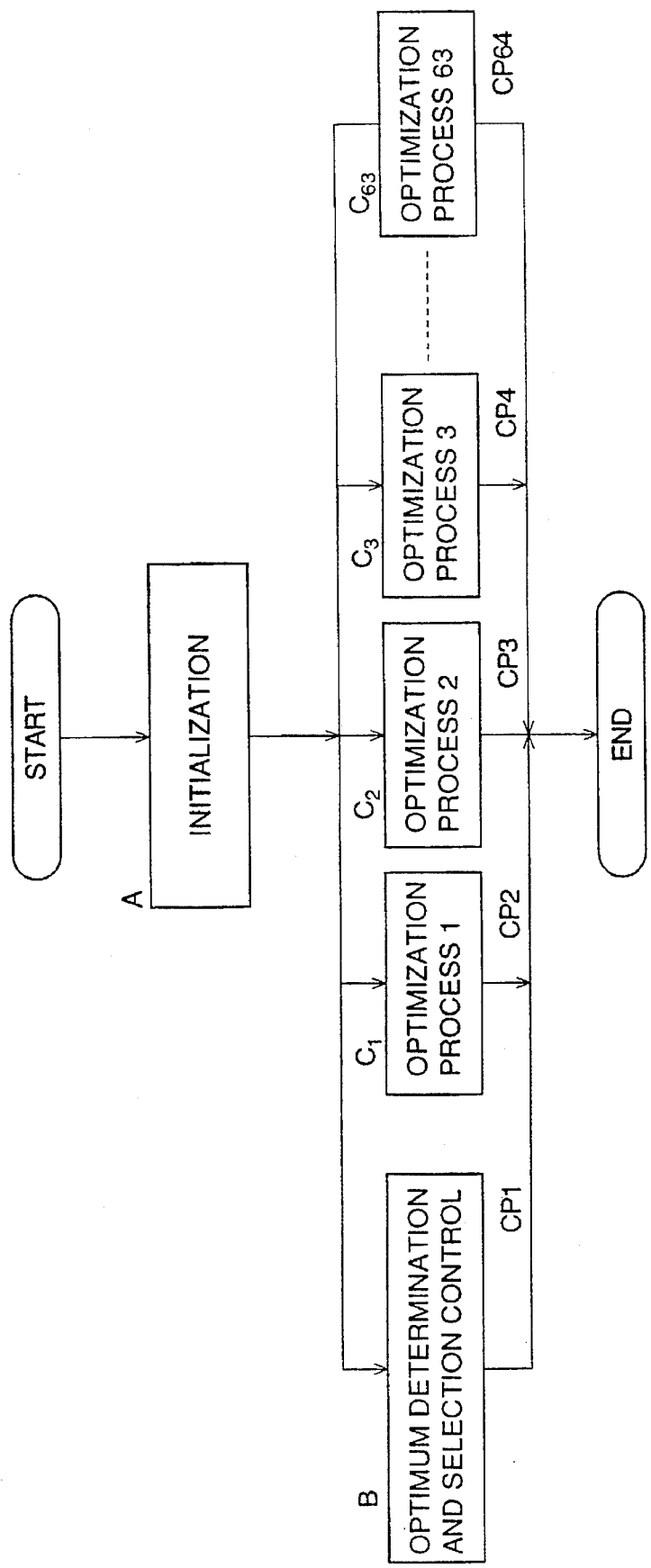
FIG. 33 is a flowchart of a parallel processing procedure according to the third embodiment of the invention.

Next, FIG. 33 shows a processing flow of the parallel processor 101.

In the processing, first at step A (initialization), initial plans are prepared from a given plan problem, the objective function values of the initial plans are calculated, the initial plans and their objective function values are transferred to each cell processor, and the following parallel processing (steps B and C) is started at the same time. The embodiment assumes that one cell processor executes step B and 63 remaining cell processors execute steps C.

Step B and steps $C_{1-63}$ are performed concurrently; the cell processors execute the steps independently of each other.

This ensures that the operating ratio of each cell processor always becomes 100%. That is, each processor performs processing autonomously.

Figure 34:
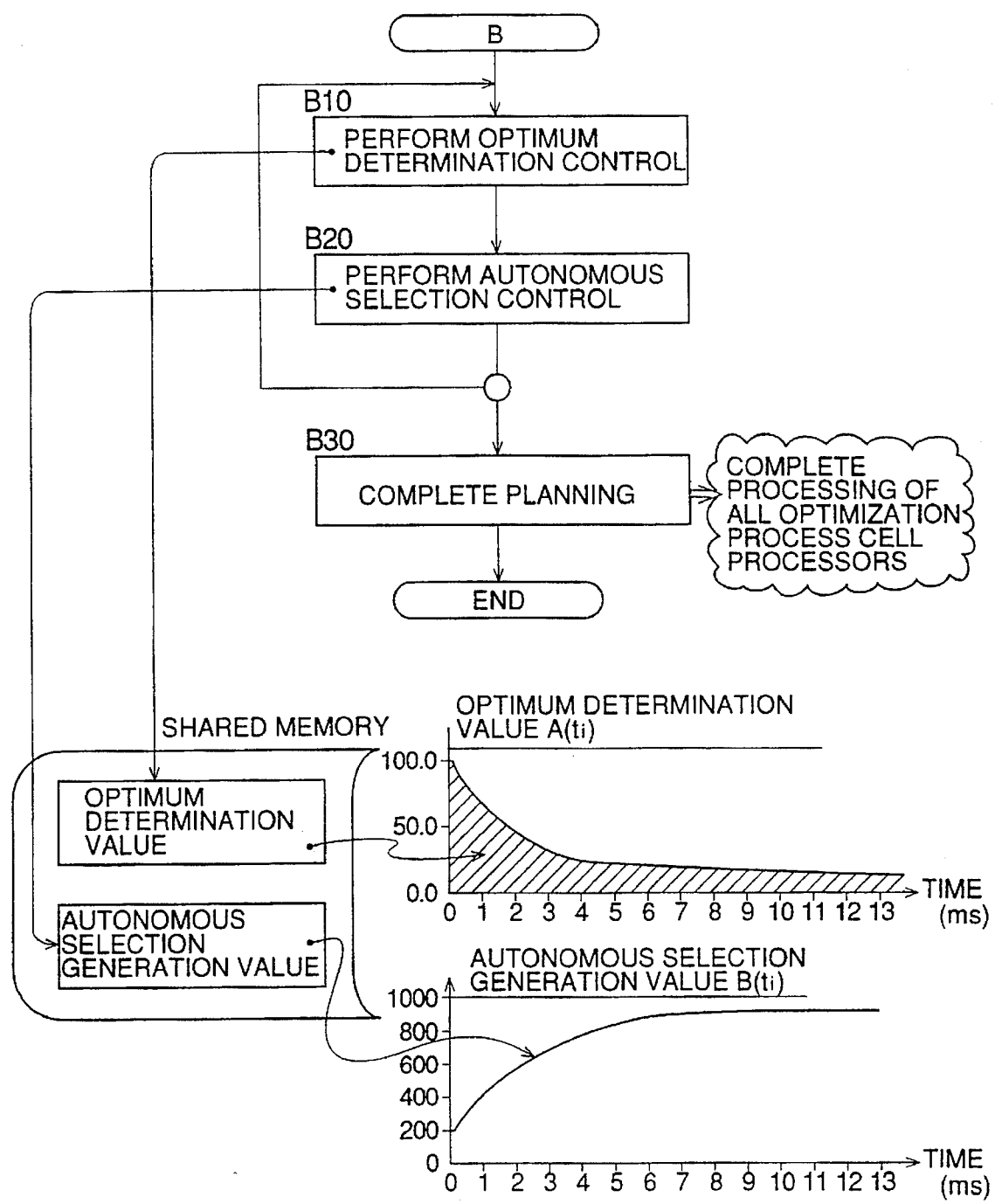
FIG. 34 is an illustration of a processing procedure according to the third embodiment of the invention.

FIG. 34 shows a processing flow of temperature/selection control which is processing at step B in FIG. 33.

At steps B10 and B20, an optimum determination value and autonomous selection generation value, which are variables referenced in optimization process at steps C, are calculated every discrete time ti (i=1, 2, . . . ), and are then stored as A(ti) and B(ti) respectively in the shared memory.

The optimum determination value refers to information used to determine which is close to an optimum solution when the objective function value of one parent plan is compared with that of the child plan prepared from the parent plan. Here, for example, A(ti) is defined as follows:

$$A(ti) = \frac{C_1 \cdot a(ti)}{\log(ti \times Pm)}$$

where $C_1$ is a constant and a(ti) is a real random number uniformly distributed in the range of 0.0 to 1.0 prepared at time ti. Therefore, A(ti) becomes time series information of values uniformly distributed between a value decreasing with a lapse of time and 0.0, as shown in FIG. 34. In the embodiment, $C_1 = 100.0$.

The autonomous selection generation value refers to information referenced when a child plan is prepared from a parent plan and the plan close to the optimum plan is selected; it is information used to simulate so-called military expansion competition, an event for replacing with another excellent plan when one plan has not been improved (evolved) for a long period from the autonomous selection generation value. Here, for example, B(ti) is defined as follows:

$$B(ti) = C_2 \times \left(1 - \frac{1}{\log(ti)}\right)$$

where $C_2$ is a constant. In FIG. 34, $C_2=1000$.

B(ti) is a value increasing with a lapse of time ti; it is a variable used for planning in such a manner that the plans assigned to the cell processors experience a hard struggle for existence, namely, they compete fiercely for military expansion at the initial stage of the planning and that as the planning advances, sufficient time (chance) is given to improvement (evolution) of each plan.

This method simulates the fact that in the evolution of living things, each individual (plan) is improved gradually by performing very slow and secure mutation manipulation in the minimum unit for propagation in individuals (plans) rather than by performing rapid mutation or forcible crossover and that as the evolution furthermore advances and adaptability to environment raises, struggle for existence remains among different groups or species, although the evolution speed slows down, whereby individuals (plans) having higher adaptability are produced.

The techniques using the conventional genetic algorithms have an important problem of stopping improvement at the initial stage of the evolution because only crossover, mutation, and selection are performed and plans are changed too impatiently. In contrast, the invention provides basic means for performing parallel processing of autonomous cooperation type at high speed in addition to solving the problem as described above and below.

Figure 35:
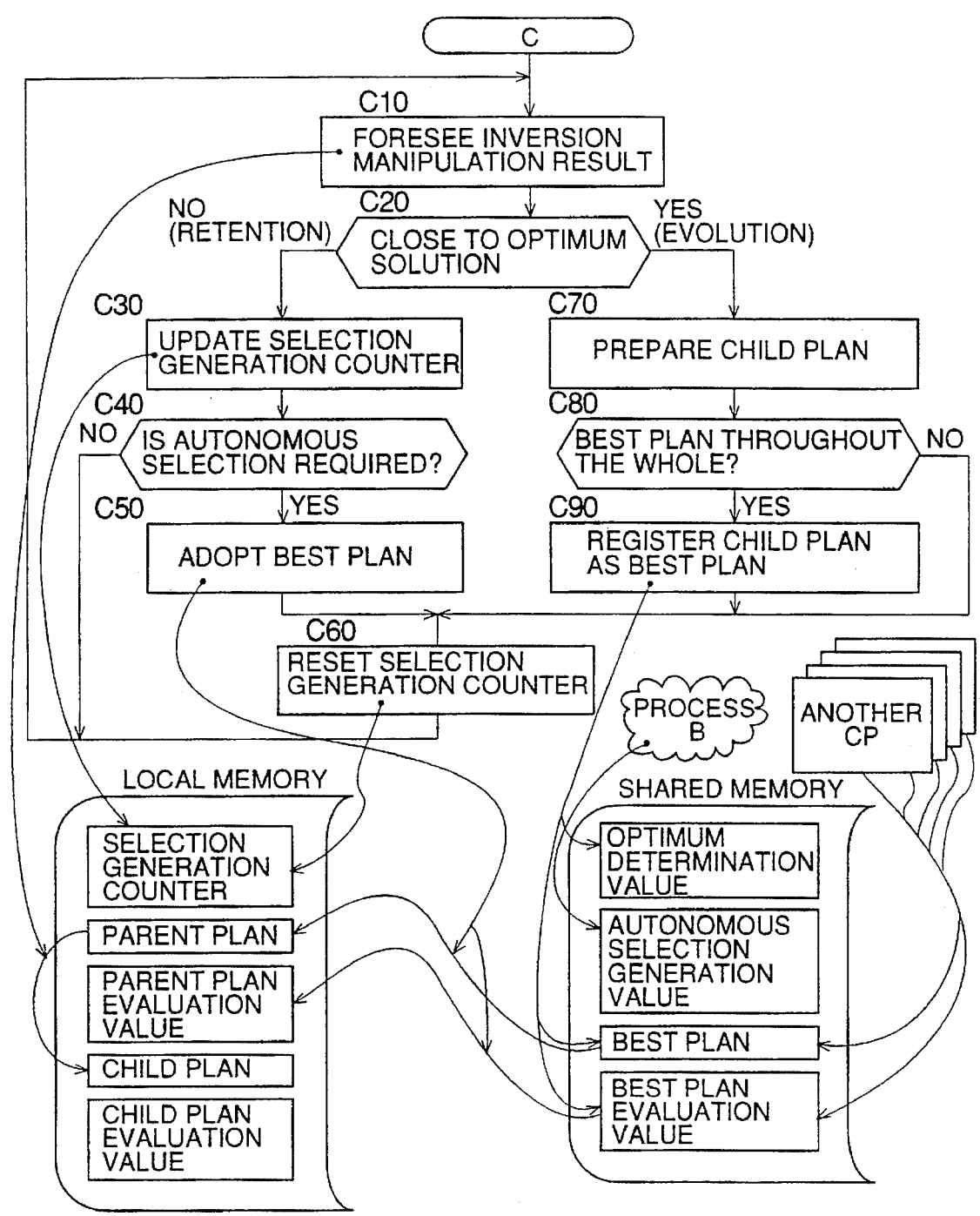
FIG. 35 is an illustration of an autonomous optimization processing procedure.

FIG. 35 shows an optimization process flow at steps C, executed by the 63 cell processors, shown in FIG. 33. Specifically, the following processing is performed by each cell processor:

First, at step C10, the following processing is performed:

A given parent plan is copied and minimum mutation manipulation, such as inversion, is executed for the copy for preparing a plan. Next, the objective function value of the child plan is calculated as the child plan evaluation value.

At step C20, the following processing is performed:

The difference between the parent plan evaluation value, the objective function value of the parent plan, and the child plan evaluation value is compared with the optimum determination value A(ti) stored in the shared memory at step B. If the difference is less than A(ti), the child plan is assumed to be closer to the optimum solution than the parent plan, and control advances to step C70.

On the other hand, if the difference is greater than A(ti), the parent plan is assumed to be close to the optimum solution, namely, to be not evolved, and control advances to step C30.

At step C30, the contents of the selection generation counter in the local memory are updated.

Next, at step C40, the following processing is .performed:

The autonomous selection generation value B(ti) stored in the shared memory at step B is compared with the selection generation counter value. If the selection generation counter value is greater than B(ti), it is judged that autonomous selection is required, and control advances to step C50; otherwise, control returns to step C10.

Next, at step C50, the following processing is performed:

The best plan and the best plan evaluation value stored in the shared memory are copied into storage areas of the parent plan and the parent plan evaluation value respectively.

It may be considered that the cell processor weeds out its plan autonomously at the step. As a victor of the "military expansion competition," the best plan provided by another cell processor increases in the number of survival individuals (plans).

Here, the best plan in all cell processors (in the example, 63 cell processors) has the right of "military expansion." However, for example, the best plan in the cell processors existing in a finite area from the corresponding cell processor may be adopted as the best plan, whereby the evolution of living things is simulated more exactly.

Such processing is useful if the number of planning elements, n, becomes great.

Next, control advances to step C60 at which the selection generation counter is reset to 0.

On the other hand, at step C70, the plan prepared by mutation manipulation at step C10 is adopted as a child plan, and the objective function value of the child plan is calculated as the child plan evaluation value, then control advances to step C80.

At step C80, the following processing is performed:

The child plan evaluation value found at step C70 is compared with the best plan evaluation value stored in the shared memory. If the former is better than the latter, control advances to step C90; otherwise, control goes to step C60.

At step C90, the child plan and the child plan evaluation value are copied into the best plan and best plan evaluation value storage areas in the shared memory to register them as a new best plan and best plan evaluation value, whereby the child plan prepared by the corresponding cell processor newly acquires the right of "military expansion". Last, control goes to step C60.

Thus, in the optimization process (steps C), processing similar to the evolution in the natural world, such as self-propagation, minimum mutation manipulation, selection, evaluation, and diffusion of good plans, is repeated autonomously without wasting any of the allowable time.

We have outlined the processing in the third embodiment of the invention. To show the invention more specifically, an example in which the embodiment is applied to the "travelling salesman problem" will be discussed.

As described above, FIG. 3 takes the so-called travelling salesman problem as a plan problem example and shows a condition in which a problem given through the input device 130 is set in the initialization (step A) in FIG. 33. (Such a condition may be displayed on the output device 140, for example.)

This problem is a problem in which, for example, the shortest distance route is selected among routes on which a salesman departs from and returns to point 0:• after visiting points 1 to 10 each once only. That is, the objective function value becomes the distance.

Here, the objective function is the total distance and the purpose of optimization is to make the shortest distance, but it may be the total time required for the salesman to visit all points.

The setup visit order, namely, parent plan is represented by vector X as follows:

$$X=(1, 2, 3, 4, 5, 6, 7, 8, 9, 10)$$

The distance between the points is predetermined.

Here, the shared memory 601 stores distance matrix D(f, t) from point f to t (f and t are each a number from 1 to 10). (See FIG. 4.)

FIG. 36 illustrates process at step C10 shown in FIG. 35, one of the devices of the invention.

The basic concept of planning is to partially change a list of elements of plan X; this operation is called as "perturbation" in the specification; this operation corresponds to inversion of gene mutation manipulation.

For example, the element list contained in the range of j=3rd to k=8th elements making up the vector X is inverted for mutation manipulation.

At the time, j and k are random numbers satisfying the conditions $j < k$ and $1 \leq j, k \leq 10$ and distributed uniformly in the range.

The operation changes the plan to a new plan Y $Y = (1, 2, 8, 7, 6, 5, 4, 3, 9, 10)$.

Clearly, Y results from giving minimum mutation (one mutation) to X; gradual evolution is intended.

Next, assume that the objective function of one plan A is F(A). Here, the objective function value is the total distance. Therefore, if the point • is set to 11 for convenience of the calculation, the evaluation value of the parent plan X is $F(X) = \Sigma D_{m \to m+1}$ (where $\Sigma$ denotes finding the total of m=1 to 10)

$$\begin{aligned} &= D_{1 \to 2} + D_{2 \to 3} + D_{3 \to 4} + D_{4 \to 5} + D_{5 \to 6} + D_{6 \to 7} + \\ &\quad D_{7 \to 8} + D_{8 \to 9} + D_{9 \to 10} + D_{10 \to 11}) \\ &= 17 + 23 + 27 + 41 + 34 + 45 + 43 + 12 + 22 + 24 \\ &= 288. \end{aligned}$$

Likewise, the evaluation value of the child plan Y is $$\begin{aligned} F(Y) &= D_{1 \to 2} + D_{2 \to 8} + D_{8 \to 7} + D_{7 \to 6} + D_{6 \to 5} + D_{5 \to 4} + \\ &\quad D_{4 \to 3} + D_{3 \to 9} + D_{9 \to 10} + D_{10 \to 11}) \\ &= 17 + 45 + 43 + 45 + 34 + 41 + 27 + 27 + 22 + 24 \\ &= 325. \end{aligned}$$

As seen in FIG. 36, Y is longer than X through intuition. Here, if the objective function value difference between X and Y, $\Delta Fxy$, is defined as $$\begin{aligned} \Delta Fxy &= F(Y) - F(X) \\ \Delta Fxy &= 325 - 288 \\ &= 37. \end{aligned}$$

FIG. 37 shows the characteristics of objective function value change found out in the invention. In the upper stage of FIG. 37, plan order vector X(i) defined every planning count i is used to enter the horizontal axis and its objective function values are used to enter the vertical axis.

The plan order vector list is changed little by little and the objective function values are compared for properly replacing with a plan order vector close to the optimum solution.

As seen in the figure, even if the maximum or minimum point like X(i) (in the embodiment, the minimum point) results, the transition to the next vector is made and planning is executed a sufficient number of times, then optimum vector $X_{opt}$ is reached.

Thus, a new plan "Xi+1" is made each time and its objective function value F(Xi+1) is calculated and compared with the objective function value F(Xi) of the preceding plan Xi in order to adopt the smaller or greater one as an optimum plan candidate. However, as the number of planning elements n (in FIG. 36, n=10) increases, the method takes enormous processing time in making new plans and calculating the objective function values.

To solve such a problem, in the invention, characteristic eliminating the need for making a new plan for each planning is found from the characteristic of the plan problem.

In the lower stage of FIG. 37, the plan order vector X(i) is used to enter the horizontal axis and the derivative value F(Xi) of the objective function F(Xi) for Xi is used to enter the vertical axis.

That is, $\Delta F(Xi) = dF(Xi)/dXi = F(Xi+1) - F(Xi)$.

This represents the objective function difference value every planning count i. If the objective function value of new plan "Xi+1" becomes that of the preceding plan Xi, the value becomes negative; otherwise, it becomes zero or positive.

As shown in the figure, the objective function value difference change corresponds to F(Xi), but the waveform becomes similar to damped vibration with zero as the center, namely, a waveform where the period changes while the amplitude is made smaller.

As in the second embodiment, according to a strict computer experiment, in the third embodiment, such a waveform also results regardless of the problem contents in general plan problems. When Xi is considered as the time of day, the damping degree of the amplitude becomes analogous to, for example, C/log (i+2) (in the embodiment, C=100).

This indicates that even when $\Delta F$ becomes positive, namely, the objective function value of the new plan becomes inferior to that of the preceding plan (increases in a minimization problem or decreases in a maximization problem), if it is less than C/log (i+2), an optimum solution is always reached in plan order vector Xi corresponding to sufficiently large i by replacing the new plan with an optimum solution candidate.

This characteristic contributes greatly to improvement in the optimization throughput, because the need for making all new plans and calculating objective function values for the new plans for each repetition of planning is eliminated and a plan is simply partially changed, namely, a part of the element list is changed, and only the changed part may be examined.

Thus, how the objective function values change can be examined independently of the number n of plan elements for optimization, and therefore a planning problem can be solved at high speed.

This point will be discussed with reference to a specific example.

The first device for optimization lies in the calculation method of $\Delta Fxy$. In the example, shown in FIG. 3, all of $F(X) = \Sigma(Dmx)$ (where $\Sigma$ represents the total of mx=1 to 10 and letter X means concerning X)

F(Y)=Σ(Dmy)

(where Σ represents the total of my=1 to 10 and letter Y means concerning Y)

are calculated, but much redundant processing is contained for optimization, for example, minimization of the total distance.

This is because the objective function difference values rather than the objective function values are required for optimization.

In FIG. 36, when operation in the embodiment is performed, if evaluation of two points has reversibility, which means the fact that if the order is changed, the relationship between two points remains unchanged, for example, the distance is the same regardless of whether 1→2 or 2→1, only two points are changed and the change does not depend on the number n.

With reference to FIG. 36, when Y is prepared from X, the changes are only deletion of $D_{2\to 3}$ and $D_{8\to 9}$ of X and addition of $D_{2\to 8}$ and $D_{3\to 9}$. This is represented by the following expression:

$$\begin{aligned}\Delta F(Y) &= F(Y) - F(X) \\ &= (D_{1\to 2} + D_{2\to 8} + D_{8\to 7} + D_{7\to 6} + D_{6\to 5} + \\ & \quad D_{5\to 4} + D_{4\to 3} + D_{3\to 9} + D_{9\to 10} + D_{10\to 11}) - \\ & \quad (D_{1\to 2} + D_{2\to 3} + D_{3\to 4} + D_{4\to 5} + D_{5\to 6} + \\ & \quad D_{6\to 7} + D_{7\to 8} + D_{8\to 9} + D_{9\to 10} + D_{10\to 11}).\end{aligned}$$

In the problem, $$D_{j\to k} = D_{k\to j}$$

is true for arbitrary points j and k. Therefore, $$\Delta Fxy = (D_{2\to 8} + D_{3\to 9}) - (D_{2\to 3} + D_{8\to 9}).$$

Using operation pointers j and k, ΔFxy is generalized as follows:

$$\Delta Fxy = (D_{(j-1)\to k} + D_{j\to (k+1)}) - (D_{(j-1)\to j} + D_{k\to (k+1)}) \quad \text{Expression 3.}$$

It is seen that only two additions and one subtraction need to be performed independently of the number n.

We have discussed changing of a plan order vector list, namely, mathematical permutation problems; mathematical combination problems can also be solved using a similar concept.

Figure 38:
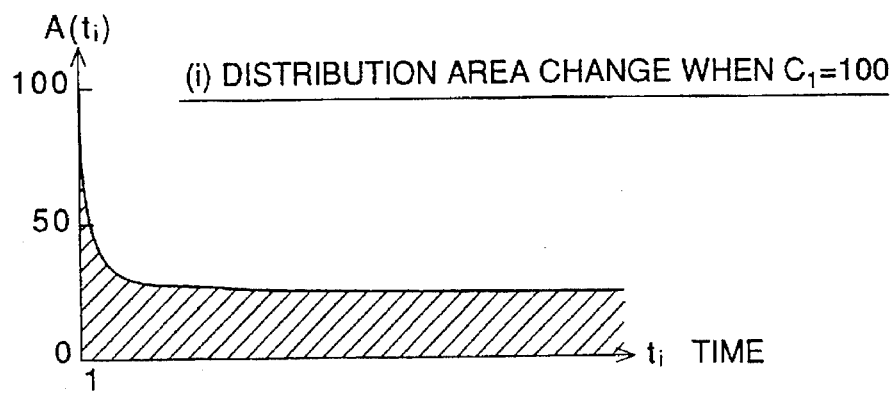
FIG. 38 is an illustration of a storage example of variables required for optimization processing.

FIG. 38 shows constants prestored in the local memory and the shared memory, such as the optimization determination values. Integer values having the following characteristics in generations i=1 to i=n² are preset in tables J and K:

(1) J(i, pm)<K(i, pm); (hereinafter, i denotes planning count)

(2) 1≦J(i, pm), K(i, pm)≦n; and (3) J(i, pm), K(i, pm) uniformly distributed in the range of (2)

where pm is the cell processor number and i is the planning count.

Expression 3 is rewritten as follows:

Expression 4

$$\begin{aligned}\Delta F(i) &= (D(J(i) - 1) \to K(i)) + DJ(i) \to (K(i) + 1)) - \\ & \quad (D(J(i) - 1) \to J(i) + DK(i) \to (K(i) + 1)).\end{aligned}$$

When the values in the embodiment

J(i)=3

K(i)=8 are assigned to Expression 4, $$\begin{aligned}\Delta F(i) &= (D_{2\to 8} + D_{3\to 9}) - (D_{2\to 3} + D_{8\to 9}) \\ &= (45 + 27) - (23 + 12) \\ &= 72 - 35 \\ &= 37 \\ &= F(Y) - F(X).\end{aligned}$$

It is seen that the objective function difference value can be found independently of n.

A(ti) shown in the lower stage of FIG. 38 is a variable to be compared with the objective function difference value ΔFxy, namely, the optimum determination value. For example, the following values are preset in the shared memory at step B in the range of ti=1 to n² where ti is time (generation).

$$A(ti) = \frac{C_1 \cdot a(ti)}{\log(ti \times Pm)}$$

where log is a natural logarithm, a(ti) is a uniform random number distributed in the range of 0.0 to 1.0, and ti>0.

That is, A(ti) needs only to have values whose distribution range decreases as time (generation) ti increases. $C_1$ can be easily determined by ΔF. Distribution area change of A(ti) when $C_1$=100 is also shown in FIG. 38. It is the same as A(ti) shown in FIG. 34; A(ti) exists in the hatched area.

Thus, the values of J, K, A(ti), etc., are preset and used as required during processing, thereby further improving the processing speed of planning.

It is confirmed that an optimum solution can be found by executing n³ examinations.

We have discussed only the operation of one cell processor performing the optimization process shown at step C in the embodiment.

Figure 39:
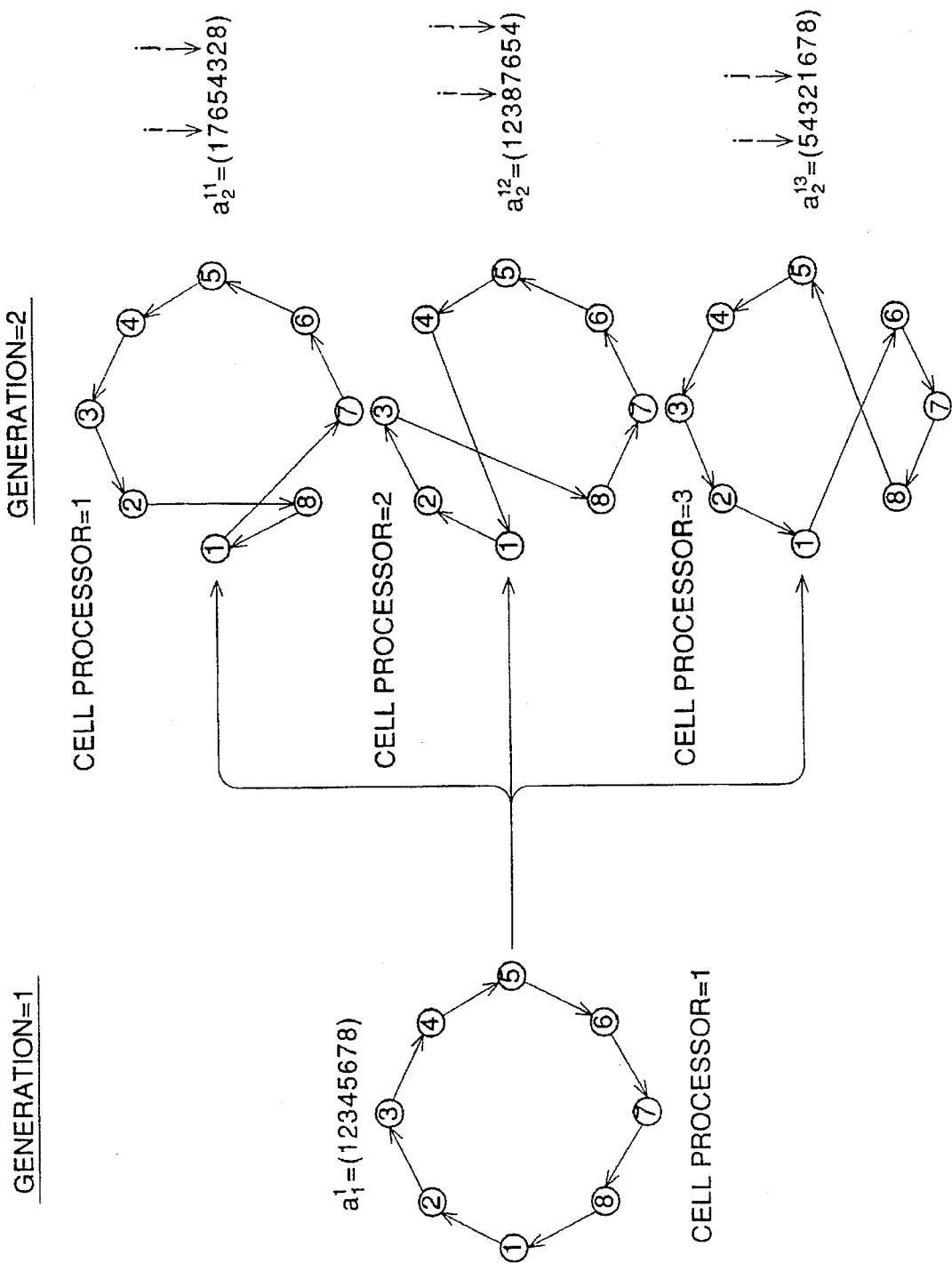
FIG. 39 is an illustration of plan propagation with a lapse of time (for each generation change) and processing procedure of the cell processors.

The invention speeds up the processing time order requiring n³ times as described below:

In FIG. 39, the plan described above, $a_1^1$=(1, 2, 3, 4, 5, 6, 7, 8), where k of $a_j^k$ denotes a digit string indicating an ancestor cell processor sequence via which the plan given the superscript k has been processed and evolved and j denotes time (generation) ti, is adopted as an optimum solution candidate at time (generation)=1 in cell processor 1, then propagates, namely, "militarily expands" to cell processors 2 and 3 at the next time (generation)=2. The cell processors 1, 2, and 3 perform "inversion," which is the minimum mutation manipulation, for the powerful individual (plan) for propagating new individuals (plans) $a_2^{11}$ $a_2^{12}$, and $a_2^{13}$.

For example, $a_2^{12}$ is propagated by inversion with i=4, j=8.

A set of plans that can result from performing inversion as the minimum mutation operation for $a_1^1$ has as many elements as the number of combinations of selecting two cities out of eight cities, namely, $_8C_2$. Therefore, the probability of selecting a candidate close to the optimum solution from among them becomes higher as the number of "military expansion" cell processors increases. That is, in a large-scaled planning problem having sufficiently large n, the greater the number of cell processors provided, the quick the optimum solution is reliably approached.

In a conventional superparallel processing system, improvement of throughput can be expected up to about 200 parallel processors, but when the number of parallel processors exceeds 1000, the processing speed of the system lowers considerably. In the invention, when the number of parallel processors increases, the processing speed lowers by only a little, as described above.

Figure 40:
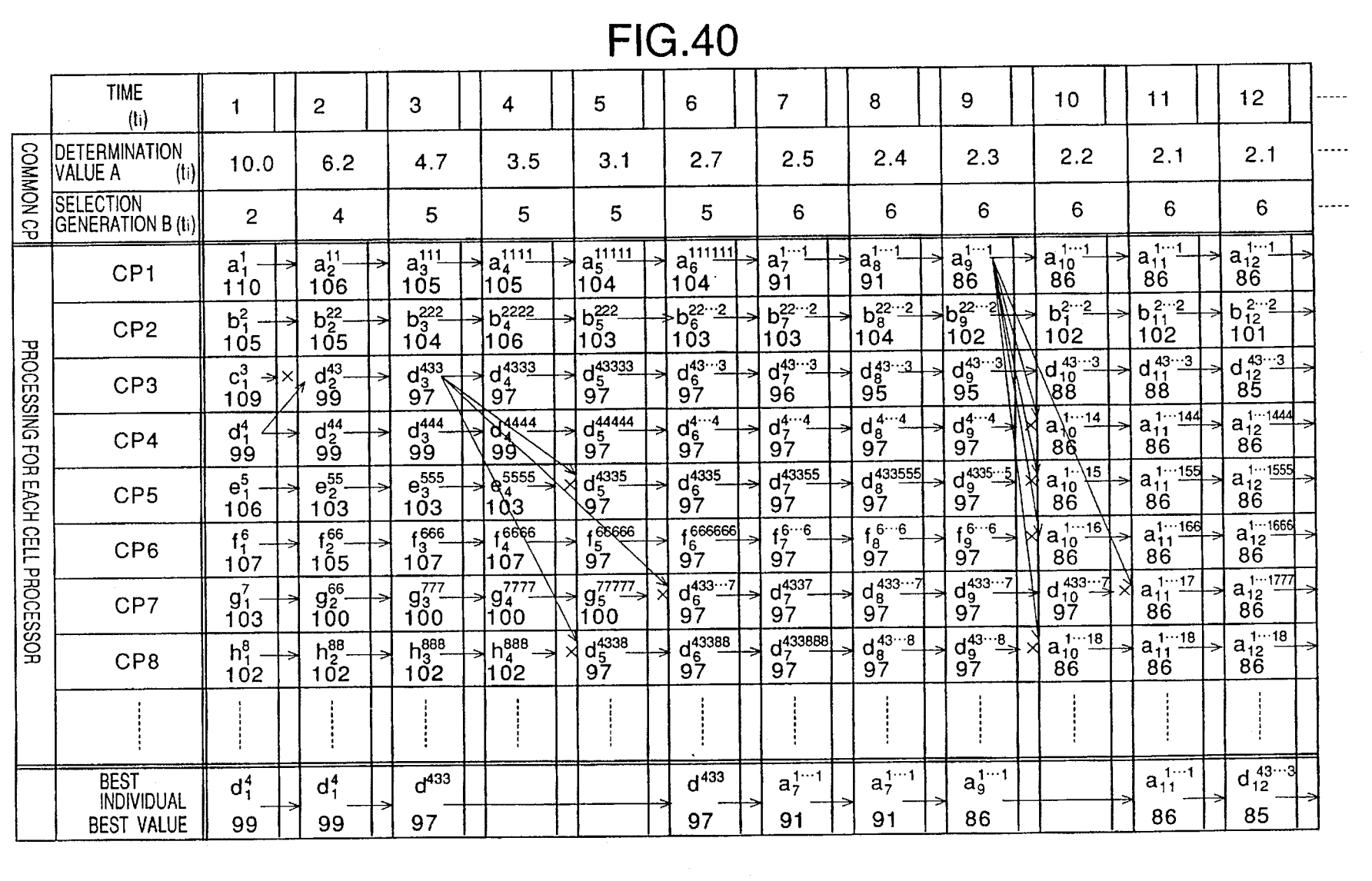

FIG. 40 shows an example of "distributed cooperation parallel processing" in which distributed processors perform parallel processing in cooperation according to the invention shown in FIGS. 34 and 35 by taking the travelling salesman problem as an example. In FIG. 40, time (generation) change ti is entered on the horizontal axis and the optimum determination value A(ti) and autonomous selection generation value B(ti) defined at step B (process B), the processing result for each cell processor, the best individual (plan), and the evaluation value of the best individual are shown on the vertical axis.

As shown here, in the initial state (ti=1), initial plans (parent plans) $a_1^1$, $b_1^2$, $c_1^3$, $d_1^4$, $e_1^5$, $f_1^6$, $g_1^7$, and $h_1^8$ are assigned to cell processors 1 (CP1) to 8 (CP8) respectively.

When time 2 is reached, the plan in CP3 has not been evolved, namely, the evaluation value of the plan has not been updated during the time indicated by the selection generation value at time 2, and thus it is replaced with the best plan (BEST INDIVIDUAL) at time 2, $d_1^4$.

Figure 41:
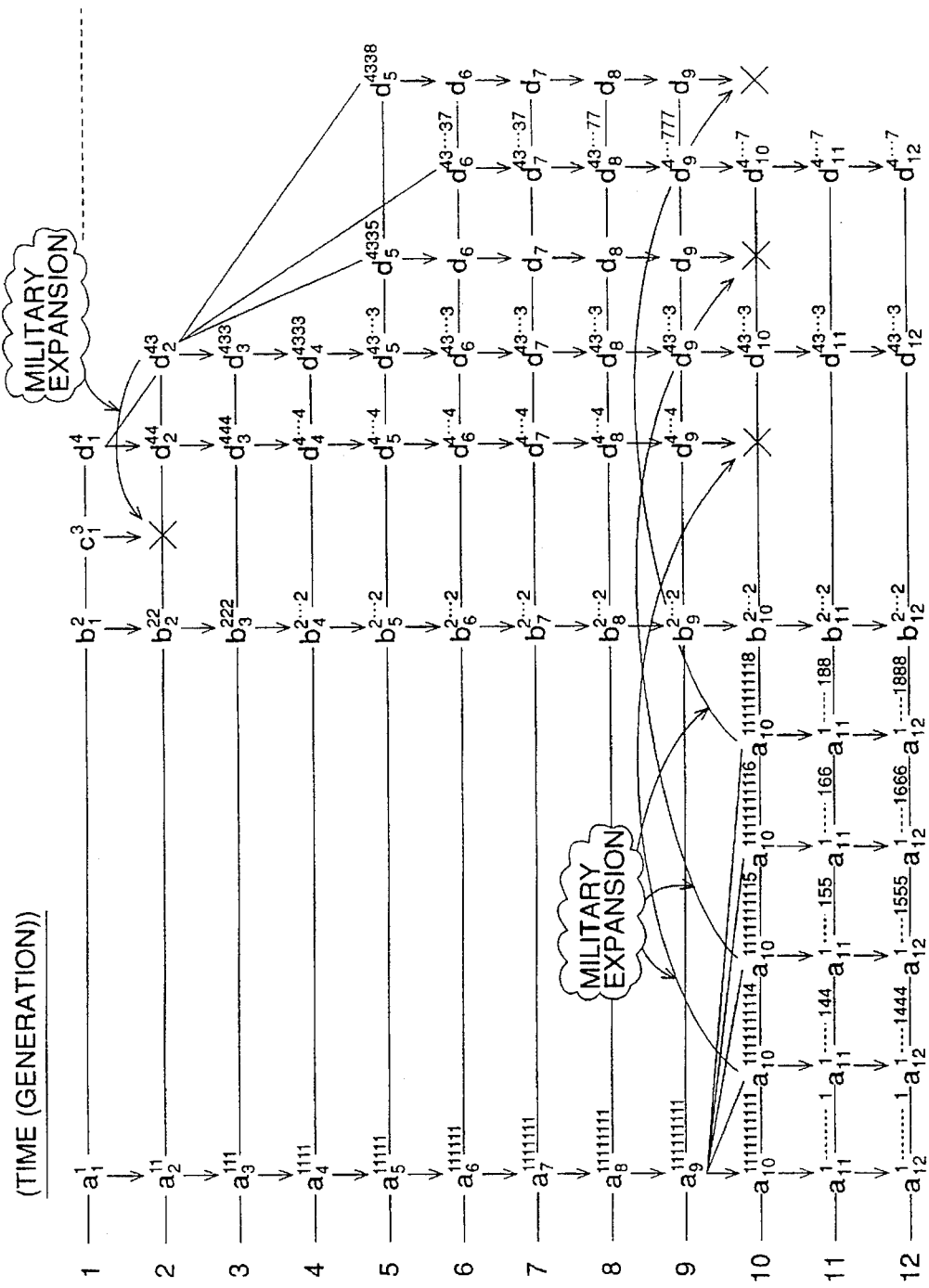
FIG. 41 is a chart of evolution of individuals (plans) and a military expansion competition example with a lapse of time (generation change)

FIG. 41 shows the situation with a tree having ancestors of plans for each time (generation) (the plans assigned to the cell processors at time 1) as roots. Here, the plans having the same ancestor are collectively called a species, which differs from "species" in biology. When one species expands (makes military expansion), other plans (individuals) are weeded out because the number of cell processors for optimization is constant.

In the invention, each cell processor autonomously determines whether or not its plan is to be weeded out, and adopts a better plan made by another processor as its plan. In the process shown in FIG. 35, the current plan is replaced with another excellent plan, but crossover can also be executed so as to leave elements of both plans.

In FIG. 41, five plans survive under species a, one plan under species b, and two plans under species d at time 12 in sequential evolution.

Figure 42:
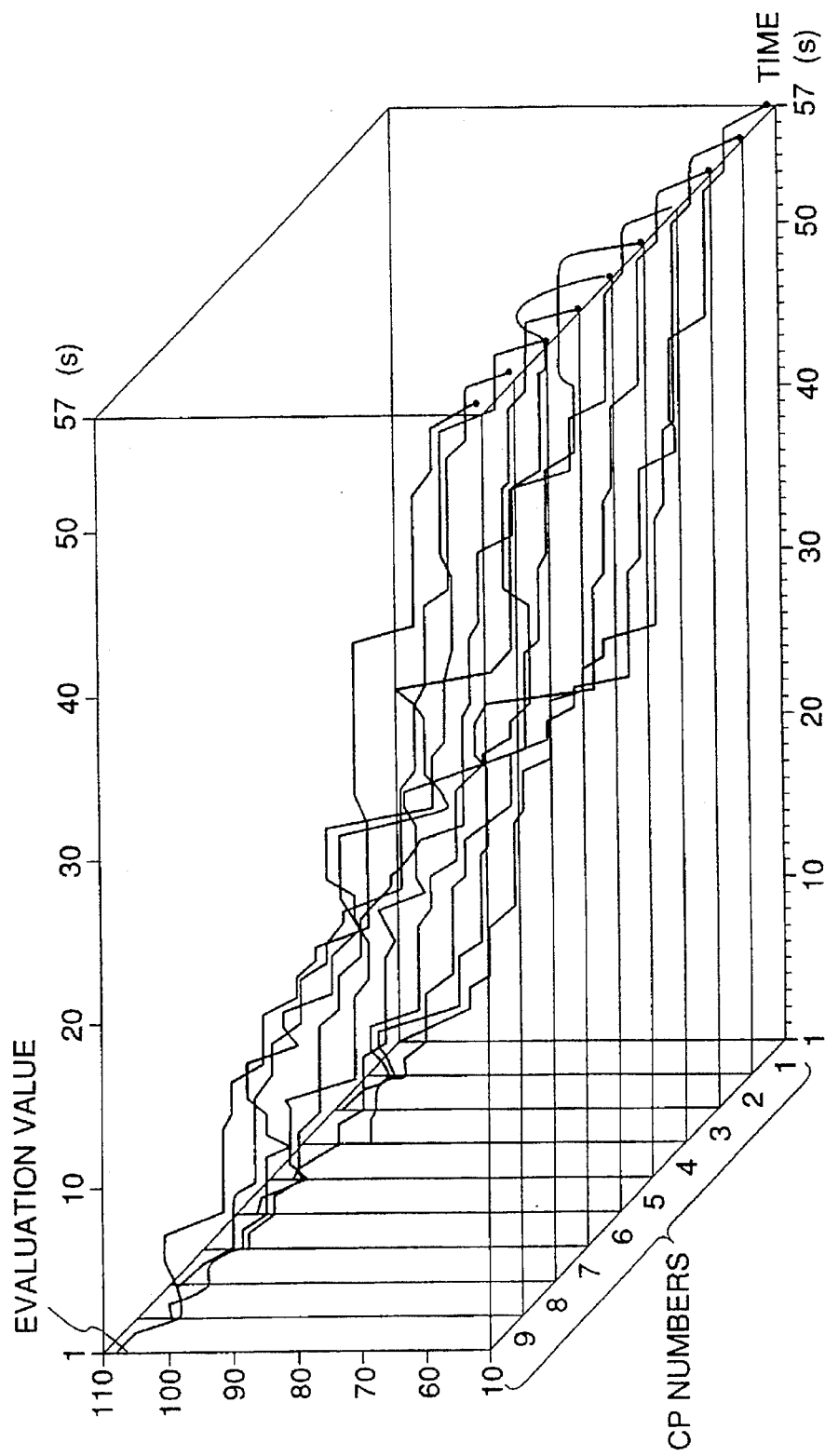
FIG. 42 is an illustration of evaluation value change for each processor with a lapse of time (generation change)

FIG. 42 shows the situation by using the time to enter the first axis, the cell processor numbers to enter the second axis, and the evaluation values of the plans at the time in the cell processors shown on the second axis to enter the third axis.

At time 1, separate plans having different evaluation values are assigned to the cell processors. Paying attention to one cell processor, the evaluation value may be improved or may worsen a little, but can be improved clearly for a long term. However, when the plan does not change for a predetermined time (autonomous selection generation value), if there is a better plan being made by another cell processor, that processor adopts the plan as its own plan for promoting the evolution at a stroke. Thus, the cell processors can optimize planning in cooperation in parallel for detecting an optimum solution in a short time.

Figure 43:
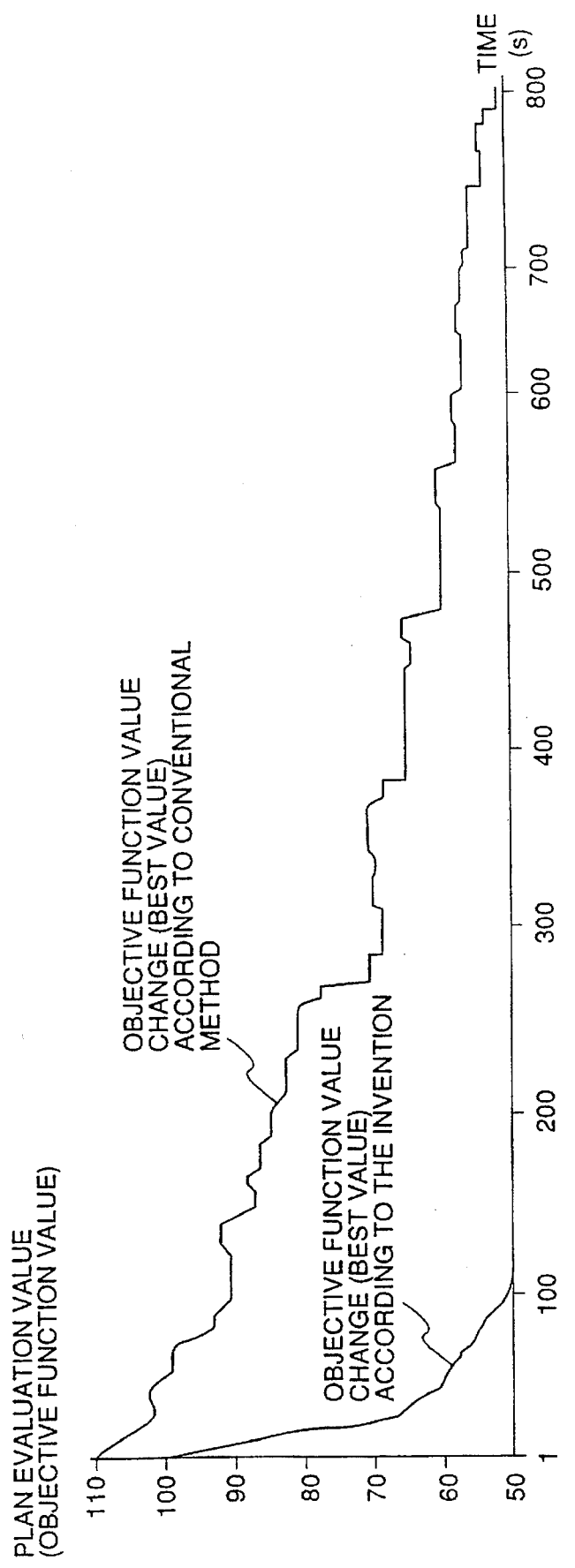
FIG. 43 is a chart of the effect of the invention.

In FIG. 43, the time is used to enter the first axis as in FIG. 42, and the objective function value (best value) of the best plan having the optimum value (in the example, the minimum value) among the plan evaluation values in all the cell processors is used to enter the second axis.

As seen in the figure, the optimum value is reached in a very short time by using the method and system according to the invention, compared with use of the conventional serial optimization method and system. This means that if allowable time is given to the same plan, the method and system of the invention can solve a more complicated problem having a greater number of planning elements, compared with the conventional method and system.

FIG. 44 shows the situation in which plan optimization is executed according to the invention. The objective function values of plans in the cell processors are represented in a bar graph as evaluation values, and symbols are used for visually easy understanding of evaluation value change.

The chart shown in the left of FIG. 44 is plotted out into 256 squares, each of which corresponds to one cell processor, denoting that 256 cell processors are used for optimization in the embodiment.

The left chart defines the evaluation values in descending direction and therefore the higher the bar graph top, the closer to the optimum solution.

At time ti=1, good solutions are distributed; at time ti=m, plans are improved as a whole by optimization of each cell processor and a plan group close to the optimum solution is being formed.

At time ti=n (n is sufficiently large), there is great overall improvement and the optimum solution appears.

The example assumes "artificial life" with the plan in each cell processor as one individual, in which case the purpose of individual selection may be considered as height increase of each individual. Of course, the height mentioned here corresponds to a decrease in "total distance" in the travelling salesman problem.

The second point of the invention is to provide a technique of early upbringing of "artificial life" formerly executed experimentally and means for applying the "artificial life" technology to industries by the computer technology.

Figure 45:
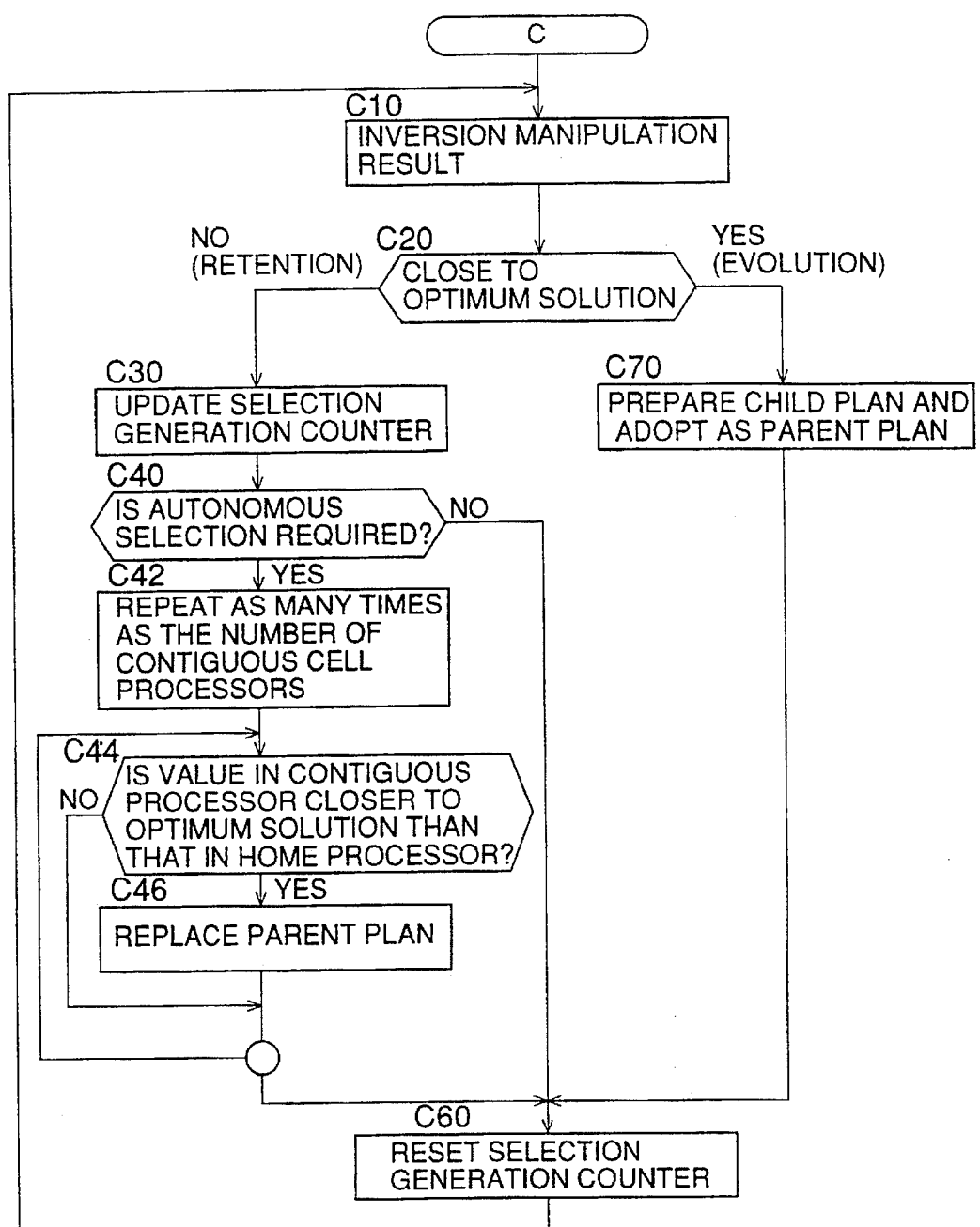
FIG. 45 is a flowchart of another optimization processing procedure.

FIGS. 45 and the latter show another optimization method of simulating upbringing of "artificial life" more closely. If the number of optimization plan elements, n, is large and the number of cell processors connected in parallel is great, the following method may be superior to the method described above.

FIG. 45 shows a method called a "local military expansion propagation optimization method" provided by changing a part of the processing of the method described above.

In the method shown in FIG. 35, when autonomous selection is made for each cell processor, each cell processor adopts the best plan among plans made by all cell processors as its own plan, whereby the best plan is distributed discretely to the whole and high speed optimization with a comparatively low number of species can be expected. The method is useful when there are a low number of objective function types and optimum solutions are unevenly distributed to some extent, for example.

FIG. 45 results from adding steps C42, C44, and C46 to and deleting steps C80 and C90 from the process flow in FIG. 35.

Step C50 is substantially provided by steps C42, C44, and C46.

At step 40, when it is judged that autonomous selection is required, the current best plan is adopted in all cell processors. Instead of executing such a step, if an excellent plan exists within a predetermined range surrounding a home cell processor, the plan is adopted as its own plan, thereby eliminating the need for storing the best plan, thereby eliminating the need for steps C80 and C90.

Figure 46:
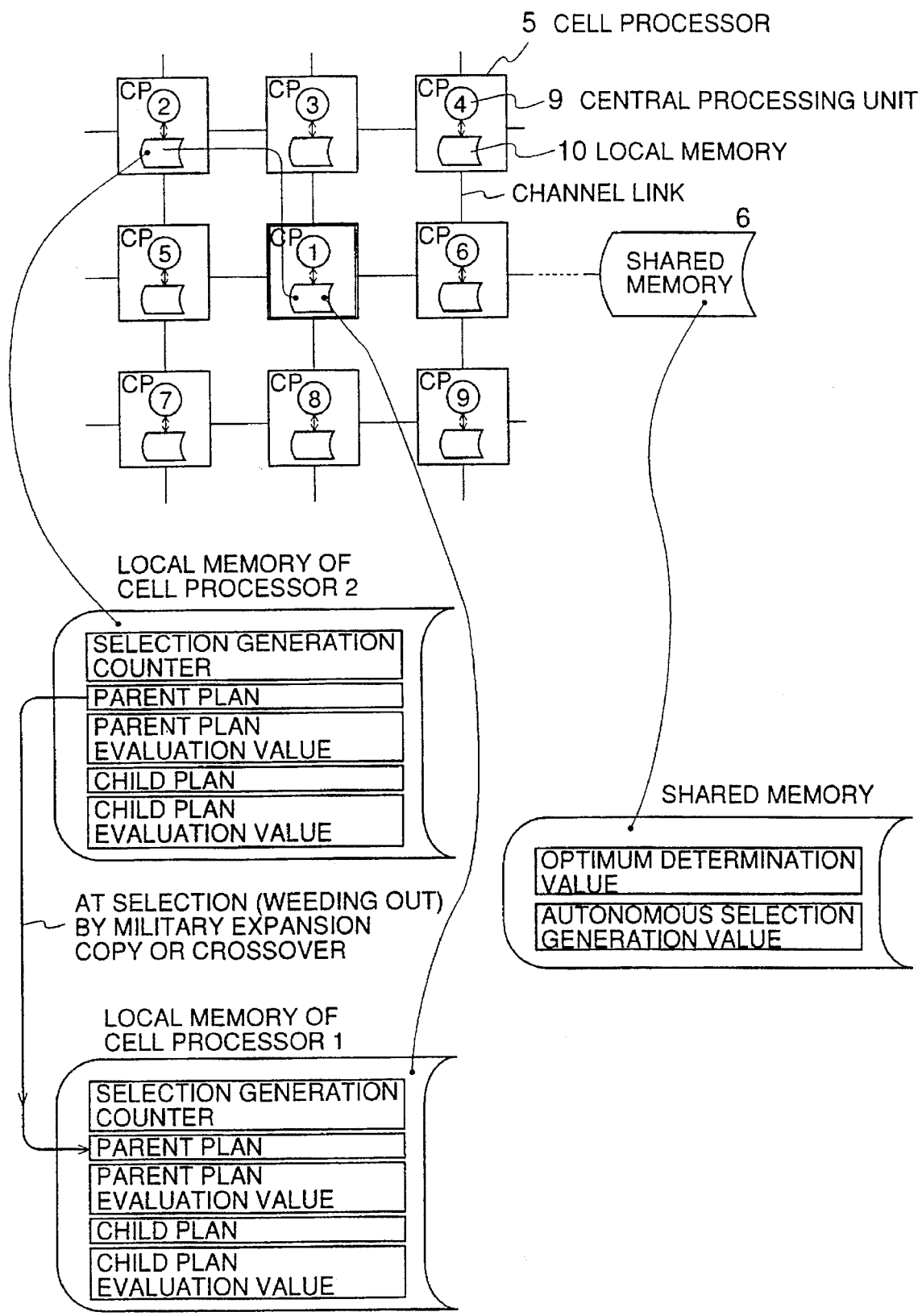
FIG. 46 is an illustration of another optimization processing method.

FIG. 46 shows hardware topology centering around cell processor CP 1 and the storage contents of the memories to execute the process shown in FIG. 45.

First, at step C42, control is performed so as to repeat the following processing for eight cell processors of CP 2 to CP 9 contiguous to CP 1. These eight cell processors CP 2 to CP 9 correspond to the cell processors existing within a predetermined range surrounding a home cell processor mentioned above.

Next, at step C44, the parent plan evaluation value stored in the local memory in CP 2 is compared with that in CP 1, for example.

As a result, if the parent plan evaluation value in CP 2 contiguous to CP 1 is closer to the optimum solution than that in CP 1, the parent plan and parent plan evaluation value in CP 1 are replaced with those in CP 2 at step C46.

Likewise, the processing is repeated for CP 3 to CP 9, whereby the optimum one of the plans in the cell processors contiguous to CP 1 is adopted as the parent plan of CP 1.

In the example, the processing is applied only to the cell processors directly contiguous to a specific cell processor, but the reference range is not limited to this and can be defined in response to a problem.

Figure 47:
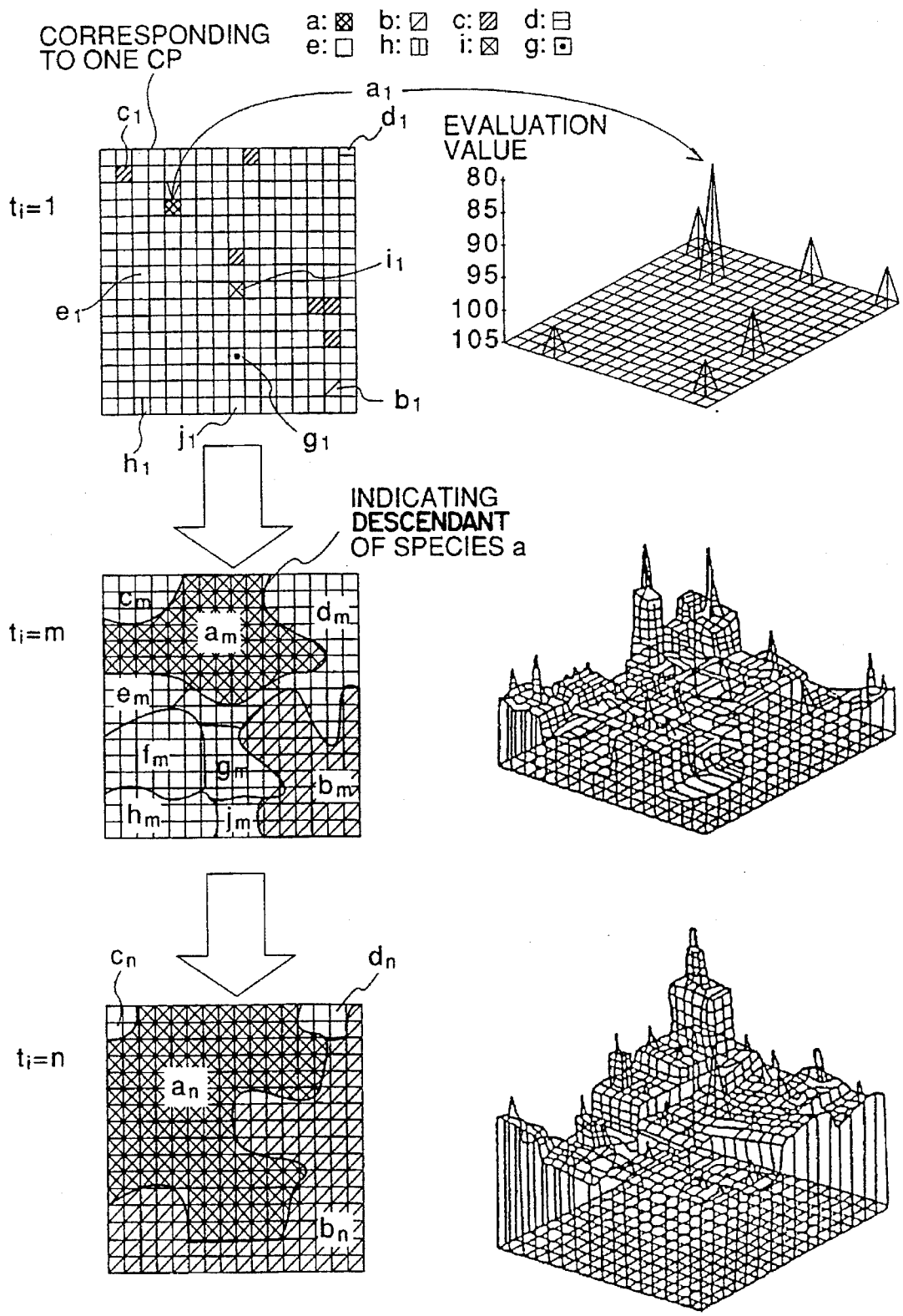
FIG. 47 is an illustration of development situation, etc., of local military expansion propagation optimization.

Like FIG. 44, FIG. 47 shows the situation in which plan optimization is executed by the "local military expansion propagation optimization technique" shown in FIG. 46.

The definitions of FIG. 47 are the same as that in FIG. 44 except that the square symbols each corresponding to each CP shown on the left correspond to species a, b, etc.

It can be easily recognized visually that ancestor $a_1$ of species a existing at time ti=1 expands gradually and that species a propagates to cell processors of more than a half of the 256 cell processors at ti=n.

Therefore, the individuals (plans) in the area indicated by the same pattern do not have the same evaluation value and have different evaluation values, although they are the same in species, as shown in the right of FIG. 47.

In FIG. 47, compared with FIG. 44, the evaluation values for each cell processor become low on average at an identical time (generation), and the optimum plan (individual) grows discretely from each evaluation value trapezoid like a plateau.

This is because gradual improvement is made in local areas without making rapid and global plan changes compared with the method shown in FIG. 35; if the number of optimization problem elements is large and the number of cell processors is also great, the optimization technique is very effective.

Assuming that a list of cities corresponding to chromosomes, X, is $$X=(1, 2, 3, 4, \ldots, n)$$

and relating the elements as genes, "evolution in fixed direction" is executed in the processing described here. That is, propagation, selection, and struggle for military expansion of primitive "artificial life" are executed. The invention is characterized by the fact that an exit from stagnation at the maximum or minimum value can always be made for planning because the evolution contains not only improvement, but also degradation, and that the fundamental problem contained in the conventional optimization methods and "artificial life" is solved.

Figure 48:
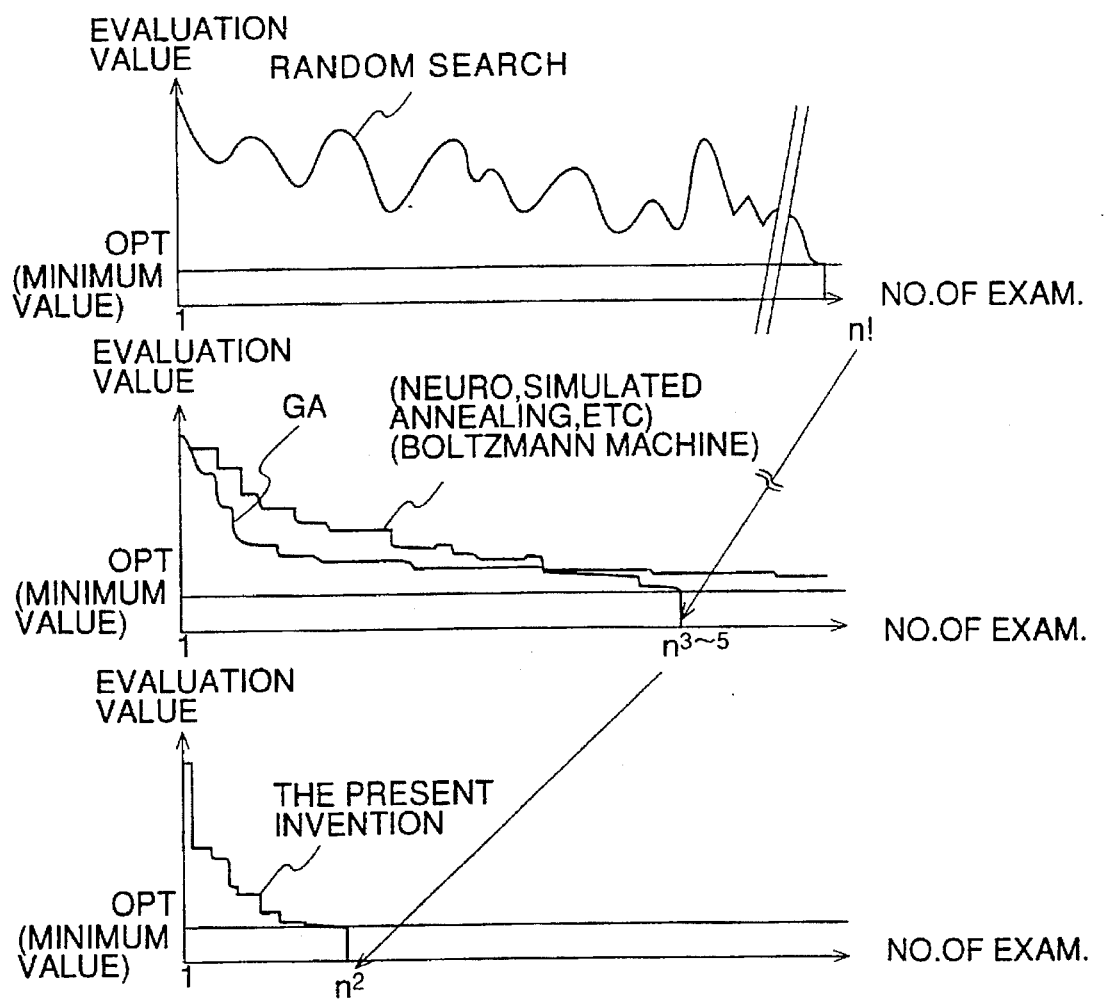
FIG. 48 is an illustration of processing performance comparison among various processing techniques.

FIG. 48 shows the comparison result of the processing method with specific optimization techniques on the same time axis. The upper graph in FIG. 48 shows the result of a random search technique for searching for all existing solutions at random. For example, assuming that the number of cities in the "travelling salesman problem" is 100, the worst value required to arrive at the optimum solution involves $100! \approx 10^{157}$ examinations.

The intermediate graph in FIG. 48 shows the result by optimization techniques such as the conventional genetic algorithm (GA) and simulated annealing. The GA converges on a comparatively good value at the initial stage, but even if the number of examinations increases, it does not improve and does not arrive at the optimum solution.

This trend becomes more noticeable as the number of planning elements, n, becomes great; it is difficult to apply the GA to solve an exact optimization problem.

The techniques such as the simulated annealing approach the optimum solution gradually, but reliably, and arrive at it in $n^3$ to $n^5$ examinations.

Compared with the random search, the number of examinations is reduced drastically to $n^5$ from $n!$ and processing can be speeded up. However, to solve a large-sealed plan problem having n exceeding 10,000, it is difficult to solve the problem within a practically allowable time even if a serial computer having the highest performance is used. The techniques will be unable to be put into practical use because the processing speed gets closer to the limit so long as the semiconductor technologies are used for the processors.

The lower graph in FIG. 48 shows the optimization situation according to the invention. Optimization is speeded up by $n^3/Pm$, namely, as many as the number of parallel processors in principle. In fact, 100% parallel efficiency is difficult to accomplish and in the invention, the optimum solution can be reached in a number of examinations in the order of $n^2$, by setting Pm=c·n (c is an integer greater than 1).

The future computer architecture will be superparallel connection of an enormous number of cell processors. Each cell processor shown in the invention is means for performing reliable optimization processing and executing autonomous selection, crossover, etc., with a lapse of time; it will become a basic concept of various types of information processing, such as design and control, in addition to planning.

According to the invention, means for making an optimum plan for a given problem at high speed in a simple configuration can be provided.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A planning system comprising:
    input means for accepting at least a given planning problem and values of variables required to solve the planning problem;
    optimization means for preparing an objective function representing an item to be minimized or maximized in the planning problem and making a final plan for minimizing or maximizing a value of the prepared objective function; and
    means for outputting the final plan;
    wherein said optimization means comprises:
        means for storing at least a plurality of solution plans to the planning problem,
        a plurality of cell processors each for preparing a new plan from a first plan by predetermined manipulation, calculating a difference between objective function values of the first plan and the new plan, comparing the calculated difference with a value of a plan determination variable set for each processing at a predetermined processing count, and if the calculated difference is greater than or equal to the plan determination variable value, adopting the first plan before the manipulation as an optimum plan candidate or if the difference is less than the plan determination variable value, adopting the new plan as an optimum plan candidate, a cell processor parallel control unit for assigning optimum plan candidates to said cell processors as plans to which the manipulation is applied in response to a percentage of the objective function value of each plan candidate to the total of the objective function values of the plan candidates, and start control means for staring said cell processors and said cell processor parallel control unit as many times as the predetermined processing count.

2. A planning system comprising:

input means for accepting at least a given planning problem and values of variables required to solve the planning problem;

optimization means for preparing an objective function representing an item to be minimized or maximized in the planning problem and making a final plan for minimizing or maximizing a value of the prepared objective function; and means for outputting the final plan, wherein said optimization means comprises:

means for storing at least a plurality of solution plans to the planning problem;

a plurality of cell processors each for preparing a new plan from a first plan by predetermined manipulation, and when the new plan satisfies a predetermined evaluation criterion, adopting the new plan as an optimum plan candidate or when the new plan does not satisfy the predetermined evaluation criterion, adopting the first plan before the manipulation as an optimum plan candidate, and finding an objective function value of the optimum plan candidate, a cell processor parallel control unit for assigning optimum plan candidates to said cell processors as plans to which the manipulation is applied in response to a percentage of the objective function value of each plan candidate to the total of the objective function values of the plan candidates, and start control means for starting said cell processors and said cell processor parallel control unit as many times as the predetermined processing count.

3. A planning system comprising:

an optimization processor for preparing an objective function representing an item to be minimized or maximized for a planning problem and performing parallel processing for finding an optimum plan for providing an optimum value of the objective function; and means for storing at least a predetermined optimum determination value which decreases with a lapse of processing time and is referenced when the optimum plan is found and a predetermined autonomous selection generation value which increases with a lapse of processing time and is referenced when said optimization processor performs parallel processing;

wherein said optimization processor comprises a plurality of processors for performing parallel processing, each of said plurality of processors comprising:

plan change means for preparing a child plan by predetermined mutation manipulation from a given parent plan, plan evaluation means for comparing an objective function value of the parent plan with that of the child plan, and autonomous selection means for updating the parent plan;

wherein said plan evaluation means calculates an objective function value difference between the parent and child plans and if the objective function value difference is less than the predetermined optimum determination value, said plan evaluation means replaces the parent plan with the child plan, and if the child pan is an optimum plan among plans provided by the parallel processing, registering the child plan in said storage means as the best plan, and if the objective function value difference is greater than the optimum determination value, said plan evaluation means holds the parent plan, and wherein further said autonomous selection means selects the best plan as a new parent plan for the corresponding processor when the time during which no parent plan change has occurred in the corresponding processor is long in comparison with the autonomous selection generation value, which is the predetermined time.

4. A planning system comprising:

an optimization processor for preparing an objective function representing an item to be minimized or maximized for a planning problem and performing parallel processing for finding an optimum plan for providing an optimum value of the objective function; and means for storing at least a predetermined optimum determination value which decreases with a lapse of processing time and is references when the optimum plan is found and a predetermined autonomous selection generation value which increases with a lapse of processing time and is referenced when said optimization processor performs parallel processing;

wherein said optimization processor comprises a plurality of processors for performing parallel processing, each of said plurality of processors comprising:

plan change means for preparing a child plan by predetermined mutation manipulation from a given parent plan, plan evaluation means for comparing an objective function value of the parent plan with that of the child plan, and autonomous selection means for updating the parent plan;

wherein said plan evaluation means calculates an objective function value difference between the parent an child plans and if the objective function value difference is less than the predetermined optimum determination value, said plan evaluation means replaces the parent plan with the child plan, and wherein further said autonomous selection means selects an optimum plan among plans updated by said autonomous selection means contained in other processors previously related to the corresponding processor as a new parent plan for the corresponding processor when the time during which no parent plan change has occurred in the corresponding processor is long in comparison with the autonomous selection generation value, which is the predetermined time.

* * * * *